(12) United States Patent  
Yuan

(10) Patent No.: US 11,889,444 B2  
(45) Date of Patent: Jan. 30, 2024

(54) SYNCHRONIZATION SIGNAL TRANSMISSION METHOD AND TERMINAL DEVICE

(71) Applicant: Huawei Technologies Co., Ltd., Shenzhen (CN)

(72) Inventor: Pu Yuan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 163 days.

(21) Appl. No.: 17/391,764

(22) Filed: Aug. 2, 2021

(65) Prior Publication Data

US 2021/0360560 A1 Nov. 18, 2021

Related U.S. Application Data

(63) Continuation of application No. PCT/CN2019/130549, filed on Dec. 31, 2019.

(30) Foreign Application Priority Data

Feb. 3, 2019 (CN) .......................... 201910108855.9

(51) Int. Cl.
*H04W 56/00* (2009.01)
*H04L 27/26* (2006.01)

(52) U.S. Cl.
CPC ..... *H04W 56/0015* (2013.01); *H04L 27/2663* (2013.01)

(58) Field of Classification Search
CPC .......... H04J 11/0073; H04J 11/0076; H04W 56/0015; H04W 92/18; H04W 56/001;
(Continued)

(56) References Cited

U.S. PATENT DOCUMENTS

2011/0268101 A1* 11/2011 Wang .................. H04W 56/002
370/344
2014/0219270 A1* 8/2014 Ro ........................ H04W 56/00
370/350
(Continued)

FOREIGN PATENT DOCUMENTS

CN    103139127 A    6/2013
CN    105766037 A    7/2016
(Continued)

OTHER PUBLICATIONS

International Search Report (English translation), WO 2016/154835 A1, dated Dec. 30, 2015 (Year: 2015).*

(Continued)

*Primary Examiner* — Benjamin H Elliott, IV
(74) *Attorney, Agent, or Firm* — Leydig, Voit & Mayer, Ltd.

(57) ABSTRACT

A synchronization signal transmission method and a terminal device are disclosed, so that the terminal device can accurately determine a symbol location of a primary synchronization signal. The techniques may be used in an internet of vehicles. The method in this application includes: generating, by a first terminal device, a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and (Continued)

sending, by the first terminal device, the synchronization signal block.

10 Claims, 63 Drawing Sheets

(58) Field of Classification Search
CPC ............... H04L 27/2663; H04L 5/0048; H04L 27/2655; H04L 27/2613; H04L 27/2662
See application file for complete search history.

(56) References Cited

U.S. PATENT DOCUMENTS

| | | | |
|---|---|---|---|
| 2017/0034798 A1* | 2/2017 | Lin | ......................... H04L 5/001 |
| 2018/0041949 A1* | 2/2018 | Liu | ...................... H04B 7/0695 |
| 2018/0227866 A1* | 8/2018 | Jung | ..................... H04W 56/001 |
| 2018/0248735 A1* | 8/2018 | Zhang | ..................... H04L 5/005 |
| 2021/0153146 A1* | 5/2021 | Liu | ....................... H04L 5/0048 |
| 2021/0360560 A1* | 11/2021 | Yuan | ................... H04L 27/2663 |

FOREIGN PATENT DOCUMENTS

| | | | |
|---|---|---|---|
| CN | 106793058 A | 5/2017 | |
| CN | 106936756 A | 7/2017 | |
| CN | 107733827 A | 2/2018 | |
| CN | 108260181 A | 7/2018 | |
| CN | 108270710 A | 7/2018 | |
| CN | 108632983 A | 10/2018 | |
| CN | 108809561 A | 11/2018 | |
| CN | 108880606 A | 11/2018 | |
| EP | 3264829 A1 * | 1/2018 | ............ H04W 48/16 |
| WO | WO-2016154835 A1 * | 10/2016 | ............ H04W 48/16 |
| WO | 2018175206 A2 | 9/2018 | |
| WO | 2018227617 A1 | 12/2018 | |

OTHER PUBLICATIONS

CATT "NR PBCH RE mapping in SS Block," 3GPP TSG RAN WG1 NR Ad-Hoc#2, Qingdao, P.R. China, R1-1710027, total 4 pages, 3rd Generation Partnership Project, Valbonne, France (Jun. 27-30, 2017).

Huawei, HiSilicon, "Sidelink synchronization mechanisms for NR V2X," 3GPP TSG RAN WG1 Meeting #94, Gothenburg, Sweden, R1-1808094, total 4 pages, 3rd Generation Partnership Project, Valbonne, France (Aug. 20-24, 2018).

LG Electronics, "Discussion on sidelink synchronization for NR V2X," 3GPP TSG RAN WG1 Meeting #95, Spokane, USA, R1-1812843, total 7 pages, 3rd Generation Partnership Project, Valbonne, France (Nov. 12-16, 2018).

"Sidelink synchronization mechanisms for NR V2X," 3GPP TSG RAN WG1 Ad-Hoc Meeting 1901, R1-1900025, Taipei, Total 12 pages, 3rd Generation Partnership Project, Valbonne, France (Jan. 21-25, 2019).

"NR sidelink synchronization mechanism," 3GPP TSG RAN WG1 Ad-Hoc Meeting 1901, R1-1900119, Taipei, Total 13 pages, 3rd Generation Partnership Project, Valbonne, France (Jan. 21-25, 2019).

"Discussion on synchronization mechanisms for NR V2X," 3GPP TSG RAN WG1 Ad-Hoc Meeting 1901, R1-1900712, Taipei, Total 5 pages, 3rd Generation Partnership Project, Valbonne, France (Jan. 21-25, 2019).

"Feature lead summary on AI 7.2.4.1.3 Synchronization mechanism," 3GPP TSG RAN WG1 Ad-Hoc Meeting 1901, R1-1901326, Taipei, Total 14 pages, 3rd Generation Partnership Project, Valbonne, France (Jan. 21-25, 2019).

* cited by examiner

| S-PSS | S-PSS | S-SSS | PBCH | PBCH | S-SSS |

FIG. 5B

| S-PSS | S-PSS | PBCH | S-SSS | PBCH | S-SSS |

FIG. 5C

| S-SSS | S-PSS | S-PSS | PBCH | S-SSS | PBCH |

FIG. 5D

| S-SSS | S-PSS | S-PSS | PBCH | PBCH | S-SSS |

FIG. 5E

| PBCH | S-PSS | S-PSS | S-SSS | PBCH | S-SSS |

FIG. 5F

| S-SSS | PBCH | S-PSS | S-PSS | S-SSS | PBCH |

FIG. 5G

| S-SSS | PBCH | S-PSS | S-PSS | PBCH | S-SSS |

FIG. 5H

| PBCH | S-SSS | S-PSS | S-PSS | PBCH | S-SSS |

FIG. 5I

| S-SSS | PBCH | S-SSS | S-PSS | S-PSS | PBCH |

FIG. 5J

| S-SSS | PBCH | PBCH | S-PSS | S-PSS | S-SSS |

FIG. 5K

| PBCH | S-SSS | PBCH | S-PSS | S-PSS | S-SSS |

FIG. 5L

| S-SSS | PBCH | S-SSS | PBCH | S-PSS | S-PSS |

FIG. 5M

| S-SSS | PBCH | PBCH | S-SSS | S-PSS | S-PSS |

FIG. 5N

| PBCH | S-SSS | PBCH | S-SSS | S-PSS | S-PSS |

FIG. 5O

| S-PSS | PBCH | S-PSS | S-SSS | S-SSS | PBCH |

FIG. 6A

| S-PSS | PBCH | S-PSS | PBCH | S-SSS | S-SSS |

FIG. 6B

| PBCH | S-PSS | PBCH | S-PSS | S-SSS | S-SSS |

FIG. 6C

| S-SSS | S-PSS | PBCH | S-PSS | PBCH | S-SSS |

FIG. 6D

| S-SSS | S-SSS | S-PSS | PBCH | S-PSS | PBCH |

FIG. 6E

| S-SSS | PBCH | S-PSS | PBCH | S-PSS | S-SSS |

FIG. 6F

| S-SSS | S-SSS | PBCH | S-PSS | PBCH | S-PSS |

FIG. 6G

| PBCH | S-SSS | S-SSS | S-PSS | PBCH | S-PSS |

FIG. 6H

| S-PSS | PBCH | PBCH | S-PSS | S-SSS | S-SSS |

FIG. 7A

| S-PSS | PBCH | S-SSS | S-PSS | S-SSS | PBCH |

FIG. 7B

| S-PSS | S-SSS | PBCH | S-PSS | PBCH | S-SSS |

FIG. 7C

| S-SSS | S-PSS | S-SSS | PBCH | S-PSS | PBCH |

FIG. 7D

| PBCH | S-PSS | PBCH | S-SSS | S-PSS | S-SSS |

FIG. 7E

| S-PSS | S-SSS | PBCH | S-SSS | PBCH | S-PSS |

FIG. 9C

| S-PSS | PBCH | S-SSS | PBCH | S-SSS | S-PSS |

FIG. 9D

| PBCH | PBCH | S-PSS | S-PSS | S-SSS |

FIG. 15C

| S-PSS | PBCH | S-PSS | PBCH | S-SSS |

FIG. 15D

| PBCH | S-PSS | PBCH | S-PSS | S-SSS |

FIG. 15E

| S-PSS | PBCH | PBCH | S-SSS | S-SSS |

FIG. 16C

| S-PSS | S-SSS | PBCH | S-SSS | PBCH |

FIG. 16D

| S-PSS | PBCH | S-SSS | PBCH | S-SSS |

FIG. 16E

| S-SSS | PBCH | S-SSS | S-PSS | PBCH |

FIG. 19C

| PBCH | PBCH | S-SSS | S-PSS | S-SSS |

FIG. 19D

| PBCH | S-SSS | PBCH | S-PSS | S-SSS |

FIG. 19E

| S-SSS | PBCH | PBCH | S-PSS | S-SSS |

FIG. 19F

| S-SSS | S-SSS | PBCH | PBCH | S-PSS |

FIG. 20A

| PBCH | S-SSS | S-SSS | PBCH | S-PSS |

FIG. 20B

| PBCH | PBCH | S-SSS | S-SSS | S-PSS |

FIG. 20C

| S-SSS | PBCH | S-SSS | PBCH | S-PSS |

FIG. 20D

| PBCH | S-SSS | PBCH | S-SSS | S-PSS |

FIG. 20E

| S-PSS | S-PSS | PBCH | PBCH | S-SSS 1 | S-SSS 2 |

FIG. 23A

| S-PSS | S-PSS | S-SSS 1 | S-SSS 2 | PBCH | PBCH |

FIG. 23B

| S-PSS | S-PSS | PBCH | S-SSS 1 | S-SSS 2 | PBCH |

FIG. 23C

| PBCH | S-PSS | S-PSS | S-SSS 1 | S-SSS 2 | PBCH |

FIG. 23D

| PBCH | S-PSS | S-PSS | PBCH | S-SSS 1 | S-SSS 2 |

FIG. 23E

| PBCH | PBCH | S-PSS | S-PSS | S-SSS 1 | S-SSS 2 |

FIG. 23F

| S-SSS 1 | S-SSS 2 | S-PSS | S-PSS | PBCH | PBCH |

FIG. 23G

| S-SSS 1 | S-SSS 2 | PBCH | S-PSS | S-PSS | PBCH |

FIG. 23H

| PBCH | S-SSS 1 | S-SSS 2 | S-PSS | S-PSS | PBCH |

FIG. 23I

| PBCH | S-SSS 1 | S-SSS 2 | PBCH | S-PSS | S-PSS |

FIG. 23J

| S-SSS 1 | S-SSS 2 | PBCH | PBCH | S-PSS | S-PSS |

FIG. 23K

| PBCH | PBCH | S-SSS 1 | S-SSS 2 | S-PSS | S-PSS |

FIG. 23L

| S-PSS | S-SSS 1 | S-PSS | S-SSS 2 | PBCH | PBCH |

FIG. 24A

| S-PSS | PBCH | S-PSS | S-SSS 1 | PBCH | S-SSS 2 |

FIG. 24B

| S-SSS 1 | S-PSS | S-SSS 2 | S-PSS | PBCH | PBCH |

FIG. 24C

| S-SSS 1 | PBCH | S-SSS 2 | S-PSS | PBCH | S-PSS |

FIG. 24G

| PBCH | PBCH | S-SSS 1 | S-PSS | S-SSS 2 | S-PSS |

FIG. 24H

| S-PSS | S-SSS 1 | PBCH | S-PSS | S-SSS 2 | PBCH |

FIG. 25A

| S-PSS | PBCH | S-SSS 1 | S-PSS | PBCH | S-SSS 2 |

FIG. 25B

| S-SSS 1 | S-PSS | PBCH | S-SSS 2 | S-PSS | PBCH |

FIG. 25C

| PBCH | S-PSS | S-SSS 1 | PBCH | S-PSS | S-SSS 2 |

FIG. 25D

| S-SSS 1 | PBCH | S-PSS | S-SSS 2 | PBCH | S-PSS |

FIG. 25E

| PBCH | S-SSS 1 | S-PSS | PBCH | S-SSS 2 | S-PSS |

FIG. 25F

| S-PSS | S-SSS 1 | PBCH | PBCH | S-PSS | S-SSS 2 |

FIG. 26A

| S-PSS 1 | S-PSS 2 | PBCH | PBCH | S-SSS | S-SSS |
|---|---|---|---|---|---|

FIG. 28A

| S-PSS 1 | S-PSS 2 | S-SSS | S-SSS | PBCH | PBCH |
|---|---|---|---|---|---|

FIG. 28B

| S-PSS 1 | S-PSS 2 | PBCH | S-SSS | S-SSS | PBCH |
|---|---|---|---|---|---|

FIG. 28C

| PBCH | S-PSS 1 | S-PSS 2 | S-SSS | S-SSS | PBCH |

FIG. 28D

| PBCH | S-PSS 1 | S-PSS 2 | PBCH | S-SSS | S-SSS |

FIG. 28E

| PBCH | PBCH | S-PSS 1 | S-PSS 2 | S-SSS | S-SSS |

FIG. 28F

| S-SSS | S-SSS | S-PSS 1 | S-PSS 2 | PBCH | PBCH |

FIG. 28G

| S-SSS | S-SSS | PBCH | S-PSS 1 | S-PSS 2 | PBCH |

FIG. 28H

| PBCH | S-SSS | S-SSS | S-PSS 1 | S-PSS 2 | PBCH |

FIG. 28I

| PBCH | S-SSS | S-SSS | PBCH | S-PSS 1 | S-PSS 2 |

FIG. 28J

| S-SSS | S-SSS | PBCH | PBCH | S-PSS 1 | S-PSS 2 |

FIG. 28K

| PBCH | PBCH | S-SSS | S-SSS | S-PSS 1 | S-PSS 2 |

FIG. 28L

| S-PSS 1 | S-SSS | S-PSS 2 | S-SSS | PBCH | PBCH |

FIG. 29A

| S-PSS 1 | PBCH | S-PSS 2 | S-SSS | PBCH | S-SSS |

FIG. 29B

| S-SSS | S-PSS 1 | S-SSS | S-PSS 2 | PBCH | PBCH |

FIG. 29C

| PBCH | S-PSS 1 | S-SSS | S-PSS 2 | S-SSS | PBCH |

FIG. 29D

| PBCH | S-SSS | S-PSS 1 | S-SSS | S-PSS 2 | PBCH |

FIG. 29E

| PBCH | PBCH | S-PSS 1 | S-SSS | S-PSS 2 | S-SSS |

FIG. 29F

| S-SSS | PBCH | S-SSS | S-PSS 1 | PBCH | S-PSS 2 |

FIG. 29G

| PBCH | PBCH | S-SSS | S-PSS 1 | S-SSS | S-PSS 2 |

FIG. 29H

| S-PSS 1 | S-SSS | PBCH | S-PSS 2 | S-SSS | PBCH |

FIG. 30A

| S-PSS 1 | PBCH | S-SSS | S-PSS 2 | PBCH | S-SSS |
|---|---|---|---|---|---|

FIG. 30B

| S-SSS | S-PSS 1 | PBCH | S-SSS | S-PSS 2 | PBCH |
|---|---|---|---|---|---|

FIG. 30C

| PBCH | S-PSS 1 | S-SSS | PBCH | S-PSS 2 | S-SSS |
|---|---|---|---|---|---|

FIG. 30D

| S-SSS | PBCH | S-PSS 1 | S-SSS | PBCH | S-PSS 2 |

FIG. 30E

| PBCH | S-SSS | S-PSS 1 | PBCH | S-SSS | S-PSS 2 |

FIG. 30F

| S-PSS 1 | S-SSS | PBCH | PBCH | S-PSS 2 | S-SSS |

FIG. 31A

| S-SSS | S-PSS | S-PSS | S-SSS | PBCH | PBCH |

FIG. 33A

| PBCH | S-SSS | S-PSS | S-PSS | S-SSS | PBCH |

FIG. 33B

| PBCH | PBCH | S-SSS | S-PSS | S-PSS | S-SSS |

FIG. 33C

| S-PSS | S-SSS | S-SSS | S-PSS | PBCH | PBCH |

FIG. 33D

| PBCH | S-PSS | S-SSS | S-SSS | S-PSS | PBCH |

FIG. 33E

| PBCH | PBCH | S-PSS | S-SSS | S-SSS | S-PSS |

FIG. 33F

| S-PSS | S-SSS | PBCH | S-SSS | S-PSS | PBCH |

FIG. 33G

| PBCH | S-PSS | S-SSS | PBCH | S-SSS | S-PSS |

FIG. 33H

| S-PSS | PBCH | S-SSS | S-SSS | PBCH | S-PSS |

FIG. 33I

| S-PSS | S-SSS | PBCH | PBCH | S-SSS | S-PSS |

FIG. 33J

| S-SSS | S-PSS | PBCH | S-PSS | S-SSS | PBCH |

FIG. 33K

SYNCHRONIZATION SIGNAL TRANSMISSION METHOD AND TERMINAL DEVICE

CROSS-REFERENCE TO RELATED APPLICATIONS

This application is a continuation of International Application No. PCT/CN2019/130549, filed on Dec. 31, 2019, which claims priority to Chinese Patent Application No. 201910108855.9, filed on Feb. 3, 2019. The disclosures of the aforementioned applications are hereby incorporated by reference in their entireties.

TECHNICAL FIELD

This application relates to the field of communication technologies, and in particular, to a synchronization signal transmission method and a terminal device.

BACKGROUND

A synchronization signal block (SSB) is a signal structure defined in new radio (NR), and includes a primary synchronization signal (PSS), a secondary synchronization signal (SSS), and a physical broadcast channel (PBCH). The PSS and the SSS are mainly used to help a terminal device identify a cell and synchronize with the cell. The PBCH includes most basic system information, for example, a system frame number and intra-frame timing information. Device to device (D2D) is an end-to-end direct communication technology. Different from conventional cellular technology communication, communication between terminal devices is located on a sidelink, and does not need relay of a base station any more. The terminal devices may directly communicate with each other. A sidelink synchronization signal block (S-SSB) is defined in the sidelink, and includes a sidelink primary synchronization signal (S-PSS), a sidelink secondary synchronization signal (S-SSS), and a physical broadcast channel (PBCH).

In a conventional technology, to overcome a problem of a decrease in a detection success rate in a high-speed scenario, the S-PSS and the S-SSS are repeated once at adjacent symbol bits separately. That is, the S-SSB includes two S-PSSs at adjacent symbol bits and two S-SSSs at adjacent symbol bits. For example, the S-SSB includes a first S-PSS and a second S-PSS that are adjacent to each other and a first S-SSS and a second S-SSS that are adjacent to each other. However, in the foregoing design, a quantity of symbol intervals between the first S-PSS and the first S-SSS is the same as a quantity of symbol intervals between the second S-PSS and the second S-SSS. If the terminal device detects only one S-PSS and one S-SSS, the terminal device may fail to accurately determine a symbol bit of the detected S-PSS.

SUMMARY

This application provides a synchronization signal transmission method and a terminal device, to accurately determine a symbol location of an S-PSS.

According to a first aspect, this application provides a synchronization signal transmission method. The synchronization signal transmission method includes: generating, by a first terminal device, a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and sending, by the first terminal device, the synchronization signal block.

In some embodiments, the values of M and N may be the same or may be different. This is not limited in this application. In some embodiments, because each of the M primary synchronization signals in the synchronization signal block corresponds to the symbol interval set, the symbol interval set in the M symbol interval sets includes the N symbol intervals between the primary synchronization signal in the M primary synchronization signals and the N secondary synchronization signals, and any two of the M symbol interval sets do not include the same symbol interval, each symbol interval corresponds to a unique symbol interval set. In addition, a symbol interval set further corresponds to a unique primary synchronization signal. Therefore, a second terminal device may determine, based on a symbol interval between one primary synchronization signal in at least one detected primary synchronization signal and one secondary synchronization signal in at least one detected secondary synchronization signal, the primary synchronization signal in the at least one primary synchronization signal is which primary synchronization signal in the synchronization signal block. Because the second terminal device may pre-store a correspondence between the M primary synchronization signals in the synchronization signal block and M symbol locations, the second terminal device may determine a symbol location of the primary synchronization signal in the at least one primary synchronization signal based on the M primary synchronization signals and the M symbol locations.

In some embodiments, the first terminal device generates the synchronization signal block, where the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, any two of the M symbol interval sets do not include the same symbol interval, and M and N are positive integers greater than or equal to 2. The first terminal device sends the synchronization signal block. A second terminal device detects a primary synchronization signal and a secondary synchronization signal, where the primary synchronization signal and the secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2. The second terminal device determines a symbol location of the primary synchronization signal based on the symbol intervals between the primary synchronization signal and the secondary synchronization signals. In the foregoing manner, when a terminal device detects only one S-PSS and one S-SSS, because symbol interval sets corresponding to all primary synchronization signals do not include a same quantity of symbol intervals, the terminal device may accurately determine a symbol location of the S-PSS based on a detected quantity of symbol intervals between the S-PSS and the S-SSS.

In an optional design, symbols occupied by the M primary synchronization signals are before symbols occupied by the N secondary synchronization signals. In some embodiments, a second terminal device may first receive the M primary synchronization signals in the synchronization signal block, and detect the M primary synchronization signals. After detecting the M primary synchronization signals, the second terminal device detects the N secondary synchronization signals in the synchronization signal block. No additional data needs to be buffered, and buffer overheads of the second terminal device are reduced.

In an optional design, the synchronization signal block occupies consecutive symbols in time domain.

According to a second aspect, this application provides a synchronization signal transmission method. The synchronization signal transmission method includes: detecting, by a second terminal device, at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and determining, by the second terminal device, a symbol location of each of the at least one primary synchronization signal based on a symbol interval between each of the at least one primary synchronization signal and one secondary synchronization signal in the at least one secondary synchronization signal.

In an optional design, the determining, by the second terminal device, a symbol location of each of the at least one primary synchronization signal based on a symbol interval between each of the at least one primary synchronization signal and one secondary synchronization signal in the at least one secondary synchronization signal includes: determining, by the second terminal device, the symbol interval between each of the at least one primary synchronization signal and the secondary synchronization signal in the at least one secondary synchronization signal; and determining, by the second terminal device, that a symbol location of a primary synchronization signal corresponding to a symbol interval set to which a symbol interval between one primary synchronization signal in the at least one primary synchronization signal and the secondary synchronization signal in the at least one secondary synchronization signal belongs is a symbol location of the primary synchronization signal, where the symbol interval set belongs to the M symbol interval sets.

In an optional design, symbols occupied by the M primary synchronization signals are before symbols occupied by the N secondary synchronization signals.

In an optional design, the synchronization signal block occupies consecutive symbols in time domain.

According to a third aspect, this application provides a synchronization signal transmission method. The synchronization signal transmission method includes: generating, by a first terminal device, a synchronization signal block, where the synchronization signal block includes only M primary synchronization signals and N secondary synchronization signals, a value of M is 1 and N is a positive integer greater than 1, or M is a positive integer greater than 1 and a value of N is 1, when M is a positive integer greater than 1 and the value of N is 1, symbol intervals between any two of the M primary synchronization signals and one secondary synchronization signal are different, and the M primary synchronization signals correspond to M symbol locations; and sending, by the first terminal device, the synchronization signal block.

In some embodiments, the synchronization signal block includes only the M primary synchronization signals and one secondary synchronization signal, where M is a positive integer greater than 1. In some embodiments, there are M symbol intervals between the M primary synchronization signals and the secondary synchronization signal. That is, there is one symbol interval between each secondary synchronization signal in the M primary synchronization signals and the secondary synchronization signal. In addition, because symbol intervals between any two of the M primary synchronization signals and the secondary synchronization signal are different, the M symbol intervals between the M primary synchronization signals and the secondary synchronization signal are all different. Therefore, each symbol interval corresponds to a unique primary synchronization signal. Therefore, a second terminal device may determine, based on a symbol interval between one primary synchronization signal in at least one detected primary synchronization signal and one detected secondary synchronization signal, the primary synchronization signal in the at least one primary synchronization signal is which primary synchronization signal in the synchronization signal block. Because the second terminal device may pre-store a correspondence between the M primary synchronization signals in the synchronization signal block and the M symbol locations, the second terminal device may determine a symbol location of the primary synchronization signal in the at least one primary synchronization signal based on the M primary synchronization signals and the M symbol locations.

In some embodiments, the synchronization signal block includes only one primary synchronization signal and the N secondary synchronization signals, where N is a positive integer greater than 1. Because a primary synchronization signal block includes only one S-PSS, a terminal device may accurately determine a symbol location of the S-PSS based on a correspondence between the detected S-PSS and the symbol location.

According to a fourth aspect, this application provides a synchronization signal transmission method. The synchronization signal transmission method includes: detecting, by a second terminal device, at least one primary synchronization signal and one secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, and symbol intervals between any two of the M primary synchronization signals and the secondary synchronization signal are different; and determining, by the second terminal device, a symbol location of each of the at least one primary synchronization signal based on a symbol interval between each of the at least one primary synchronization signal and the secondary synchronization signal.

According to a fifth aspect, this application provides a synchronization signal transmission method. The synchronization signal transmission method includes: detecting, by a second terminal device, a primary synchronization signal, where the primary synchronization signal belongs to a synchronization signal block, the synchronization signal block includes only M primary synchronization signals and N secondary synchronization signals, a value of M is 1 and N is a positive integer greater than 1, and the M primary synchronization signals correspond to M symbol locations; and determining, by the second terminal device, a symbol location of the primary synchronization signal based on a correspondence between the M primary synchronization signals and the M symbol locations.

According to a sixth aspect, this application provides a synchronization signal transmission method. The synchronization signal transmission method includes: generating, by a first terminal device, a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; and sending, by the first terminal device, the synchronization signal block.

In a scenario in which at least two symbol interval sets in the M symbol interval sets include a same symbol interval, because the sequences of any two of the N secondary synchronization signals are different, and the N sequences of the N secondary synchronization signals correspond to the N symbol locations, a second terminal device may determine a symbol location of one secondary synchronization signal in the at least one secondary synchronization signal based on a sequence of the secondary synchronization signal and a correspondence between the N sequences of the N secondary synchronization signals and the N preset symbol locations. Because M symbol intervals between one secondary synchronization signal and the M primary synchronization signals are different, the second terminal device determines a symbol location of one primary synchronization signal in at least one primary synchronization signal based on the symbol location of the secondary synchronization signal and a symbol interval between the secondary synchronization signal and the primary synchronization signal.

In a scenario in which at least two symbol interval sets in the M symbol interval sets do not include a same symbol interval, because each of the M primary synchronization signals in the synchronization signal block corresponds to the symbol interval set, the symbol interval set in the M symbol interval sets includes the N symbol intervals between the primary synchronization signal in the M primary synchronization signals and the N secondary synchronization signals, and any two of the M symbol interval sets do not include the same symbol interval, each symbol interval corresponds to a unique symbol interval set. In addition, a symbol interval set further corresponds to a unique primary synchronization signal. Therefore, a second terminal device may determine, based on a symbol interval between one primary synchronization signal in at least one detected primary synchronization signal and one secondary synchronization signal in at least one detected secondary synchronization signal, the primary synchronization signal in the at least one primary synchronization signal is which primary synchronization signal in the synchronization signal block. Because the second terminal device may pre-store a correspondence between the M primary synchronization signals in the synchronization signal block and M symbol locations, the second terminal device may determine a symbol location of the primary synchronization signal in the at least one primary synchronization signal based on the M primary synchronization signals and the M symbol locations.

According to a seventh aspect, this application provides a synchronization signal transmission method. The synchronization signal transmission method includes: detecting, by a second terminal device, at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; determining, by the second terminal device, a symbol location of a secondary synchronization signal in the at least one secondary synchronization signal based on a sequence of the secondary synchronization signal in the at least one secondary synchronization signal and a correspondence between the N sequences of the N secondary synchronization signals and the N preset symbol locations; and determining, by the second terminal device, a symbol location of each of the at least one primary synchronization signal based on the symbol location of the secondary synchronization signal in the at least one secondary synchronization signal and a symbol interval between the secondary synchronization signal in the at least one secondary synchronization signal and each of the at least one primary synchronization signal.

According to an eighth aspect, this application provides a synchronization signal transmission method. The synchronization signal transmission method includes: generating, by a first terminal device, a synchronization signal block, where the synchronization signal block includes M primary synchronization signals, sequences of any two of the M primary synchronization signals are different, M sequences of the M primary synchronization signals correspond to M symbol locations, and M is a positive integer greater than or equal to 2; and sending, by the first terminal device, the synchronization signal block.

Because the sequences of any two of the M primary synchronization signals are different, a terminal device may also accurately determine a symbol location of a primary synchronization signal based on a correspondence between a sequence of the primary synchronization signal and the symbol location.

According to a ninth aspect, this application provides a synchronization signal transmission method. The synchronization signal transmission method includes: detecting, by a second terminal device, at least one primary synchronization signal, where the at least one primary synchronization signal belongs to a synchronization signal block, the synchronization signal block includes M primary synchronization signals, sequences of any two of the M primary synchronization signals are different, M sequences of the M primary synchronization signals correspond to M preset symbol locations, and M is a positive integer greater than or equal to 2; and determining, by the second terminal device, a symbol location of each of the at least one primary synchronization signal based on a sequence of each of the at least one primary synchronization signal and a correspondence between the M sequences of the M primary synchronization signals and the M symbol locations.

According to a tenth aspect, this application provides a synchronization signal transmission method. The synchronization signal transmission method includes: generating, by a first terminal device, a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and sending, by the first terminal device, the synchronization signal block.

When a terminal device detects only one S-PSS and one S-SSS, even if symbol interval sets corresponding to all primary synchronization signals are the same, the terminal device may accurately determine a symbol location of the S-PSS based on a detected symbol interval between the S-PSS and the S-SSS and a detected time domain sequence of the S-PSS and the S-SSS.

According to an eleventh aspect, this application provides a synchronization signal transmission method. The synchronization signal transmission method includes: detecting, by a second terminal device, at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and determining, by the second terminal device, a symbol location of each of the at least one primary synchronization signal based on a symbol interval between each of the at least one primary synchronization signal and one secondary synchronization signal in the at least one secondary synchronization signal and a time domain sequence of each of the at least one primary synchronization signal and the secondary synchronization signal in the at least one secondary synchronization signal, where the time domain sequence includes that the primary synchronization signal is before the secondary synchronization signal or that the primary synchronization signal is after the secondary synchronization signal.

According to a twelfth aspect, this application provides a synchronization signal transmission method. The synchronization signal transmission method includes: generating, by a first terminal device, a synchronization signal block, where the synchronization signal block includes only M primary synchronization signals and one secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and sending, by the first terminal device, the synchronization signal block.

When a terminal device detects only one S-PSS and one S-SSS, even if symbol interval sets corresponding to all primary synchronization signals are the same, the terminal device may accurately determine a symbol location of the S-PSS based on a detected time domain sequence of the S-PSS and the S-SSS.

According to a thirteenth aspect, this application provides a synchronization signal transmission method. The synchronization signal transmission method includes: detecting, by a second terminal device, at least one primary synchronization signal and a secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and determining, by the second terminal device, a symbol location of each of the at least one primary synchronization signal based on a time domain sequence of each of the at least one primary synchronization signal and the secondary synchronization signal, where the time domain sequence includes that the primary synchronization signal is before the secondary synchronization signal or that the primary synchronization signal is after the secondary synchronization signal.

In an optional design, symbols occupied by the M primary synchronization signals are before symbols occupied by the N secondary synchronization signals.

In an optional design, the synchronization signal block occupies consecutive symbols in time domain.

According to a fourteenth aspect, this application provides a terminal device. The terminal device includes: a processing module, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and a sending module, configured to send the synchronization signal block.

In an optional design, symbols occupied by the M primary synchronization signals are before symbols occupied by the N secondary synchronization signals.

In an optional design, the synchronization signal block occupies consecutive symbols in time domain.

According to a fifteenth aspect, this application provides a terminal device. The terminal device includes: a receiving module, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and a processing module, configured to determine a symbol location of each of the at least one primary synchronization signal based on a symbol interval between each of the at least one primary synchronization signal and one secondary synchronization signal in the at least one secondary synchronization signal.

In an optional design, the processing module is configured to: determine the symbol interval between each of the at least one primary synchronization signal and the secondary synchronization signal in the at least one secondary synchronization signal; and determine that a symbol location of a primary synchronization signal corresponding to a symbol interval set to which a symbol interval between one primary synchronization signal in the at least one primary synchronization signal and the secondary synchronization signal in the at least one secondary synchronization signal belongs is a symbol location of the primary synchronization signal, where the symbol interval set belongs to the M symbol interval sets.

In an optional design, symbols occupied by the M primary synchronization signals are before symbols occupied by the N secondary synchronization signals.

In an optional design, the synchronization signal block occupies consecutive symbols in time domain.

According to a sixteenth aspect, this application provides a terminal device. The terminal device includes: a processing module, configured to generate a synchronization signal block, where the synchronization signal block includes only M primary synchronization signals and N secondary synchronization signals, a value of M is 1 and N is a positive integer greater than 1, or M is a positive integer greater than 1 and a value of N is 1, when M is a positive integer greater than 1 and the value of N is 1, symbol intervals between any two of the M primary synchronization signals and one secondary synchronization signal are different, and the M primary synchronization signals correspond to M symbol locations; and a sending module, configured to send the synchronization signal block.

According to a seventeenth aspect, this application provides a terminal device. The terminal device includes: a receiving module, configured to detect at least one primary synchronization signal and one secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, and symbol intervals between any two of the M primary synchronization signals and the secondary synchronization signal are different; and a processing module, configured to determine a symbol location of each of the at least one primary synchronization signal based on a symbol interval between each of the at least one primary synchronization signal and the secondary synchronization signal.

According to an eighteenth aspect, this application provides a terminal device. The terminal device includes: a receiving module, configured to detect a primary synchronization signal, where the primary synchronization signal belongs to a synchronization signal block, the synchronization signal block includes only M primary synchronization signals and N secondary synchronization signals, a value of M is 1 and N is a positive integer greater than 1, and the M primary synchronization signals correspond to M symbol locations; and a processing module, configured to determine a symbol location of the primary synchronization signal based on a correspondence between the M primary synchronization signals and the M symbol locations.

According to a nineteenth aspect, this application provides a terminal device. The terminal device includes: a processing module, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; and a sending module, configured to send the synchronization signal block.

According to a twentieth aspect, this application provides a terminal device. The terminal device includes: a receiving module, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; and a processing module, configured to: determine a symbol location of a secondary synchronization signal in the at least one secondary synchronization signal based on a sequence of the secondary synchronization signal in the at least one secondary synchronization signal and a correspondence between the N sequences of the N secondary synchronization signals and the N preset symbol locations; and determine a symbol location of each of the at least one primary synchronization signal based on the symbol location of the secondary synchronization signal in the at least one secondary synchronization signal and a symbol interval between the secondary synchronization signal in the at least one secondary synchronization signal and each of the at least one primary synchronization signal.

According to a twenty-first aspect, this application provides a terminal device. The terminal device includes: a processing module, configured to generate a synchronization signal block, where the synchronization signal block includes M primary synchronization signals, sequences of any two of the M primary synchronization signals are different, M sequences of the M primary synchronization signals correspond to M symbol locations, and M is a positive integer greater than or equal to 2; and a sending module, configured to send the synchronization signal block.

According to a twenty-second aspect, this application provides a terminal device. The terminal device includes: a receiving module, configured to detect at least one primary synchronization signal, where the at least one primary synchronization signal belongs to a synchronization signal block, the synchronization signal block includes M primary synchronization signals, sequences of any two of the M primary synchronization signals are different, M sequences of the M primary synchronization signals correspond to M preset symbol locations, and M is a positive integer greater than or equal to 2; and a processing module, configured to determine a symbol location of each of the at least one primary synchronization signal based on a sequence of each of the at least one primary synchronization signal and a correspondence between the M sequences of the M primary synchronization signals and the M symbol locations.

According to a twenty-third aspect, this application provides a terminal device. The terminal device includes: a processing module, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and a sending module, configured to send the synchronization signal block.

According to a twenty-fourth aspect, this application provides a terminal device. The terminal device includes: a receiving module, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and a processing module, configured to determine a symbol location of each of the at least one primary synchronization signal based on a symbol interval between each of the at least one primary synchronization signal and one secondary synchronization signal in the at least one secondary synchronization signal and a time domain sequence of each of the at least one primary synchronization signal and the secondary synchronization signal in the at least one secondary synchronization signal, where the time domain sequence includes that the primary synchronization signal is before the secondary synchronization signal or that the primary synchronization signal is after the secondary synchronization signal.

According to a twenty-fifth aspect, this application provides a terminal device. The terminal device includes: a processing module, configured to generate a synchronization signal block, where the synchronization signal block includes only M primary synchronization signals and one secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and a sending module, configured to send the synchronization signal block.

According to a twenty-sixth aspect, this application provides a terminal device. The terminal device includes: a receiving module, configured to detect at least one primary synchronization signal and a secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and a processing module, configured to determine a symbol location of each of the at least one primary synchronization signal based on a time domain sequence of each of the at least one primary synchronization signal and the secondary synchronization signal, where the time domain sequence includes that the primary synchronization signal is before the secondary synchronization signal or that the primary synchronization signal is after the secondary synchronization signal.

In an optional design, symbols occupied by the M primary synchronization signals are before symbols occupied by the N secondary synchronization signals.

In an optional design, the synchronization signal block occupies consecutive symbols in time domain.

According to a twenty-seventh aspect, an embodiment of this application provides a terminal device. The terminal device has a function of implementing behavior of the terminal device in the foregoing methods. The function may be implemented by using hardware, or may be implemented by hardware executing corresponding software. The hardware or the software includes one or more modules corresponding to the foregoing function. Optionally, the terminal device may be user equipment.

According to a twenty-eighth aspect, an embodiment of this application provides a computer storage medium, configured to store computer software instructions used by the foregoing terminal device. The computer storage medium contains a program designed for performing the foregoing aspects.

According to a twenty-ninth aspect, an embodiment of this application provides a chip system. The chip system includes a processor, configured to support a network device in implementing a function in the foregoing aspects, for example, generating or processing data and/or information in the foregoing methods. In a possible design, the chip system further includes a memory. The memory is configured to store program instructions and data that are necessary for the network device. The chip system may include a chip, or may include a chip and another discrete component.

According to a thirtieth aspect, an embodiment of this application provides a chip system. The chip system includes a processor, configured to support a terminal device in implementing a function in the foregoing aspects, for example, receiving or processing data and/or information in the foregoing methods. In a possible design, the chip system further includes a memory. The memory is configured to store program instructions and data that are necessary for the terminal device. The chip system may include a chip, or may include a chip and another discrete component.

It can be learned from the foregoing technical solutions that this application has the following advantages.

In some embodiments, the first terminal device generates the synchronization signal block, where the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, any two of the M symbol interval sets do not include the same symbol interval, and M and N are positive integers greater than or equal to 2. The first terminal device sends the synchronization signal block. The second terminal device detects the primary synchronization signal and the secondary synchronization signal, where the primary synchronization signal and the secondary synchronization signal belong to the same synchronization signal block, the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, any two of the M symbol interval sets do not include the same symbol interval, and M and N are positive integers greater than or equal to 2. The second terminal device determines the symbol location of the primary synchronization signal based on the symbol intervals between the primary synchronization signal and the secondary synchronization signals. In the foregoing manner, when the terminal device detects only the S-PSS and the S-SSS, because the symbol interval sets corresponding to all the primary synchronization signals do not include the same quantity of symbol intervals, the terminal device may accurately determine the symbol location of the S-PSS based on the detected quantity of symbol intervals between the S-PSS and the S-SSS.

BRIEF DESCRIPTION OF DRAWINGS

FIG. 5A to FIG. 5O each are a schematic structural diagram of a synchronization signal block according to an embodiment of this application;

FIG. 6A to FIG. 6H each are a schematic structural diagram of a synchronization signal block according to an embodiment of this application;

FIG. 7A to FIG. 7I each are a schematic structural diagram of a synchronization signal block according to an embodiment of this application;

FIG. 9A to FIG. 9D each are a schematic structural diagram of a synchronization signal block according to an embodiment of this application;

FIG. 15A to FIG. 15F each are a schematic structural diagram of a synchronization signal block according to an embodiment of this application;

FIG. 16A to FIG. 16F each are a schematic structural diagram of a synchronization signal block according to an embodiment of this application;

FIG. 19A to FIG. 19F each are a schematic structural diagram of a synchronization signal block according to an embodiment of this application;

FIG. 20A to FIG. 20F each are a schematic structural diagram of a synchronization signal block according to an embodiment of this application;

FIG. 23A to FIG. 23L each are a schematic structural diagram of a synchronization signal block according to an embodiment of this application;

FIG. 24A to FIG. 24H each are a schematic structural diagram of a synchronization signal block according to an embodiment of this application;

FIG. 25A to FIG. 25F each are a schematic structural diagram of a synchronization signal block according to an embodiment of this application;

FIG. 26A and FIG. 26B each are a schematic structural diagram of a synchronization signal block according to an embodiment of this application;

FIG. 28A to FIG. 28L each are a schematic structural diagram of a synchronization signal block according to an embodiment of this application;

FIG. 29A to FIG. 29H each are a schematic structural diagram of a synchronization signal block according to an embodiment of this application;

FIG. 30A to FIG. 30F each are a schematic structural diagram of a synchronization signal block according to an embodiment of this application;

FIG. 31A and FIG. 31B each are a schematic structural diagram of a synchronization signal block according to an embodiment of this application;

FIG. 33A to FIG. 33L each are a schematic structural diagram of a synchronization signal block according to an embodiment of this application;

DESCRIPTION OF EMBODIMENTS

This application provides a synchronization signal transmission method and a terminal device, so that the terminal device can accurately determine a symbol location of an S-PSS.

Figure 1:
FIG. 1 is a schematic diagram of a scenario of an internet of vehicles.

The method in embodiments of this application is applicable to D2D communication, for example, an LTE-vehicle (LTE-V) system or another vehicle to everything (V2X) system. Certainly, the method may alternatively be applied to but is not limited to more application systems in which terminal devices communicate with each other. With reference to FIG. 1 for understanding, FIG. 1 is a schematic diagram of a scenario of an internet of vehicles. As shown in FIG. 1, the scenario shown in FIG. 1 includes a first terminal device 100 and a second terminal device 200. The first terminal device 100 communicates with the second terminal device 200 by using a D2D communication protocol, for example, a V2X-based communication protocol.

The terminal device in this application may also be user equipment (UE), an access terminal device, a subscriber unit, a subscriber station, a mobile station, a mobile station, a remote station, a remote terminal device, a mobile device, a user terminal device, a terminal device, a wireless communication device, a user agent, or a user apparatus. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN) network, or the like.

By way of example rather than limitation, in the embodiments of the present disclosure, the terminal device may alternatively be a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn or integrated into clothes or an accessory of a user. The wearable device is not only a hardware device, but is used to implement a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

Figure 2:
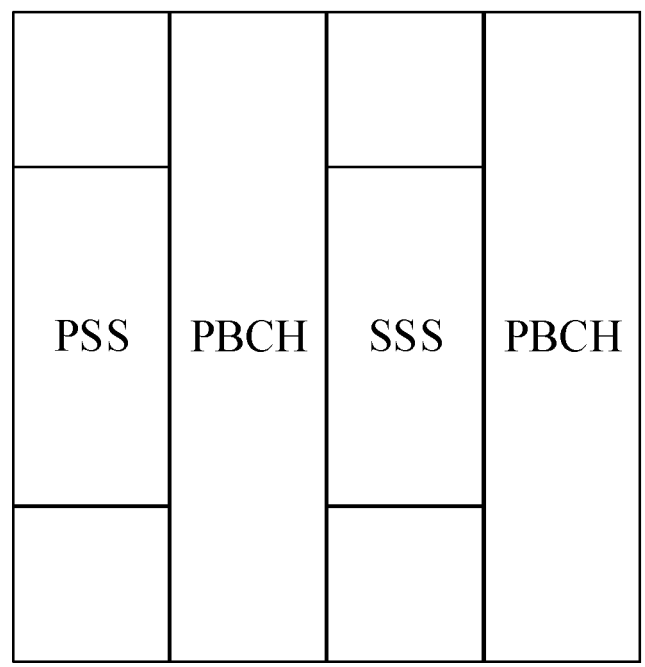
FIG. 2 is a schematic diagram of an SSB resource structure.

A synchronization signal block (SS block, SSB) is a signal structure defined in a new radio (NR) network. In a conventional technology, FIG. 2 is a schematic diagram of an SSB resource structure. As shown in FIG. 2, a synchronization signal block includes a primary synchronization signal (PSS) on one orthogonal frequency division multiplexing (OFDM) symbol, a secondary synchronization signal (SSS) on one symbol, and physical broadcast channels (PBCH) on two symbols. Locations of the PSS, the SSS, and the PBCHs in the synchronization signal block are shown in FIG. 2. A sequence length of the PSS/SSS is 127, and a sequence of the PSS/SSS occupies 127 subcarriers (SC) in frequency domain. The PBCHs occupy 288 subcarriers in frequency domain.

It should be understood that, in various embodiments of the present disclosure, a symbol and a subcarrier respectively represent a granularity unit, in time domain and in frequency domain, of a time-frequency resource for transmitting a signal, and may have meanings in a current communication system, or may have meanings in a future communication system. In addition, if names of the symbol and the subcarrier change in the future communication system, the names of the symbol and the subcarrier may alternatively be replaced by names in the future communication system.

Figure 3:
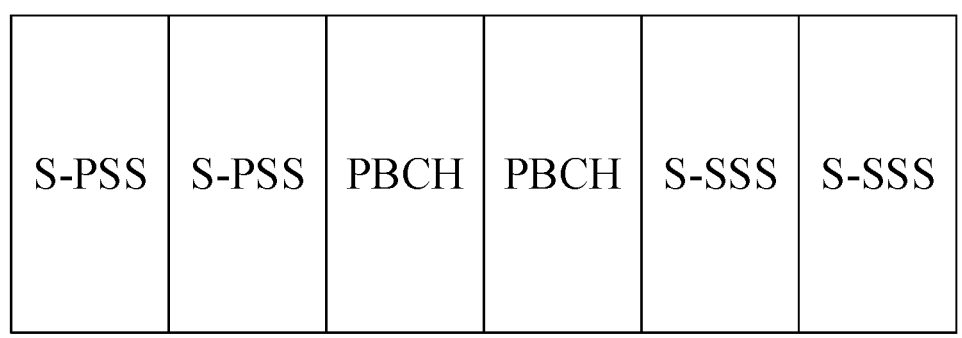
FIG. 3 is a schematic diagram of an S-SSB resource structure.

In a V2X communication scenario, a first terminal device sends a sidelink synchronization signal block (S-SSB) to a second terminal device to complete time synchronization. The sidelink synchronization signal block may be designed by referring to a design idea of NR. A sidelink primary synchronization signal (S-PSS), a sidelink secondary synchronization signal (S-SSS), and a PBCH are encapsulated in one S-SSB. In addition, to improve a success probability of one time of detection in a single S-SSB, S-PSSs and S-SSSs are repeatedly sent inside the S-SSB. In an S-SSB resource structure design, FIG. 3 is a schematic diagram of an S-SSB resource structure. As shown in FIG. 3, a sidelink synchronization signal block includes S-PSSs on two orthogonal frequency division multiplexing (OFDM) symbols, S-SSSs on two symbols, and physical broadcast channels (PBCH) on two symbols. The S-SSB occupies six symbols. Two repeated S-PSS sequences are placed at a first symbol location and a second symbol location, the PBCHs are placed at a third symbol location and a fourth symbol location, and two repeated S-SSS sequences are placed at a fifth symbol location and a sixth symbol location.

It should be noted that, in some embodiments, the S-PSS and the S-SSS may respectively have functions of a PSS and an SSS in a conventional technology. For example, the S-PSS is configured to determine OFDM symbol timing, frequency synchronization, slot timing, and a cell ID within a cell group. The S-SSS may be configured to determine frame timing, a cell group, and the like. Alternatively, the S-PSS may have functions different from those of the current PSS and SSS. This is not limited in the embodiments of this application. In addition, the S-PSS and the S-SSS may alternatively use sequences that are respectively the same as or different from those of the current PSS and SSS. This is not limited in the embodiments of this application either. In addition, in some embodiments, the PBCH may have a function the same as or different from that of a PBCH in the conventional technology. This is not limited in this application.

If the first terminal device sends the S-SSB in FIG. 3 to the second terminal device, ambiguity of determining a symbol location of the S-PSS by the second terminal device may occur in some cases. For example, when the second terminal device detects only one S-PSS in an S-SSB, the second terminal device may detect an S-SSS after an interval of three symbol locations from the S-PSS.

If the S-SSS is not detected after the interval of three symbol locations from the S-PSS, the S-SSS is detected at two adjacent symbol locations of the location after the interval of three symbol locations from the S-PSS. If the S-SSS is detected at a symbol location after the location, the detected S-PSS is an S-PSS at a first symbol location. If the S-SSS is detected at a symbol location before the location, the detected S-PSS is an S-PSS at a second symbol location. If the S-SSS is detected at neither a symbol location before the location nor a symbol location after the location, synchronization of the second terminal device fails (because neither of two S-SSSs is detected).

If the S-SSS is detected after the interval of three symbol locations from the S-PSS, the S-SSS is detected at two adjacent symbol locations of the location after the interval of three symbol locations from the S-PSS. If the S-SSS is detected at a symbol location after the location, the detected S-PSS is an S-PSS at a first symbol location. If the S-SSS is detected at a symbol location before the location, the detected S-PSS is an S-PSS at a second symbol location. If the S-SSS is detected at neither a symbol location before the location nor a symbol location after the location, it is equivalent to that a second network device detects only one S-PSS and one S-SSS in the S-SSB, and a symbol location interval between the detected S-PSS and the detected S-SSS is 3.

It can be learned from FIG. 3 that, in one S-SSB, a symbol location interval between an S-PSS at the first symbol location and an S-SSS at the fifth symbol location is 3, and a symbol location interval between an S-PSS at the second symbol location and the S-SSS at the sixth symbol location is also 3. Therefore, if the second network device detects only one S-PSS and one S-SSS in the S-SSB, and a symbol location interval between the detected S-PSS and the detected S-SSS is 3, the second terminal device may detect the S-PSS at the first symbol location and the S-SSS at the fifth symbol location, or may detect the S-PSS at the second symbol location and the S-SSS at the sixth symbol location. Therefore, the second terminal device cannot accurately determine a symbol location of the S-PSS.

To resolve the foregoing problem, the embodiments of this application provide a synchronization signal transmission method.

A main implementation principle and specific embodiment manners of the technical solutions in the embodiments of this application and corresponding advantageous effects that can be achieved by the technical solutions are described below in detail with reference to the accompanying drawings.

Figure 4:
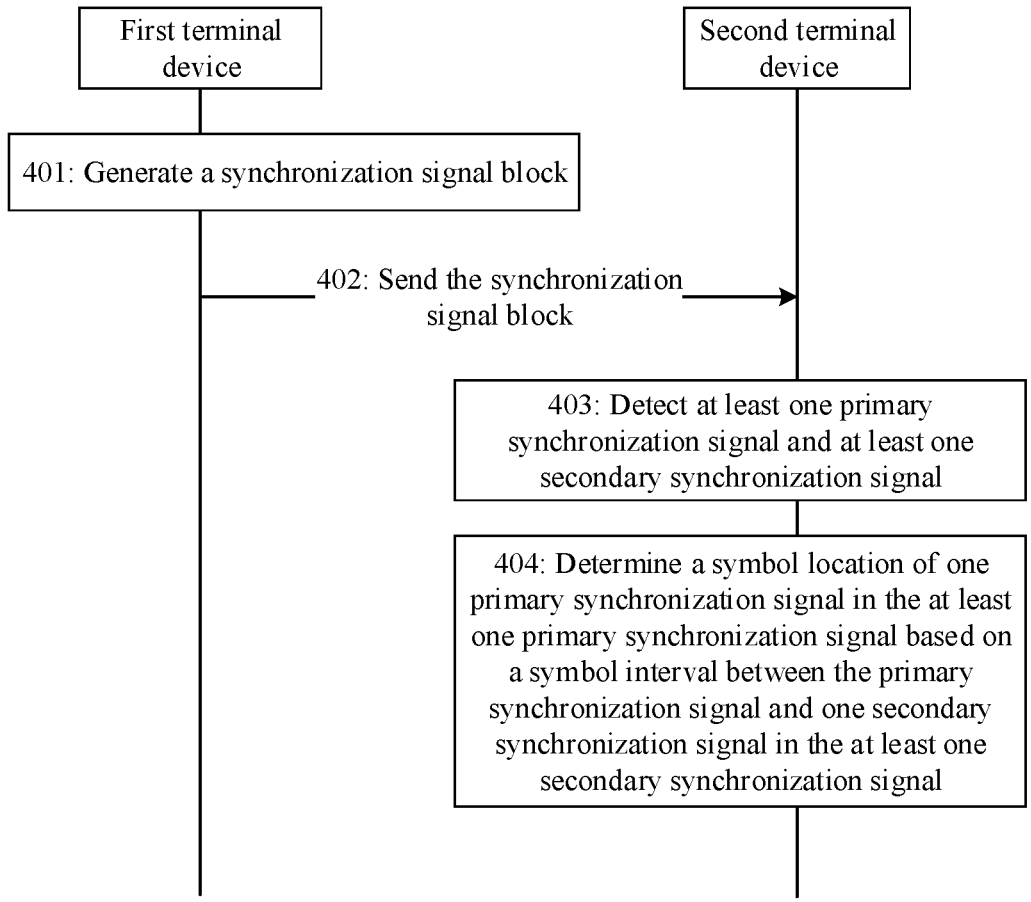
FIG. 4 is a schematic diagram of a synchronization signal transmission method according to an embodiment of this application.

FIG. 4 is a schematic diagram of a synchronization signal transmission method according to an embodiment of this application. The schematic diagram describes a synchronization signal transmission process from a perspective of interaction between a first terminal device and a second terminal device. As shown in FIG. 4, the synchronization signal transmission method provided in this embodiment of this application includes the following steps.

401: The first terminal device generates a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2

In some embodiments, values of M and N may be the same or may be different. This is not limited in this application.

In some embodiments, the first terminal device generates the synchronization signal block, where the synchronization signal block includes the M primary synchronization signals and the N secondary synchronization signals. In time domain, the M primary synchronization signals are mapped to M symbols of the synchronization signal block, and the N secondary synchronization signals are mapped to N symbols of the synchronization signal block. The M primary synchronization signals correspond to the M symbol interval sets. Each of the M primary synchronization signals corresponds to the symbol interval set in the M symbol interval sets, and the symbol interval set in the M symbol interval sets includes the N symbol intervals between the primary synchronization signal in the M primary synchronization signals and the N secondary synchronization signals.

In some embodiments, any two of the M symbol interval sets do not include the same symbol interval. In other words, an intersection set between any two of the M symbol interval sets is an empty set. In other words, symbol intervals included in any two of the M symbol interval sets are not repeated.

For example, if the synchronization signal block includes two primary synchronization signals (a primary synchronization signal A and a primary synchronization signal B), and the synchronization signal block includes two secondary synchronization signals (a secondary synchronization signal A and a secondary synchronization signal B), the two primary synchronization signals correspond to two symbol interval sets (a symbol interval set A and a symbol interval set B), either of the two primary synchronization signals corresponds to one symbol interval set in the two symbol interval sets, the primary synchronization signal A corresponds to the symbol interval set A, and the primary synchronization signal B corresponds to the symbol interval set B. Each symbol interval set includes two symbol intervals between one primary synchronization signal and the two secondary synchronization signals. That is, the symbol interval set A includes two symbol intervals (a symbol interval A1 between the primary synchronization signal A and the secondary synchronization signal A and a symbol interval A2 between the primary synchronization signal A and the secondary synchronization signal B). The symbol interval set B includes two symbol intervals (a symbol interval B1 between the primary synchronization signal B and the secondary synchronization signal A and a symbol interval B2 between the primary synchronization signal B and the secondary synchronization signal B). The symbol interval set A and the symbol interval set B do not include a same symbol interval. That is, the symbol interval A1 is not equal to the symbol interval B1, the symbol interval A1 is not equal to the symbol interval B2, the symbol interval A2 is not equal to the symbol interval B1, and the symbol interval A2 is not equal to the symbol interval B2.

It should be noted that the synchronization signal block may further include a PBCH.

For example, M=2, N=2, and the synchronization signal block includes two PBCHs. FIG. 5A to FIG. 9D each are a schematic structural diagram of the synchronization signal block.

Figure 5A:
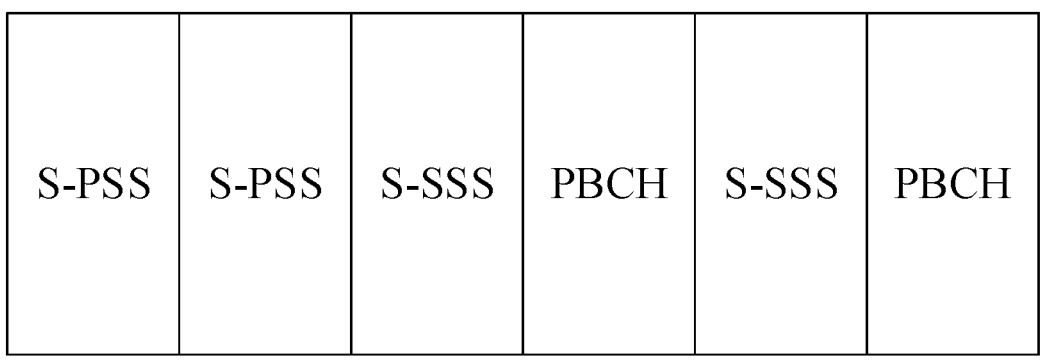

As shown in S-SSBs in FIG. 5A to FIG. 5O, two primary synchronization signals S-PSSs are mapped to consecutive symbols. FIG. 5A is used as an example. In an S-SSB in FIG. 5A, S-PSSs are mapped to a first symbol location and a second symbol location, and S-SSSs are mapped to a third symbol location and a fifth symbol location. In this case, a symbol interval set corresponding to an S-PSS at the first symbol location is {1, 3}, and a symbol interval set corresponding to an S-PSS at the second symbol location is {0, 2}. That is, the symbol interval set corresponding to the S-PSS at the first symbol location and the symbol interval set corresponding to the S-PSS at the second symbol location do not include a same symbol interval.

FIG. 5D is used as an example. In an S-SSB in FIG. 5D, S-PSSs are mapped to a second symbol location and a third symbol location, and S-SSSs are mapped to a first symbol location and a fifth symbol location. In this case, a symbol interval set corresponding to an S-PSS at the second symbol location is {0, 2}, and a symbol interval set corresponding to an S-PSS at the third symbol location is {1, 1}. In this case, the symbol interval set corresponding to the S-PSS at the first symbol location and the symbol interval set corresponding to the S-PSS at the second symbol location do not include a same symbol interval.

It should be noted that, in some embodiments, any two of the M symbol interval sets do not include a same symbol interval, but one symbol interval set may include a same symbol interval.

As shown in S-SSBs in FIG. 6A to FIG. 6H, a symbol interval between two primary synchronization signals S-PSSs is 1. FIG. 6A is used as an example. In an S-SSB in FIG. 6A, S-PSSs are mapped to a first symbol location and a third symbol location, and S-SSSs are mapped to a fourth symbol location and a fifth symbol location. In this case, a symbol interval set corresponding to an S-PSS at the first symbol location is {2, 3}, and a symbol interval set corresponding to an S-PSS at the third symbol location is {0, 1}. That is, the symbol interval set corresponding to the S-PSS at the first symbol location and the symbol interval set corresponding to the S-PSS at the third symbol location do not include a same symbol interval.

Figure 7F:
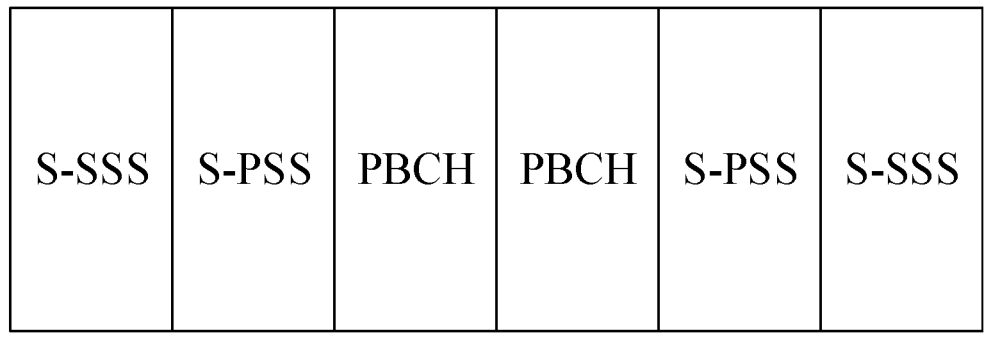
Figure 7G:
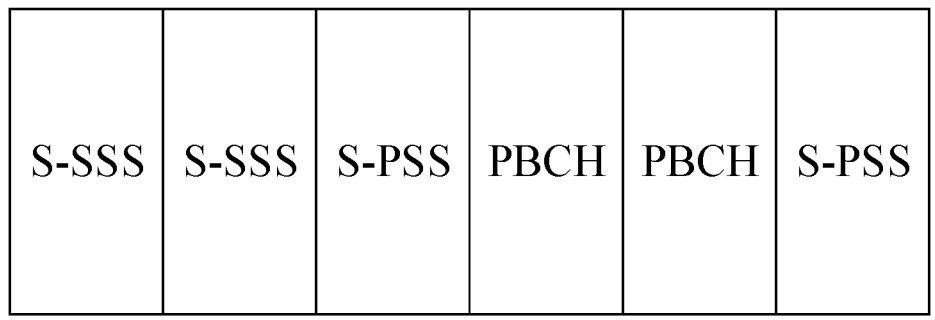
Figure 7H:
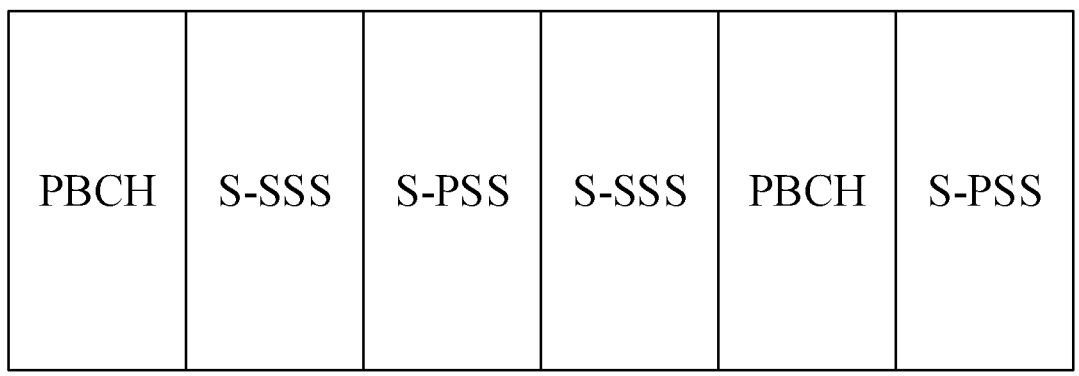
Figure 7I:
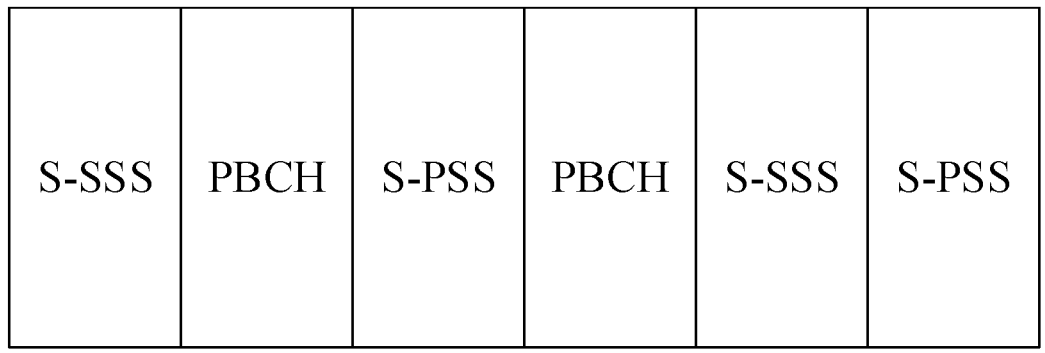

As shown in S-SSBs in FIG. 7A to FIG. 7I, a symbol interval between two primary synchronization signals S-PSSs is 2. FIG. 7A is used as an example. In an S-SSB in FIG. 7A, S-PSSs are mapped to a first symbol location and a fourth symbol location, and S-SSSs are mapped to a fifth symbol location and a sixth symbol location. In this case, a symbol interval set corresponding to an S-PSS at the first symbol location is {3, 4}, and a symbol interval set corresponding to an S-PSS at the fourth symbol location is {0, 1}. That is, the symbol interval set corresponding to the S-PSS at the first symbol location and the symbol interval set corresponding to the S-PSS at the fourth symbol location do not include a same symbol interval.

Figure 8A:
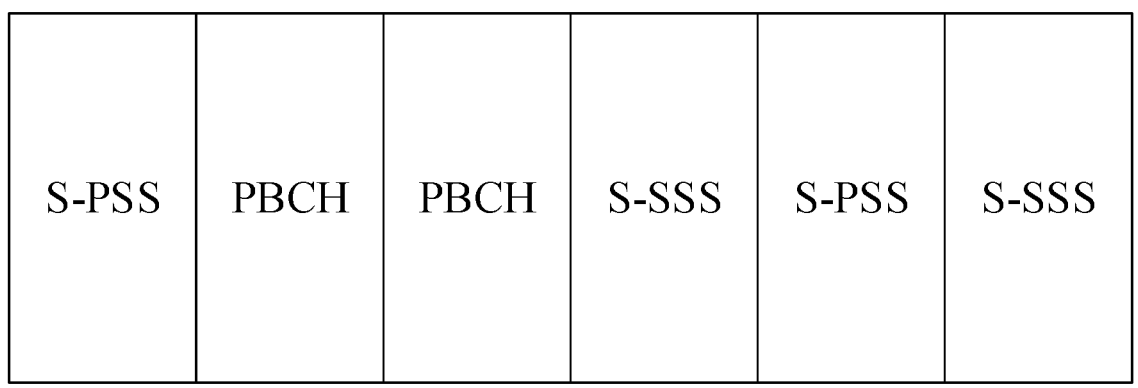
FIG. 8A to FIG. 8C each are a schematic structural diagram of a synchronization signal block according to an embodiment of this application.
Figure 8B:
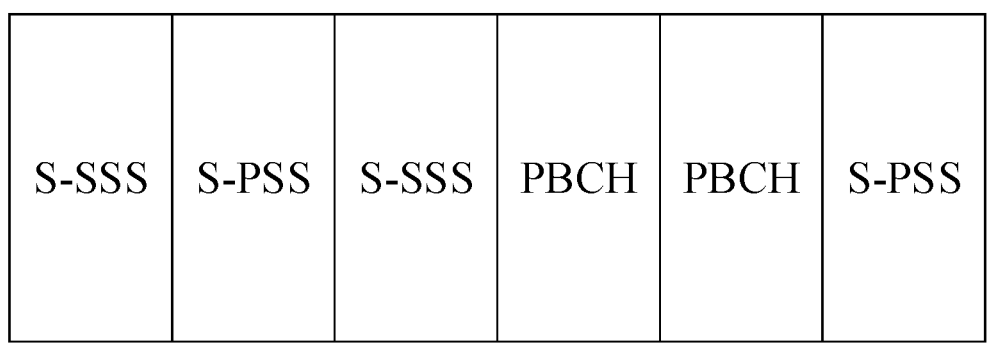
Figure 8C:
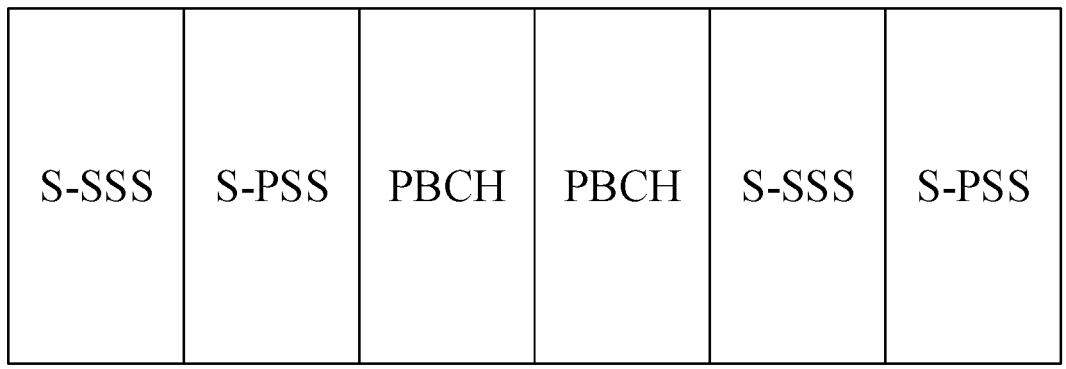

As shown in S-SSBs in FIG. 8A to FIG. 8C, a symbol interval between two primary synchronization signals S-PSSs is 3. FIG. 8A is used as an example. In an S-SSB in FIG. 8A, S-PSSs are mapped to a first symbol location and a fifth symbol location, and S-SSSs are mapped to a second symbol location and a third symbol location. In this case, a symbol interval set corresponding to an S-PSS at the first symbol location is {0, 1}, and a symbol interval set corresponding to an S-PSS at the fifth symbol location is {2, 1}. That is, the symbol interval set corresponding to the S-PSS at the first symbol location and the symbol interval set corresponding to the S-PSS at the fifth symbol location do not include a same symbol interval.

Figure 9A:
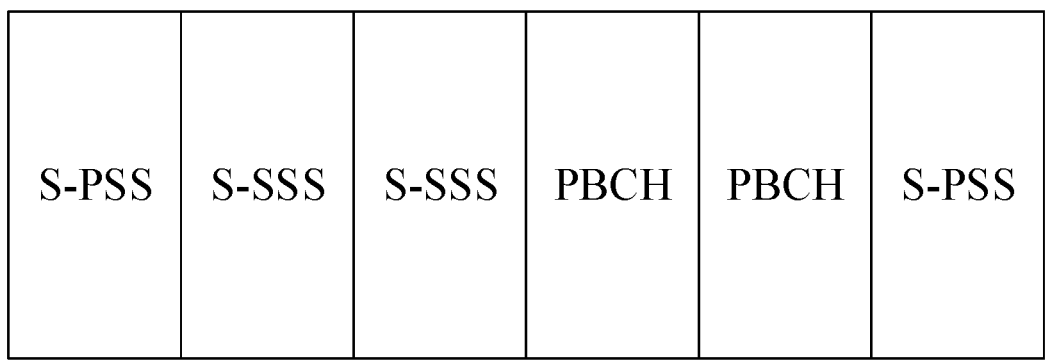
Figure 9B:
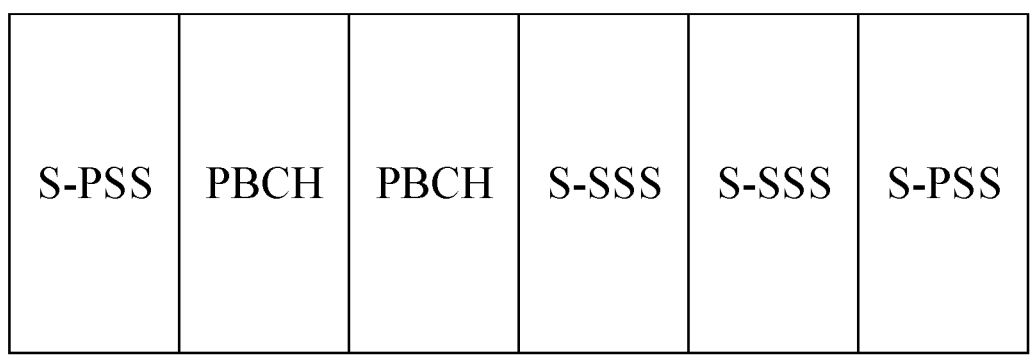

As shown in S-SSBs in FIG. 9A to FIG. 9D, a symbol interval between two primary synchronization signals S-PSSs is 4. FIG. 9A is used as an example. In an S-SSB in FIG. 9A, S-PSSs are mapped to a first symbol location and a sixth symbol location, and S-SSSs are mapped to a second symbol location and a third symbol location. In this case, a symbol interval set corresponding to an S-PSS at the first symbol location is {0, 1}, and a symbol interval set corresponding to an S-PSS at the sixth symbol location is {3, 2}. That is, the symbol interval set corresponding to the S-PSS at the first symbol location and the symbol interval set corresponding to the S-PSS at the sixth symbol location do not include a same symbol interval.

In some embodiments, symbols occupied by the M primary synchronization signals are before symbols occupied by the N secondary synchronization signals.

In some embodiments, in a dimension of time domain, symbol locations occupied by the M primary synchronization signals are before symbol locations occupied by the N secondary synchronization signals. In other words, in the sec-synchronization signal block, symbol locations to which the M primary synchronization signals are mapped in time domain are before symbol locations to which the N secondary synchronization signals are mapped in time domain.

The second terminal device needs to perform sliding window detection on synchronization signals in a received synchronization signal block in a time domain sequence, and needs to first detect a primary synchronization signal in the synchronization signal block and then detect a secondary synchronization signal in the synchronization signal block. If the symbols occupied by the M primary synchronization signals are after the symbols occupied by the N secondary synchronization signals, the second terminal device cannot detect the N secondary synchronization signals even if the second terminal device first receives the N secondary synchronization signals, but needs to buffer data of the N secondary synchronization signals and detect the N secondary synchronization signals after detecting the M primary synchronization signals.

In some embodiments, symbols occupied by the M primary synchronization signals are before symbols occupied by the N secondary synchronization signals. The second terminal device may first receive the M primary synchronization signals in the synchronization signal block, and detect the M primary synchronization signals. After detecting the M primary synchronization signals, the second terminal device detects the N secondary synchronization signals in the synchronization signal block. No additional data needs to be buffered, and buffer overheads of the second terminal device are reduced.

In some embodiments, as shown in FIG. 5A to FIG. 5D, FIG. 5F, FIG. 6A, FIG. 6B, FIG. 6C, and FIG. 7A, in the synchronization signal block, symbols occupied by the two primary synchronization signals are before symbols occupied by the two secondary synchronization signals.

In some embodiments, such as in an S-SSB shown in FIG. 5E, S-PSSs are mapped to a second symbol location and a third symbol location, S-SSSs are mapped to a first symbol location and a sixth symbol location, and an S-SSS mapped to the first symbol location is before an S-PSS mapped to the second symbol location and an S-PSS mapped to the third symbol location. In this case, the second terminal device may first receive the S-SSS mapped to the first symbol location, but does not detect the S-SSS mapped to the first symbol location. Instead, the second terminal device first buffers data corresponding to the S-SSS mapped to the first symbol location. Then, the second terminal device may receive the S-PSS mapped to the second symbol location and the S-PSS mapped to the third symbol location, and detect the S-PSS mapped to the second symbol location and the S-PSS mapped to the third symbol location. In the synchronization signal block shown in FIG. 5E, the second terminal device needs to buffer additional data (the data corresponding to the S-SSS mapped to the first symbol location).

However, in the S-SSB in FIG. 5A, the S-PSSs are mapped to the first symbol location and the second symbol location, and the S-SSSs are mapped to the third symbol location and the fifth symbol location. That is, in the S-SSB in FIG. 5A, the symbols occupied by the two primary synchronization signals are before the symbols occupied by the two secondary synchronization signals. In this case, the second terminal device may first receive the two primary synchronization signals in the synchronization signal block, and detect the two primary synchronization signals. After detecting the two primary synchronization signals, the second terminal device detects the two secondary synchronization signals in the synchronization signal block. No additional data needs to be buffered, and buffer overheads of the second terminal device are reduced.

In some embodiments, the synchronization signal block occupies consecutive symbols in time domain.

In some embodiments, structures of the synchronization signal blocks shown in FIG. 5A to FIG. 9D are used as an example. The synchronization signal blocks shown in FIG. 5A to FIG. 9D each occupy six consecutive symbols in time domain.

402: The first terminal device sends the synchronization signal block.

In some embodiments, after generating the synchronization signal block, the first terminal device needs to send the synchronization signal block to the second terminal device.

403: The second terminal device detects at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2.

404: The second terminal device determines a symbol location of each of the at least one primary synchronization signal based on a symbol interval between each of the at least one primary synchronization signal and one secondary synchronization signal in the at least one secondary synchronization signal.

In some embodiments, after the first terminal device sends the synchronization signal block, the second terminal device blindly detects the primary synchronization signal and the secondary synchronization signal in the synchronization signal block. It should be noted that a quantity of primary synchronization signals detected by the second terminal device may be equal to M, or may be less than M, and a quantity of secondary synchronization signals detected by the second terminal device may be equal to N, or may be less than N.

In some embodiments, that the second terminal device determines a symbol location of each of the at least one primary synchronization signal based on a symbol interval between each of the at least one primary synchronization signal and one secondary synchronization signal in the at least one secondary synchronization signal includes: determining, by the second terminal device, the symbol interval between each of the at least one primary synchronization signal and the secondary synchronization signal in the at least one secondary synchronization signal; and determining, by the second terminal device, that a symbol location of a primary synchronization signal corresponding to a symbol interval set to which a symbol interval between one primary synchronization signal in the at least one primary synchronization signal and the secondary synchronization signal in the at least one secondary synchronization signal belongs is a symbol location of the primary synchronization signal, where the symbol interval set belongs to the M symbol interval sets.

In some embodiments, because each of the M primary synchronization signals in the synchronization signal block corresponds to the symbol interval set, the symbol interval set in the M symbol interval sets includes the N symbol intervals between the primary synchronization signal in the M primary synchronization signals and the N secondary synchronization signals, and any two of the M symbol interval sets do not include the same symbol interval, each symbol interval corresponds to a unique symbol interval set. In addition, a symbol interval set further corresponds to a unique primary synchronization signal. Therefore, the second terminal device may determine, based on the symbol interval between each of the at least one detected primary synchronization signal and the secondary synchronization signal in the at least one detected secondary synchronization signal, each of the at least one primary synchronization signal is specifically which primary synchronization signal in the synchronization signal block. Because the second terminal device may prestore a correspondence between the M primary synchronization signals in the synchronization signal block and M symbol locations, the second terminal device may determine a symbol location of each of the at least one primary synchronization signal based on the M primary synchronization signals and the M symbol locations.

The following describes this embodiment by using an example in which M is equal to 2 and N is equal to 2.

In some embodiments, if the second terminal device detects one primary synchronization signal and one primary synchronization signal in the synchronization signal block, the second terminal device detects a symbol interval between the primary synchronization signal and the primary synchronization signal. Because either of the two primary synchronization signals in the synchronization signal block corresponds to one symbol interval set, one symbol interval set in two symbol interval sets includes two symbol intervals between one primary synchronization signal in the two primary synchronization signals and the two secondary synchronization signals, and any two of the two symbol interval sets do not include a same symbol interval, each symbol interval corresponds to a unique symbol interval set. In addition, a symbol interval set further corresponds to a unique primary synchronization signal. Therefore, the second terminal device may determine, based on the symbol interval between the detected primary synchronization signal and the detected secondary synchronization signal, the primary synchronization signal is which primary synchronization signal in the synchronization signal block. Because the second terminal device may prestore a correspondence between two primary synchronization signals in the synchronization signal block and two symbol locations, the second terminal device knows a symbol location corresponding to either of the two primary synchronization signals. Therefore, the second terminal device may determine a symbol location of the detected primary synchronization signal based on the correspondence between the two primary synchronization signals and the two symbol locations.

If the second terminal device detects one primary synchronization signal and two secondary synchronization signals in the synchronization signal block, the second terminal device may determine a symbol location of the primary synchronization signal based on a symbol interval between the detected primary synchronization signal and one secondary synchronization signal in the two detected secondary synchronization signals.

If the second terminal device detects two primary synchronization signals and two secondary synchronization signals in the synchronization signal block, the second terminal device may determine a symbol location of one primary synchronization signal in the two primary synchronization signals based on a symbol interval between the primary synchronization signal and one secondary synchronization signal in the two detected secondary synchronization signals. Similarly, the second terminal may determine a symbol location of the other primary synchronization signal in the two primary synchronization signals based on a symbol interval between the other primary synchronization signal and the other secondary synchronization signal in the two detected secondary synchronization signals.

The synchronization signal block shown in FIG. 5A is used as an example for description. The second terminal device detects one S-PSS and one S-SSS. If the second terminal device detects that a symbol interval between the S-PSS and the S-SSS is 1, because in the synchronization signal block in FIG. 5A, only a symbol interval between the S-PSS at the first symbol location and an S-SSS at the third symbol location is 1, the second terminal device may determine that the detected S-PSS is the S-PSS at the first symbol location.

If the second terminal device detects that a symbol interval between the S-PSS and the S-SSS is 0, because in the synchronization signal block in FIG. 5A, only a symbol interval between the S-PSS at the second symbol location and an S-SSS at the third symbol location is 0, the second terminal device may determine that the detected S-PSS is the S-PSS at the second symbol location.

If the second terminal device detects that a symbol interval between the S-PSS and the S-SSS is 2, because in the synchronization signal block in FIG. 5A, only a symbol interval between the S-PSS at the second symbol location and an S-SSS at the fifth symbol location is 2, the second terminal device may determine that the detected S-PSS is the S-PSS at the second symbol location.

If the second terminal device detects that a symbol interval between the S-PSS and the S-SSS is 3, because in the synchronization signal block in FIG. 5A, only a symbol interval between the S-PSS at the first symbol location and an S-SSS at the fifth symbol location is 3, the second terminal device may determine that the detected S-PSS is the S-PSS at the first symbol location.

The synchronization signal block shown in FIG. 5D is used as an example. The second terminal device detects one S-PSS and one S-SSS. If the second terminal device detects that a symbol interval between the S-PSS and the S-SSS is 0, because in the synchronization signal block in FIG. 5D, only a symbol interval between the S-PSS at the second symbol location and the S-SSS at the first symbol location is 0, the second terminal device may determine that the detected S-PSS is the S-PSS at the second symbol location.

If the second terminal device detects that a symbol interval between the S-PSS and the S-SSS is 1, because in the synchronization signal block in FIG. 5D, only a symbol interval between the S-PSS at the third symbol location and the S-SSS at the first symbol location is 1, or a symbol interval between the S-PSS at the third symbol location and an S-SSS at the fifth symbol location is 1, the second terminal device may determine that the detected S-PSS is the S-PSS at the third symbol location.

If the second terminal device detects that a symbol interval between the S-PSS and the S-SSS is 2, because in the synchronization signal block in FIG. 5D, only a symbol interval between the S-PSS at the second symbol location and an S-SSS at the fifth symbol location is 2, the second terminal device may determine that the detected S-PSS is the S-PSS at the second symbol location.

In some other embodiments, the synchronization signal block shown in FIG. 5A is used as an example for description. If the second terminal device detects only one S-PSS in the synchronization signal block, the second network device may separately detect an S-PSS at symbol locations having a symbol interval of 0, a symbol interval of 1, a symbol interval of 2, and a symbol interval of 3 after the S-PSS. If the S-SSS is detected at a symbol location having the symbol interval of 0 after the S-PSS, the second terminal device may determine that the detected S-PSS is the S-PSS at the second symbol location. If the S-SSS is detected at a symbol location having the symbol interval of 1 after the S-PSS, the second terminal device may determine that the detected S-PSS is the S-PSS at the first symbol location. If the S-SSS is detected at a symbol location having the symbol interval of 2 after the S-PSS, the second terminal device may determine that the detected S-PSS is the S-PSS at the second symbol location. If the S-SSS is detected at a symbol location having the symbol interval of 3 after the S-PSS, the second terminal device may determine that the detected S-PSS is the S-PSS at the first symbol location.

The synchronization signal block shown in FIG. 5D is used as an example for description. In another embodiment, if the second terminal device detects only one S-PSS in the synchronization signal block, the second network device may separately detect an S-SSS at symbol locations having a symbol interval of 0 and a symbol interval of 1 before the S-PSS and a symbol interval of 1 and a symbol interval of 2 after the S-PSS. If the S-SSS is detected at a symbol location having the symbol interval of 0 before the S-PSS, the second terminal device may determine that the detected S-PSS is the S-PSS at the second symbol location. If the S-SSS is detected at a symbol location having the symbol interval of 1 before the S-PSS, the second terminal device may determine that the detected S-PSS is the S-PSS at the third symbol location. If the S-SSS is detected at a symbol location having the symbol interval of 1 after the S-PSS, the second terminal device may determine that the detected S-PSS is the S-PSS at the third symbol location. If the S-SSS is detected at a symbol location having the symbol interval of 2 after the S-PSS, the second terminal device may determine that the detected S-PSS is the S-PSS at the second symbol location.

Second, in some embodiments, the first terminal device generates the synchronization signal block, where the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, any two of the M symbol interval sets do not include the same symbol interval, and M and N are positive integers greater than or equal to 2. The first terminal device sends the synchronization signal block. The second terminal device detects a primary synchronization signal and a secondary synchronization signal, where the primary synchronization signal and the secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2. The second terminal device determines the symbol location of each of the at least one primary synchronization signal based on the symbol interval between each of the at least one primary synchronization signal and the secondary synchronization signal in the at least one secondary synchronization signal. In the foregoing manner, when a terminal device detects only one S-PSS and one S-SSS, because symbol interval sets corresponding to all primary synchronization signals do not include a same quantity of symbol intervals, the terminal device may accurately determine a symbol location of the S-PSS based on a detected quantity of symbol intervals between the S-PSS and the S-SSS.

Figure 10:
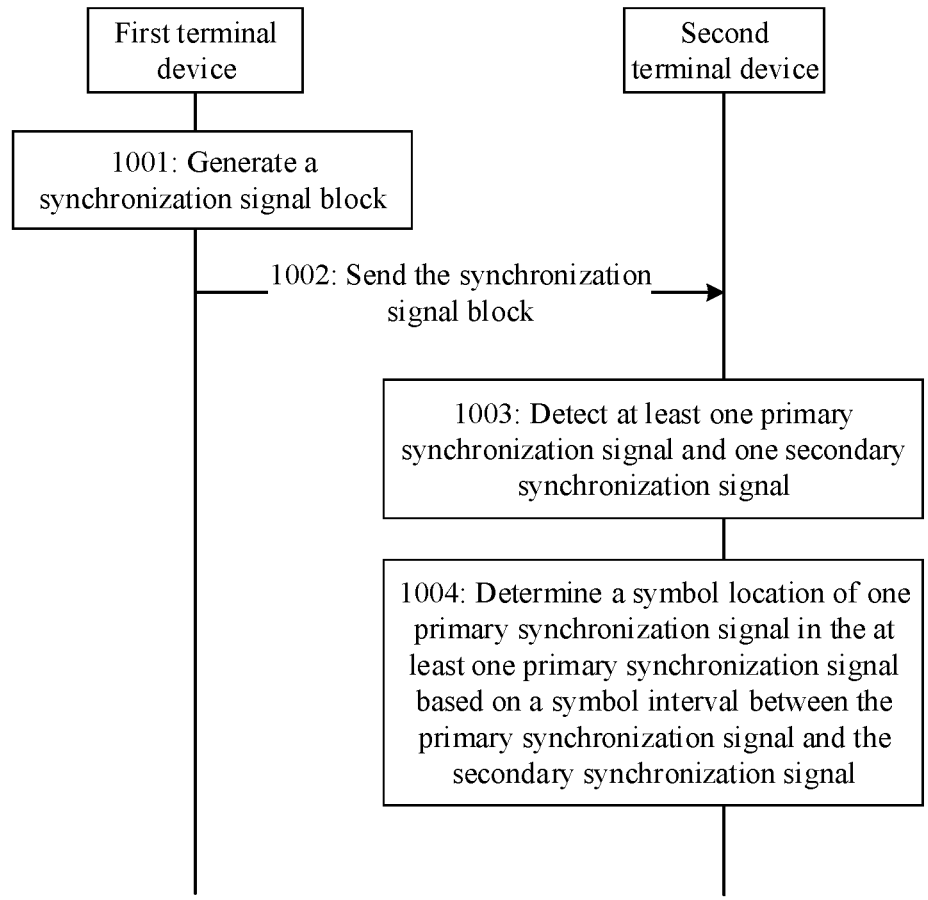
FIG. 10 is a schematic diagram of a synchronization signal transmission method according to an embodiment of this application.

FIG. 10 is a schematic diagram of a synchronization signal transmission method according to an embodiment of this application. As shown in FIG. 10, the synchronization signal transmission method provided in this embodiment of this application includes the following steps.

1001: A first terminal device generates a synchronization signal block, where the synchronization signal block includes only M primary synchronization signals and one secondary synchronization signal, M is a positive integer greater than 1, and symbol intervals between any two of the M primary synchronization signals and the secondary synchronization signal are different.

In some embodiments, the first terminal device generates the synchronization signal block, where the synchronization signal block includes only the M primary synchronization signals and the secondary synchronization signal. In time domain, the M primary synchronization signals are mapped to M symbols of the synchronization signal block, the M primary synchronization signals correspond to M symbol locations, the secondary synchronization signal is mapped to one symbol of the synchronization signal block.

In some embodiments, the synchronization signal block includes only the M primary synchronization signals and the secondary synchronization signal, where M is a positive integer greater than 1. In some embodiments, there are M symbol intervals between the M primary synchronization signals and the secondary synchronization signal. That is, there is one symbol interval between each secondary synchronization signal in the M primary synchronization signals and the secondary synchronization signal. In addition, because symbol intervals between any two of the M primary synchronization signals and the secondary synchronization signal are different, the M symbol intervals between the M primary synchronization signals and the secondary synchronization signal are all different.

For example, M=2, N=1, and the synchronization signal block includes two PBCHs. FIG. 11A to FIG. 15F each are a schematic structural diagram of the synchronization signal block.

Figure 11A:
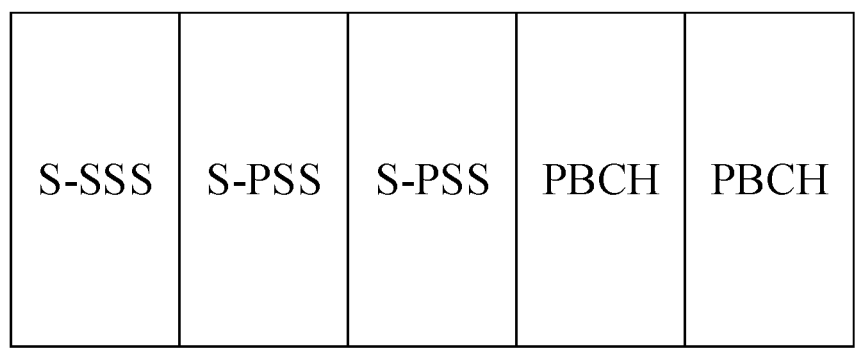
FIG. 11A to FIG. 11F each are a schematic structural diagram of a synchronization signal block according to an embodiment of this application.
Figure 11B:
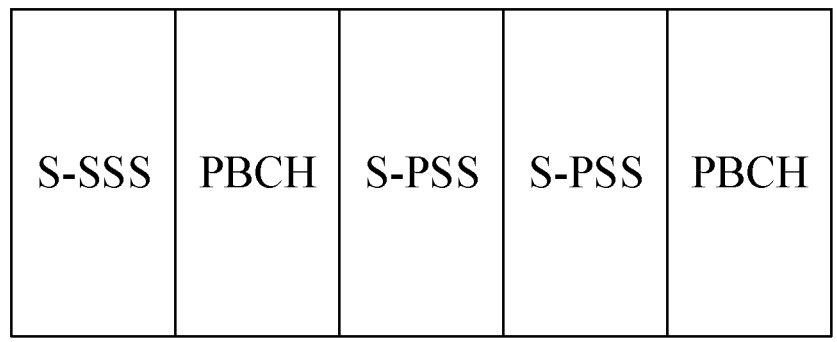
Figure 11C:
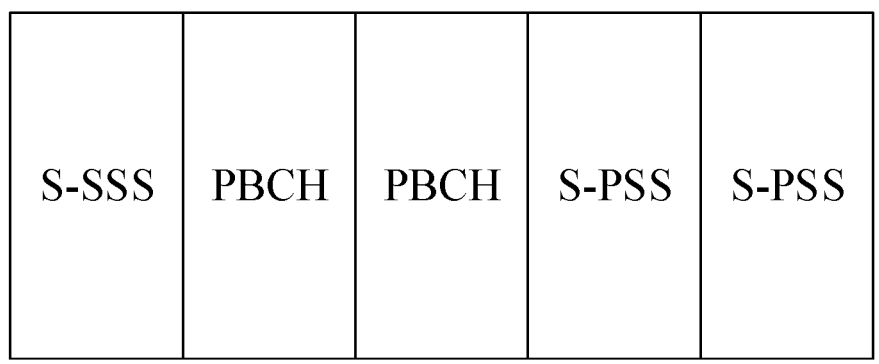
Figure 11D:
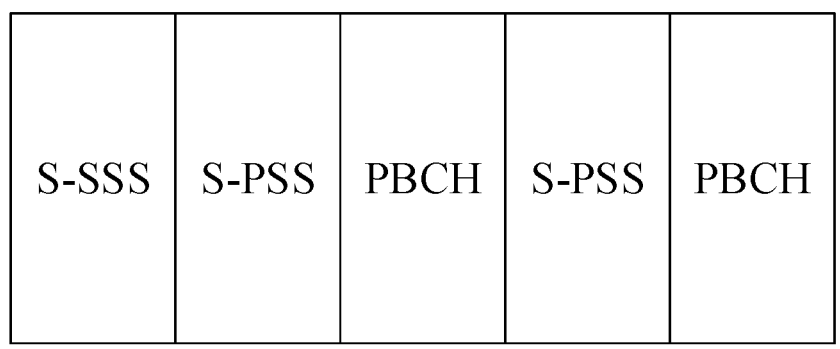
Figure 11E:
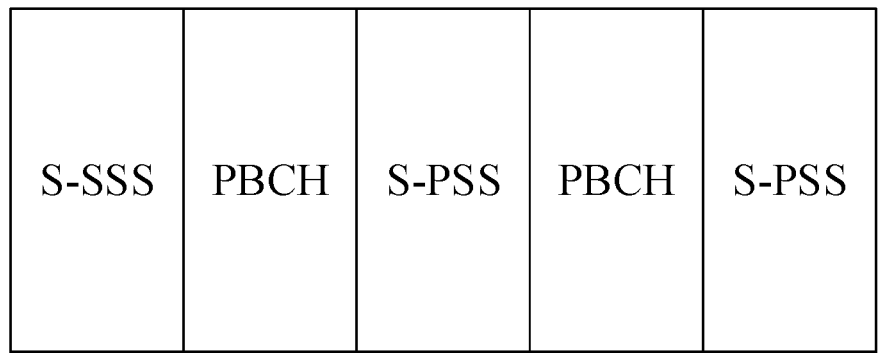
Figure 11F:
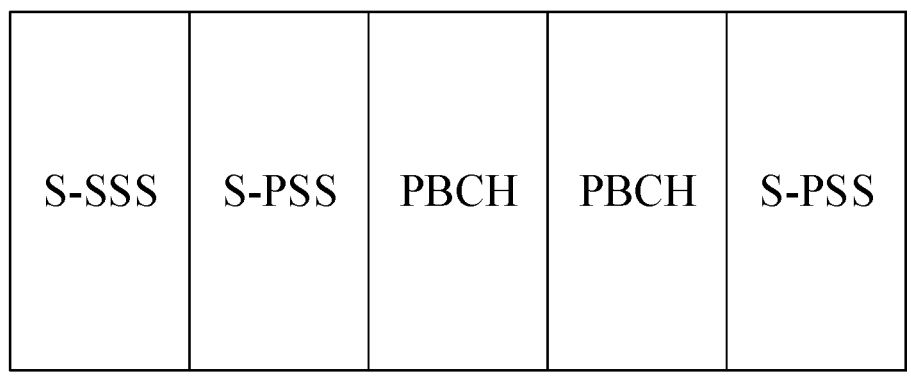

As shown in FIG. 11A to FIG. 11F, in S-SSBs shown in FIG. 11A to FIG. 11F, one secondary synchronization signal S-PSS is mapped to a first symbol location of the synchronization signal block. FIG. 11A is used as an example, in an S-SSB in FIG. 11A, an S-SSS is mapped to a first symbol location, and S-PSSs are mapped to a second symbol location and a third symbol location. In this case, there are two symbol intervals between the S-SSS at the first symbol location and the two S-PSSs, and the two symbol intervals are different (which are respectively 0 and 1). In addition, a symbol interval between a primary synchronization signal at the second symbol location and the secondary synchronization signal at the first symbol location is 0, and a symbol interval between a primary synchronization signal at the third symbol location and the secondary synchronization signal at the first symbol location is 1.

Figure 12A:
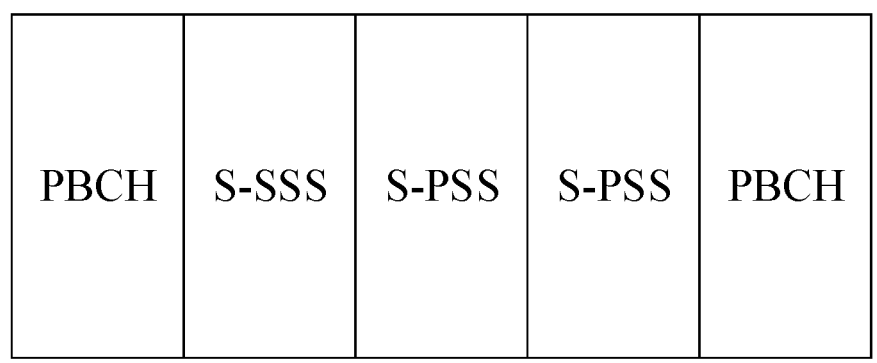
FIG. 12A to FIG. 12E each are a schematic structural diagram of a synchronization signal block according to an embodiment of this application.
Figure 12B:
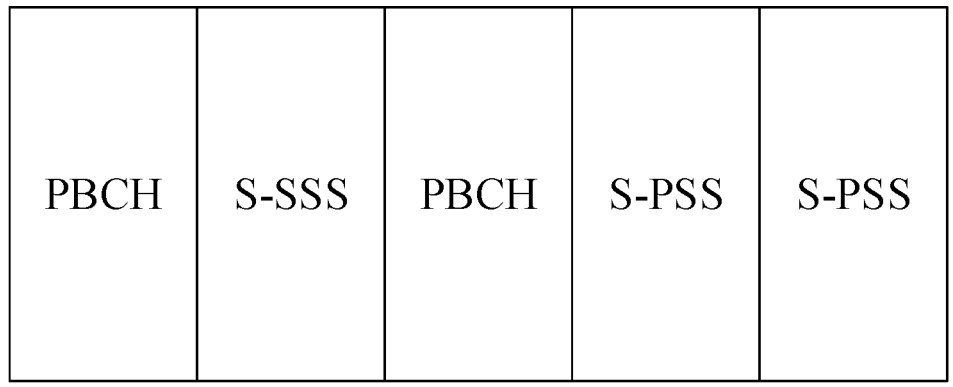
Figure 12C:
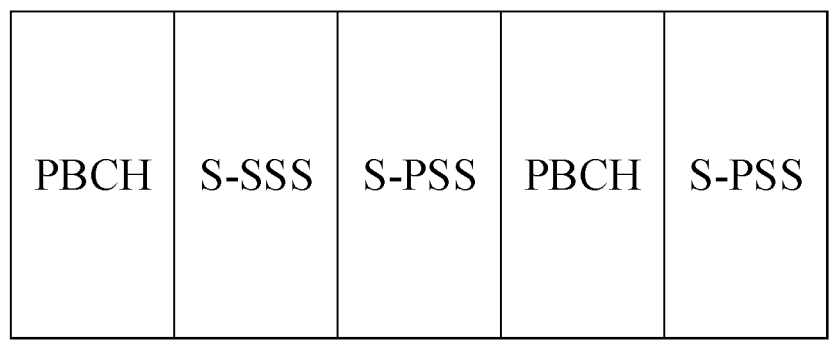
Figure 12D:
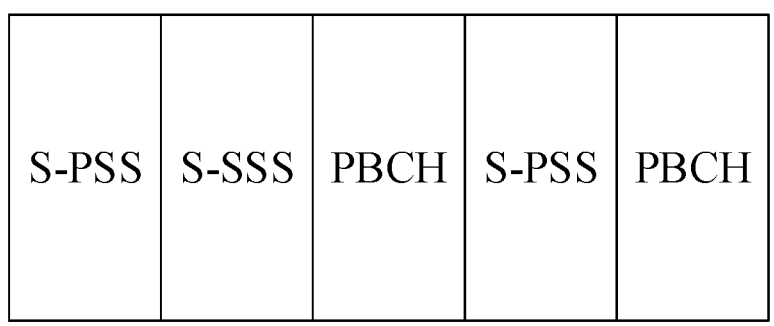
Figure 12E:
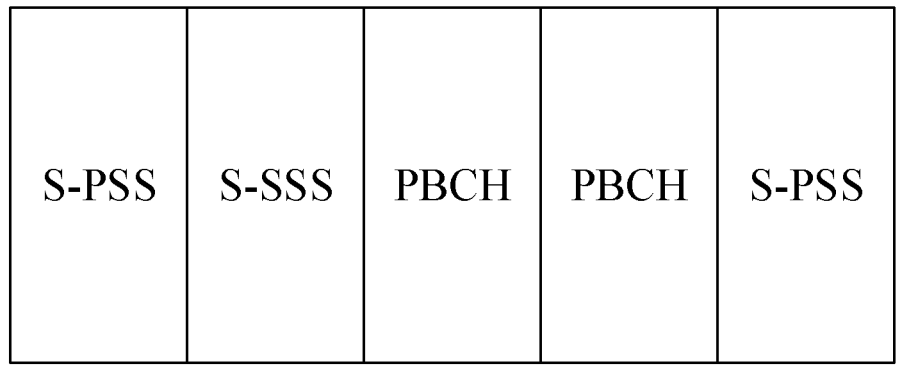
Figure 13A:
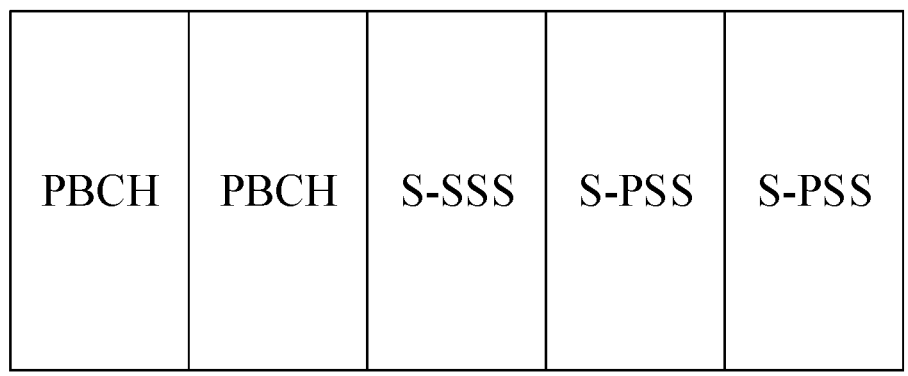
FIG. 13A to FIG. 13D each are a schematic structural diagram of a synchronization signal block according to an embodiment of this application.
Figure 13B:
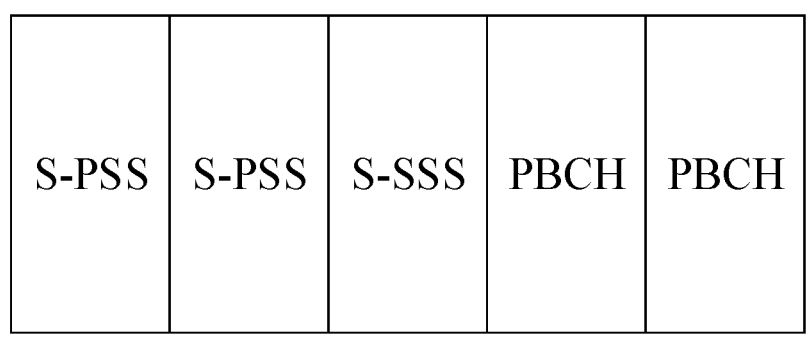
Figure 13C:
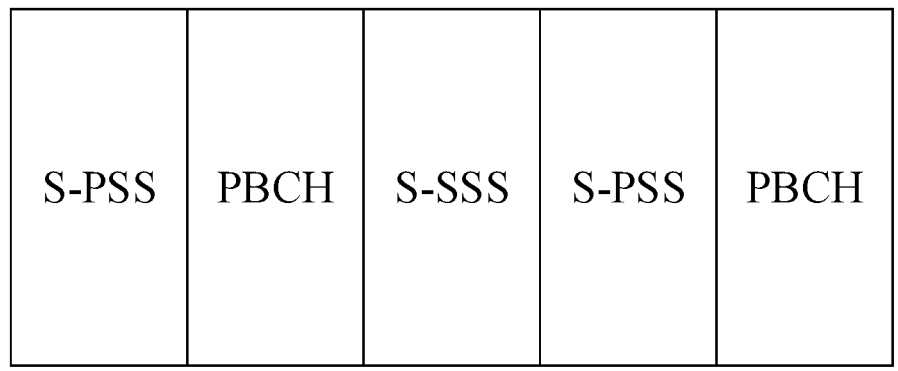
Figure 13D:
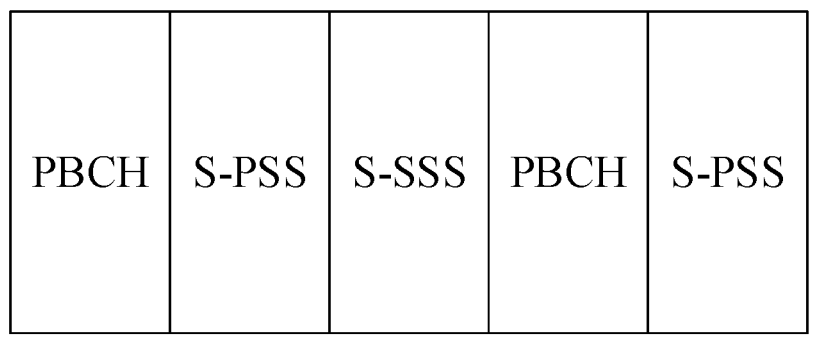
Figure 14A:
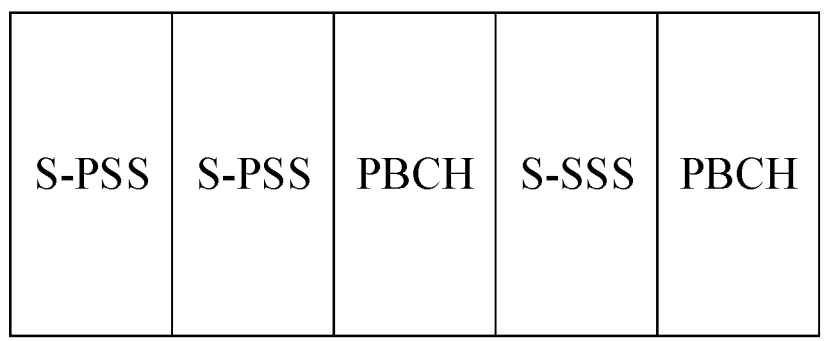
FIG. 14A to FIG. 14E each are a schematic structural diagram of a synchronization signal block according to an embodiment of this application.
Figure 14B:
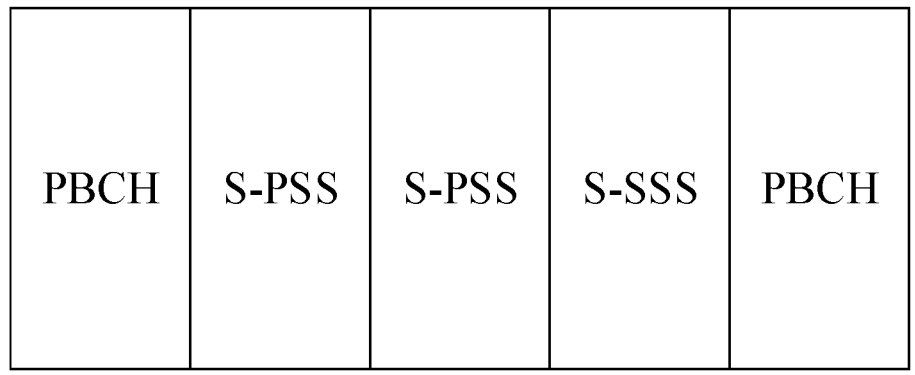
Figure 14C:
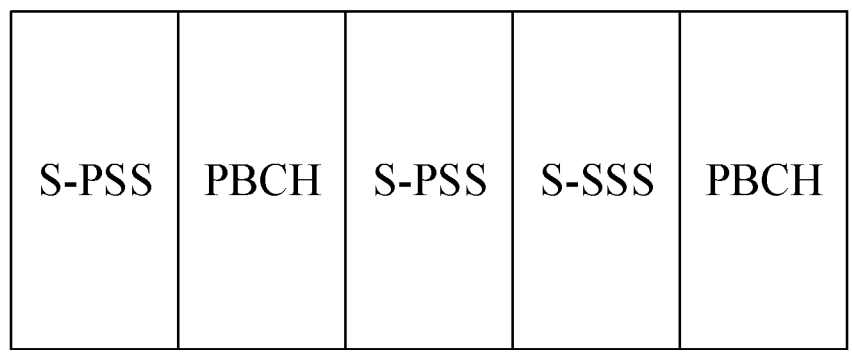
Figure 14D:
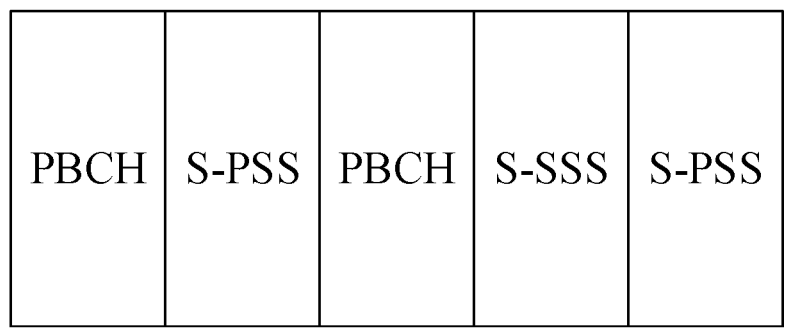
Figure 14E:
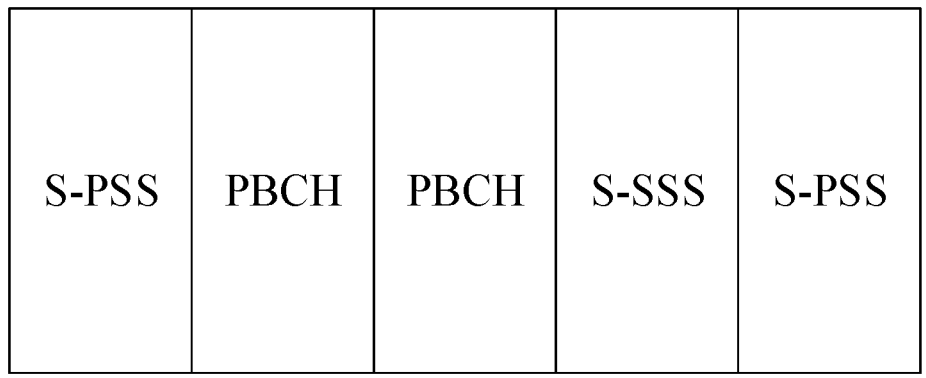
Figure 15A:
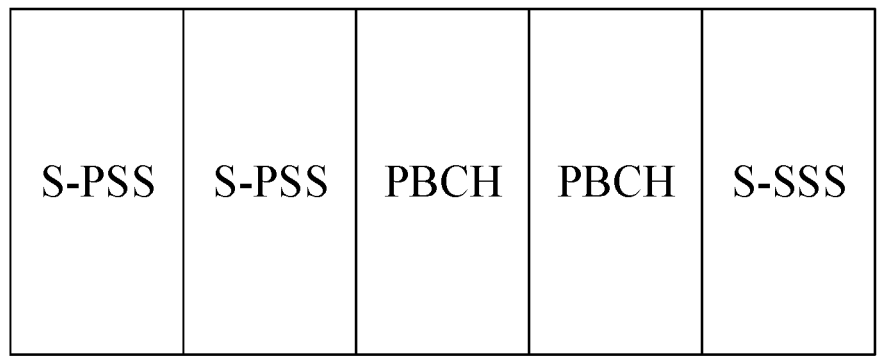
Figure 15B:
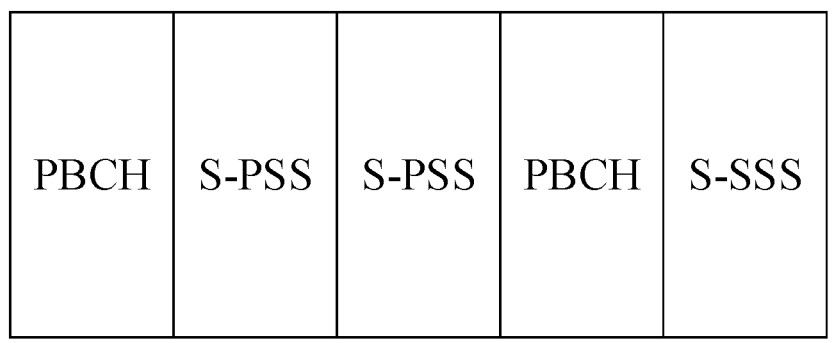
Figure 15F:
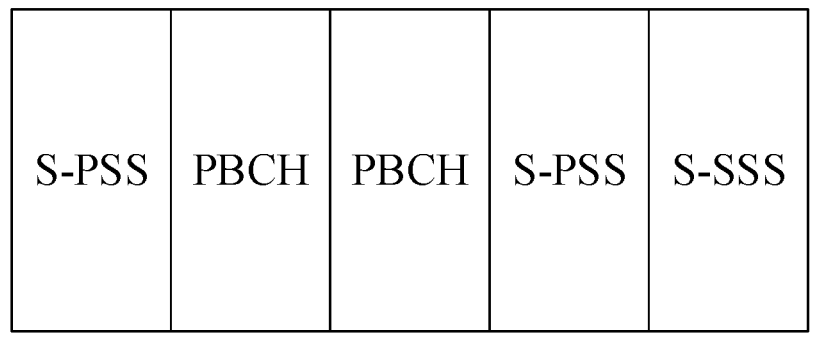
Figure 16A:
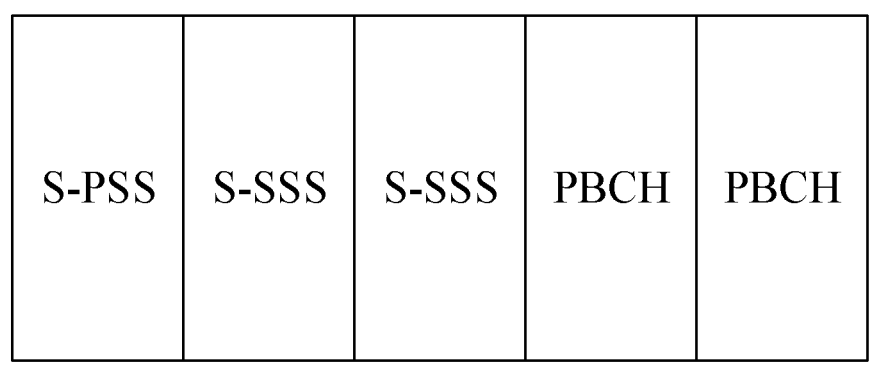
Figure 16B:
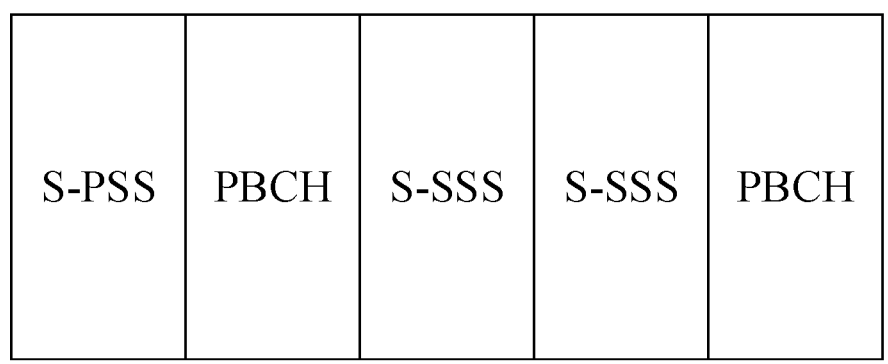
Figure 16F:
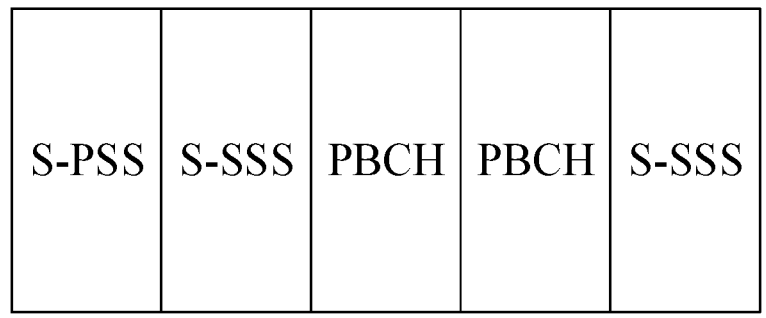
Figure 17A:
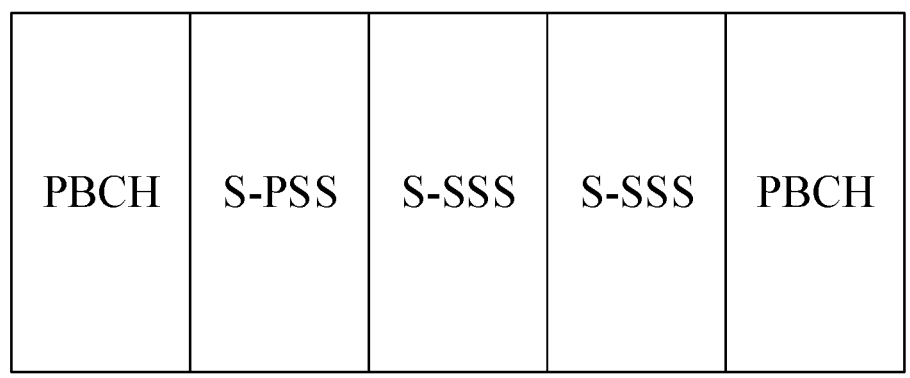
FIG. 17A to FIG. 17F each are a schematic structural diagram of a synchronization signal block according to an embodiment of this application.
Figure 17B:
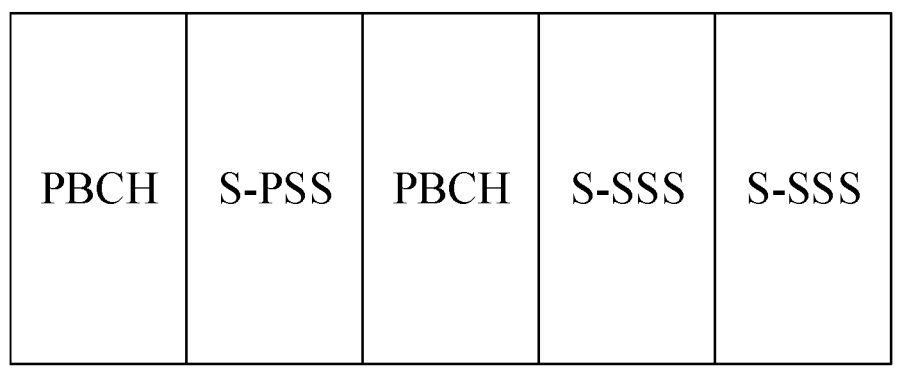
Figure 17C:
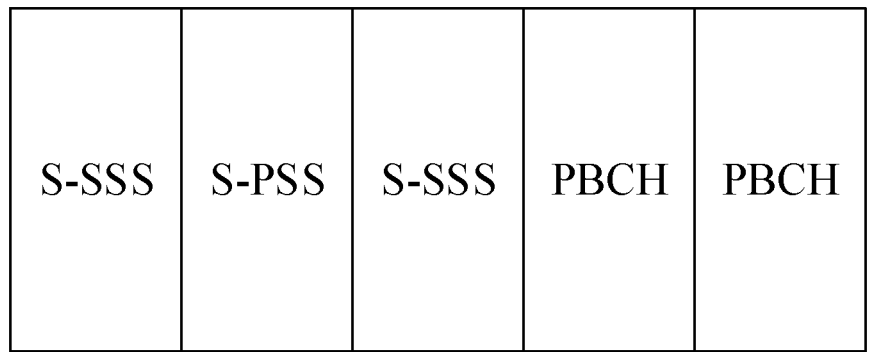
Figure 17D:
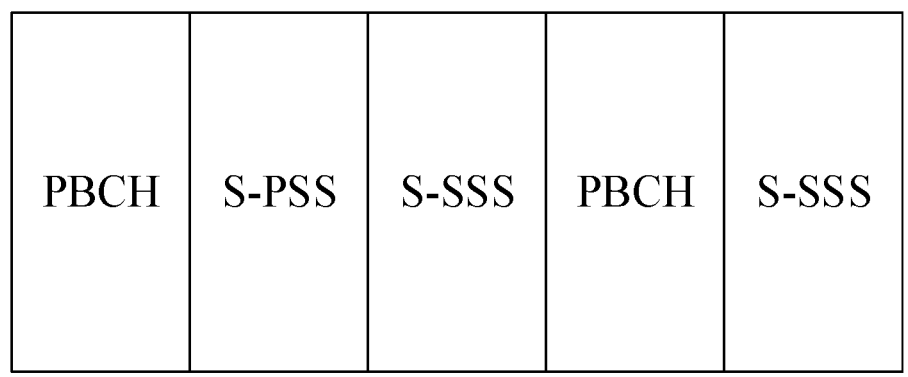
Figure 17E:
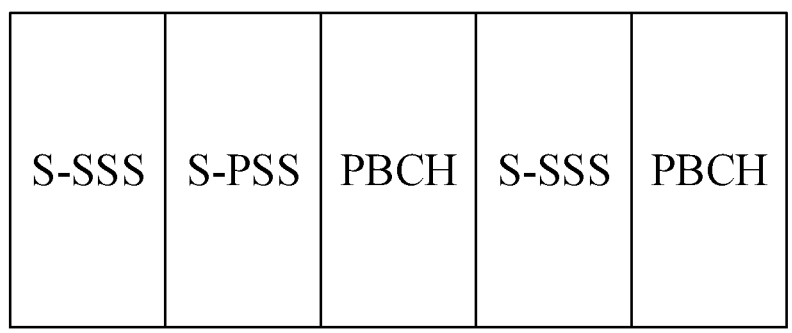
Figure 17F:
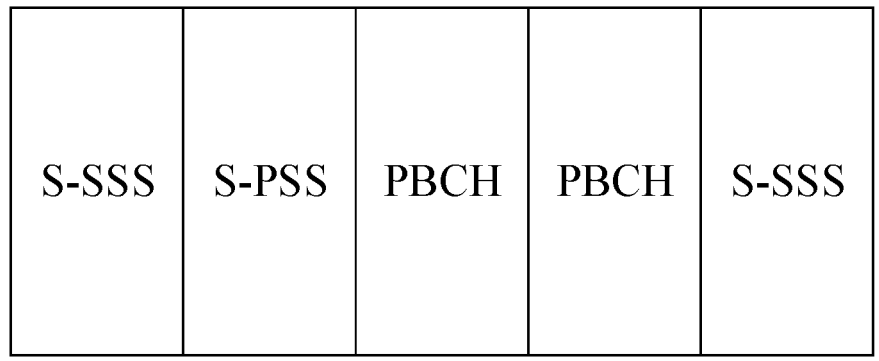
Figure 18A:
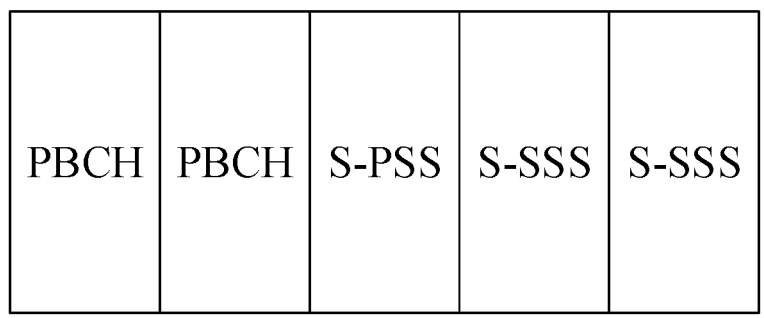
FIG. 18A to FIG. 18F each are a schematic structural diagram of a synchronization signal block according to an embodiment of this application.
Figure 18B:
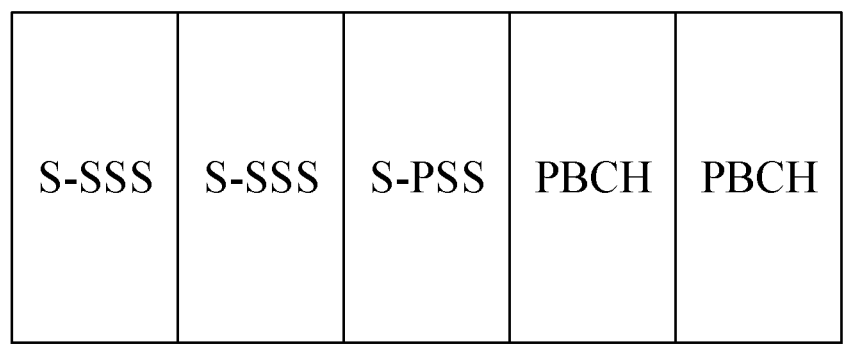
Figure 18C:
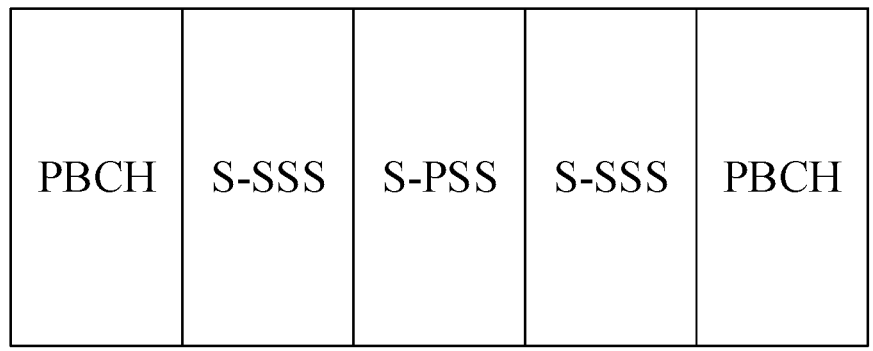
Figure 18D:
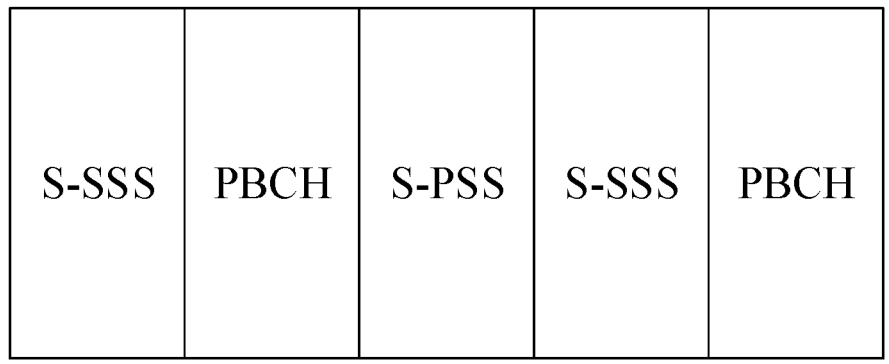
Figure 18E:
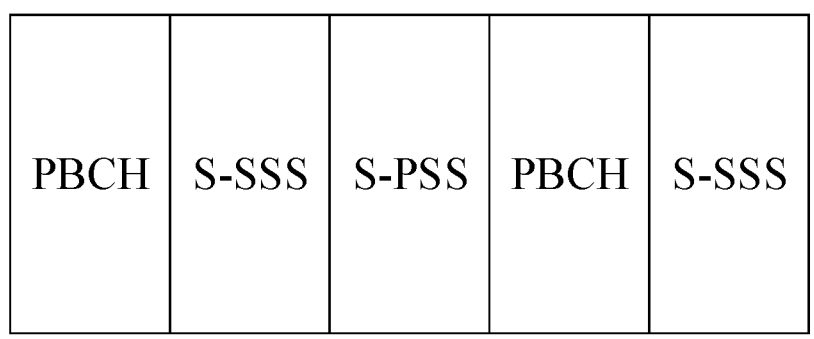
Figure 18F:
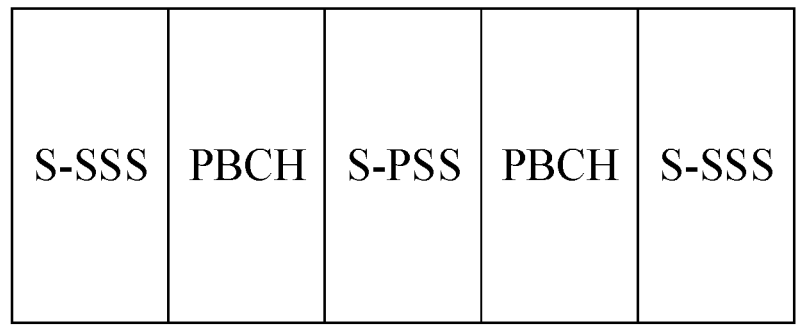
Figure 19A:
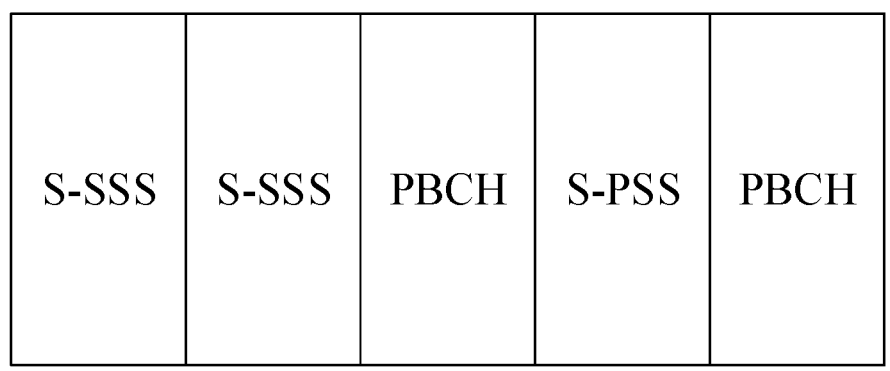
Figure 19B:
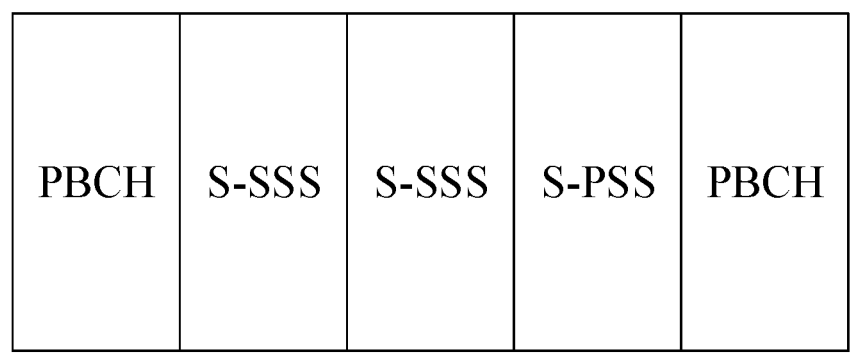
Figure 20F:
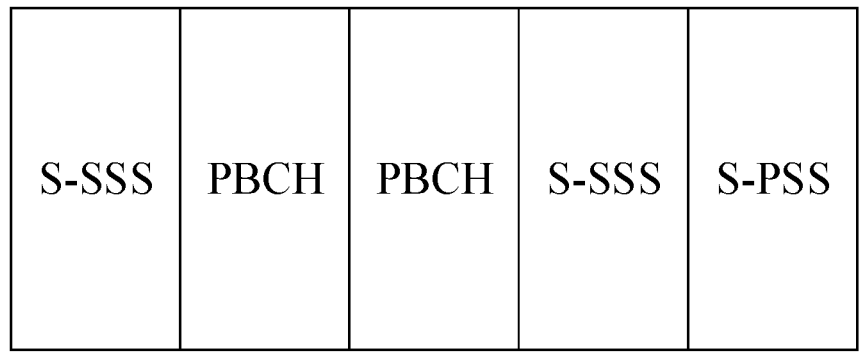

As shown in FIG. 12A to FIG. 12E, in S-SSBs shown in FIG. 12A to FIG. 12e, one secondary synchronization signal S-SSS is mapped to a second symbol location of the synchronization signal block. FIG. 12A is used as an example. In an S-SSB in FIG. 12A, an S-SSS is mapped to a second symbol location, and S-PSSs are mapped to a third symbol location and a fourth symbol location. In this case, there are two symbol intervals between the S-SSS at the second symbol location and the two S-PSSs, and the two symbol intervals are different (which are respectively 0 and 1). In addition, a symbol interval between a primary synchronization signal at the third symbol location and the secondary synchronization signal at the second symbol location is 0, and a symbol interval between a primary synchronization signal at the fourth symbol location and the secondary synchronization signal at the second symbol location is 1.

In some embodiments, symbols occupied by the M primary synchronization signals are before symbols occupied by the secondary synchronization signal.

In some embodiments, the synchronization signal block occupies consecutive symbols in time domain.

In some embodiments, structures of the synchronization signal blocks shown in FIG. 11A to FIG. 15F are used as an example. The synchronization signal blocks shown in FIG. 11A to FIG. 15F each occupy five consecutive symbols in time domain.

1002: The first terminal device sends the synchronization signal block.

In some embodiments, after generating the synchronization signal block, the first terminal device needs to send the synchronization signal block to a second terminal device.

1003: The second terminal device detects at least one primary synchronization signal and one secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, and symbol intervals between any two of the M primary synchronization signals and the secondary synchronization signal are different.

1004: The second terminal device determines a symbol location of each of the at least one primary synchronization signal based on a symbol interval between each of the at least one primary synchronization signal and the secondary synchronization signal.

In some embodiments, the synchronization signal block includes only the M primary synchronization signals and the secondary synchronization signal, where M is a positive integer greater than 1. In some embodiments, there are M symbol intervals between the M primary synchronization signals and the secondary synchronization signal. That is, there is one symbol interval between each secondary synchronization signal in the M primary synchronization signals and the secondary synchronization signal. In addition, because symbol intervals between any two of the M primary synchronization signals and the secondary synchronization signal are different, the M symbol intervals between the M primary synchronization signals and the secondary synchronization signal are all different. Therefore, each symbol interval corresponds to a unique primary synchronization signal. Therefore, the second terminal device may determine, based on the symbol interval between each of the at least one detected primary synchronization signal and the detected secondary synchronization signal, each of the at least one primary synchronization signal is which primary synchronization signal in the synchronization signal block. Because the second terminal device may pre-store a correspondence between the M primary synchronization signals in the synchronization signal block and M symbol locations, the second terminal device may determine the symbol location of each of the at least one primary synchronization signal based on the M primary synchronization signals and the M symbol locations.

In some embodiments, the synchronization signal block includes only the M primary synchronization signals and the secondary synchronization signal, where M is a positive integer greater than 1. After the first terminal device sends the synchronization signal block, the second terminal device blindly detects the primary synchronization signal and the secondary synchronization signal in the synchronization signal block.

The following uses M=2 as an example for description.

In some embodiments, if the second terminal device does not detect the two primary synchronization signals in the synchronization signal block, the second terminal device fails to perform detection.

If the second terminal device detects one primary synchronization signal and the secondary synchronization signal in the synchronization signal block, the second terminal device detects a symbol interval between the primary synchronization signal and the secondary synchronization signal. In some embodiments, if two symbol intervals between the two primary synchronization signals and the secondary synchronization signal in the synchronization signal block are different, each symbol interval corresponds to a unique primary synchronization signal. Therefore, the second terminal device may determine, based on a symbol interval between the primary synchronization signal and the secondary synchronization signal, the detected primary synchronization signal is which primary synchronization signal in the synchronization signal block. Because the second terminal device may pre-store a correspondence between the M primary synchronization signals in the synchronization signal block and M symbol locations, the second terminal device may determine a symbol location of the detected primary synchronization signal based on the M primary synchronization signals and the M symbol locations.

The synchronization signal block shown in FIG. 11A is used as an example for description. The second terminal device detects one S-PSS and one S-SSS. If the second terminal device detects that a symbol interval between the S-PSS and the S-SSS is 1, because in the synchronization signal block in FIG. 11A, only the symbol interval between the S-SSS at the first symbol location and the S-PSS at the third symbol location is 1, the second terminal device may determine that the detected S-PSS is the S-PSS at the third symbol location. If the second terminal device detects that a symbol interval between the S-PSS and the S-SSS is 0, because in the synchronization signal block in FIG. 11A, only a symbol interval between the S-SSS at the second symbol location and the S-PSS at the third symbol location is 1, the second terminal device may determine that the detected S-PSS is the S-PSS at the second symbol location.

In another embodiment, the synchronization signal block shown in FIG. 11A is used as an example. If the second terminal device detects only one S-PSS and one S-SSS in the synchronization signal block, the second network device may separately detect the S-SSS at symbol locations having a symbol interval of 0 and a symbol interval of 1 before the S-PSS. If the S-SSS is detected having a symbol location having the symbol interval of 0 before the S-PSS, the second terminal device may determine that the detected S-PSS is the S-PSS at the third symbol location. If an S-SSS is detected at a symbol location having the symbol interval of 1 before the S-PSS, the second terminal device may determine that the detected S-PSS is the S-PSS at the second symbol location.

If the second terminal device detects the two primary synchronization signals and the secondary synchronization signal in the synchronization signal block, the second terminal device may determine a symbol location of one primary synchronization signal based on a symbol interval between the secondary synchronization signal and the primary synchronization signal in the two detected primary synchronization signals.

Optionally, the second terminal device may alternatively determine symbol locations of the primary synchronization signals based on a time domain sequence of the two detected primary synchronization signals. For example, if the second terminal device detects a primary synchronization signal at a first symbol location and a primary synchronization signal at a second symbol location, the second terminal device may determine, based on a time domain sequence of the two detected primary synchronization signals (the primary synchronization signal at the first symbol location is before the primary synchronization signal at the second symbol location), that a primary synchronization signal that is earlier in time domain in the two detected primary synchronization signals is the primary synchronization signal at the first symbol location, and a primary synchronization signal that is later in time domain is the primary synchronization signal at the second symbol location.

Second, in some embodiments, the first terminal device generates the synchronization signal block, where the synchronization signal block includes only the M primary synchronization signals and the secondary synchronization signal, M is a positive integer greater than 1, and the symbol intervals between any two of the M primary synchronization signals and the secondary synchronization signal are different. The first terminal device sends the synchronization signal block. The second terminal device detects the at least one primary synchronization signal and the secondary synchronization signal, where the at least one primary synchronization signal and the secondary synchronization signal belong to the same synchronization signal block, the synchronization signal block includes only the M primary synchronization signals and the secondary synchronization signal, M is a positive integer greater than 1, and the symbol intervals between any two of the M primary synchronization signals and the secondary synchronization signal are different. The second terminal device determines the symbol location of each of the at least one primary synchronization signal based on the symbol interval between each of the at least one primary synchronization signal and the secondary synchronization signal. In the foregoing manner, when a terminal device detects only one S-PSS and one S-SSS, because symbol interval sets corresponding to all primary synchronization signals do not include a same symbol interval, the terminal device may accurately determine a symbol location of the S-PSS based on a detected symbol interval between the S-PSS and the S-SSS.

Figure 21:
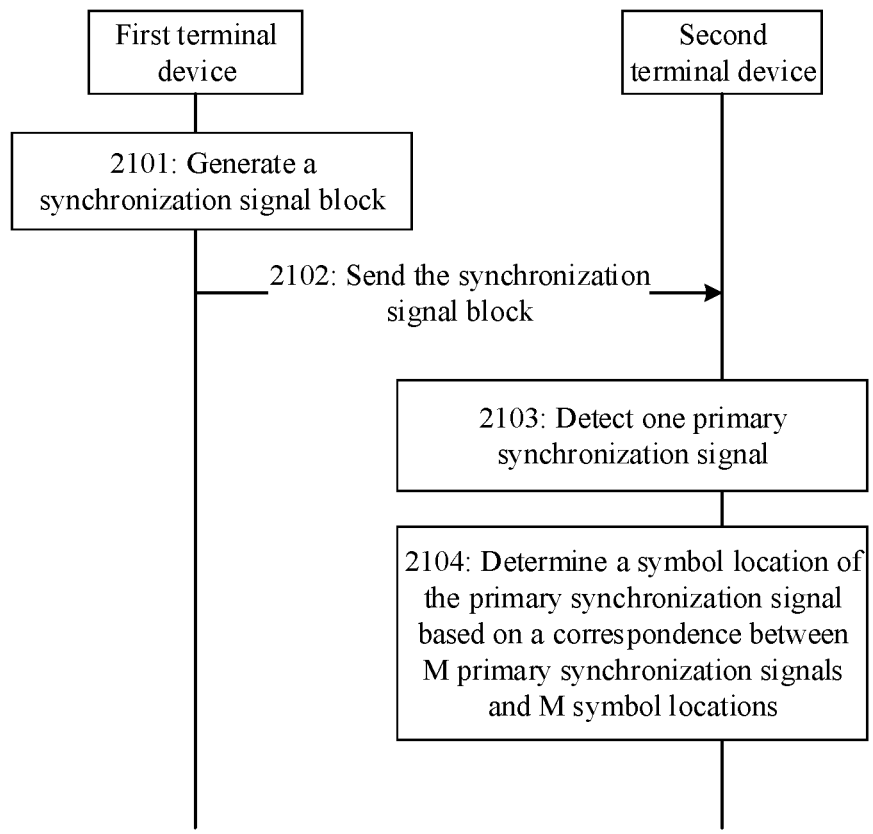
FIG. 21 is a schematic diagram of a synchronization signal transmission method according to an embodiment of this application.

FIG. 21 is a schematic diagram of a synchronization signal transmission method according to an embodiment of this application. As shown in FIG. 21, the synchronization signal transmission method provided in this embodiment of this application includes the following steps.

2101: A first terminal device generates a synchronization signal block, where the synchronization signal block includes only M primary synchronization signals and N secondary synchronization signals, a value of M is 1 and N is a positive integer greater than 1, and the M primary synchronization signals correspond to M symbol locations.

In some embodiments, the first terminal device generates the synchronization signal block, where the synchronization signal block includes only the primary synchronization signal and the N secondary synchronization signals. In time domain, the primary synchronization signal is mapped to one symbol of the synchronization signal block, the primary synchronization signal corresponds to one symbol location, and the N secondary synchronization signals are mapped to N symbols of the synchronization signal block.

For example, N=2, and the synchronization signal block includes two PBCHs. FIG. 16A to FIG. 20F each are a schematic structural diagram of the synchronization signal block.

In some embodiments, a symbol occupied by the primary synchronization signal is before symbols occupied by the N secondary synchronization signals.

In some embodiments, the synchronization signal block occupies consecutive symbols in time domain.

In some embodiments, structures of the synchronization signal blocks shown in FIG. 16A to FIG. 20F are used as an example. The synchronization signal blocks shown in FIG. 16A to FIG. 20F each occupy five consecutive symbols in time domain.

2102: The first terminal device sends the synchronization signal block.

In some embodiments, after generating the synchronization signal block, the first terminal device needs to send the synchronization signal block to a second terminal device.

2103: The second terminal device detects a primary synchronization signal, where the primary synchronization signal belongs to a synchronization signal block, the synchronization signal block includes only M primary synchronization signals and N secondary synchronization signals, a value of M is 1 and N is a positive integer greater than 1, and the M primary synchronization signals correspond to M symbol locations.

2104: The second terminal device determines a symbol location of the primary synchronization signal based on a correspondence between the M primary synchronization signals and the M symbol locations.

In some embodiments, if the second terminal device does not detect the primary synchronization signal in the synchronization signal block, the second terminal device fails to perform detection.

If the second terminal device detects only the primary synchronization signal and one secondary synchronization signal in the synchronization signal block, because the synchronization signal block includes only one primary synchronization signal, and the primary synchronization signal corresponds to the symbol location, the second terminal device may directly determine the symbol location of the detected primary synchronization signal based on a correspondence between the primary synchronization signal and the symbol location.

Second, in some embodiments, the first terminal device generates the synchronization signal block, where the synchronization signal block includes only the M primary synchronization signals and the N secondary synchronization signals, the value of M is 1 and N is a positive integer greater than 1, and the M primary synchronization signals correspond to the M symbol locations. The first terminal device sends the synchronization signal block. The second terminal device detects the primary synchronization signal, where the primary synchronization signal belongs to the synchronization signal block, the synchronization signal block includes only the M primary synchronization signals and the N secondary synchronization signals, the value of M is 1 and N is a positive integer greater than 1, and the M primary synchronization signals correspond to the M symbol locations. The second terminal device determines the symbol location of the primary synchronization signal based on the correspondence between the M primary synchronization signals and the M symbol locations. In the foregoing manner, when a terminal device detects only one S-PSS and only one S-SSS, because a primary synchronization signal block includes only one S-PSS, the terminal device may accurately determine a symbol location of the S-PSS based on a correspondence between the detected S-PSS and the symbol location.

Figure 22:
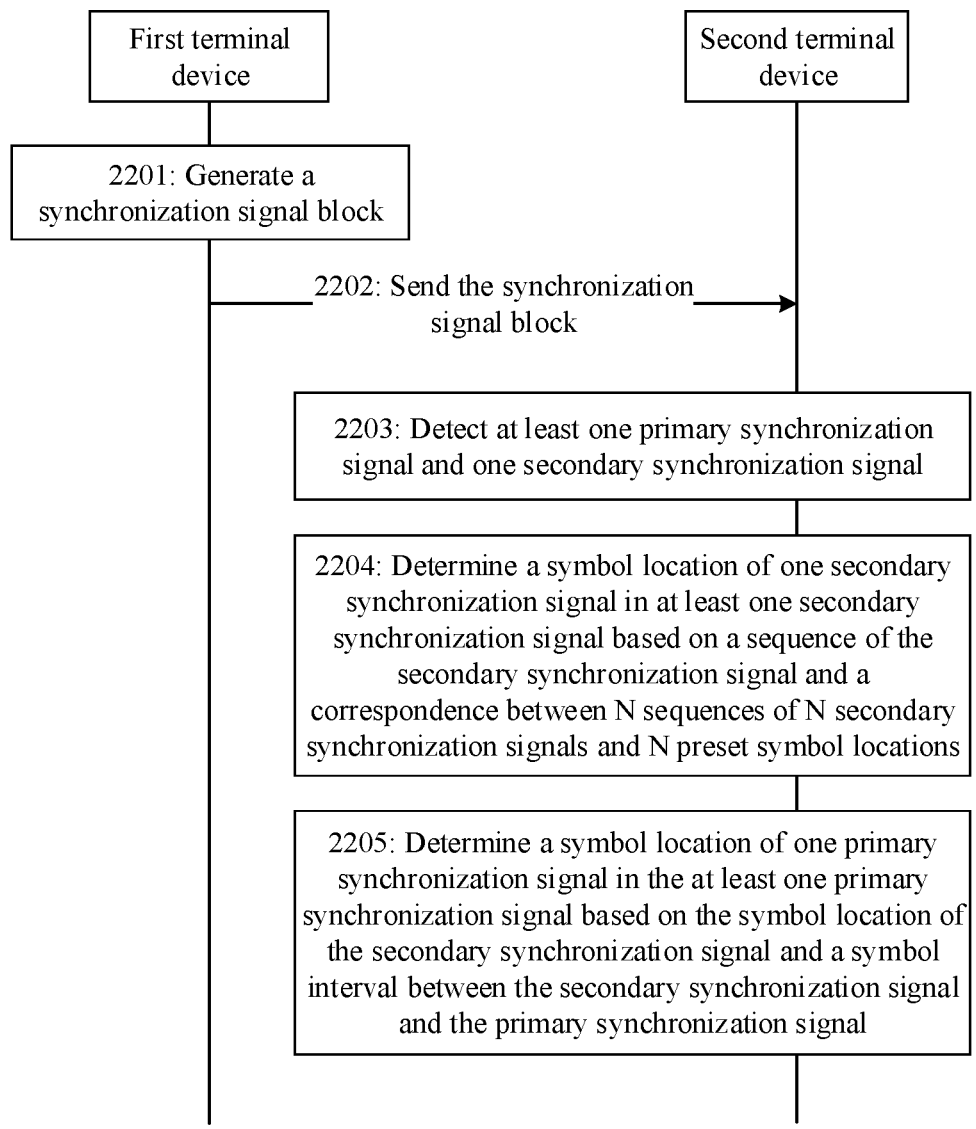
FIG. 22 is a schematic diagram of a synchronization signal transmission method according to an embodiment of this application.

FIG. 22 is a schematic diagram of a synchronization signal transmission method according to an embodiment of this application. As shown in FIG. 22, the synchronization signal transmission method provided in this embodiment of this application includes the following steps.

2201: A first terminal device generates a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2.

In some embodiments, the first terminal device generates the synchronization signal block, where the synchronization signal block includes the M primary synchronization signals and the N secondary synchronization signals. In time domain, the M primary synchronization signals are mapped to M symbols of the synchronization signal block, and the N secondary synchronization signals are mapped to N symbols of the synchronization signal block. The M primary synchronization signals correspond to the M symbol interval sets. Each of the M primary synchronization signals corresponds to the symbol interval set in the M symbol interval sets, and the symbol interval set in the M symbol interval sets includes the N symbol intervals between the primary synchronization signal in the M primary synchronization signals and the N secondary synchronization signals.

In some embodiments, at least two symbol interval sets in the M symbol interval sets include a same symbol interval. In a representation manner, an intersection of the at least two symbol interval sets in the M symbol interval sets is not an empty set. In another representation manner, the at least two symbol interval sets in the M symbol interval sets include repeated symbol intervals.

For example, if the synchronization signal block includes two primary synchronization signals (a primary synchronization signal A and a primary synchronization signal B), and the synchronization signal block includes two secondary synchronization signals (a secondary synchronization signal A and a secondary synchronization signal B), the two primary synchronization signals correspond to two symbol interval sets (a symbol interval set A and a symbol interval set B), either of the two primary synchronization signals corresponds to one symbol interval set in the two symbol interval sets, the primary synchronization signal A corresponds to the symbol interval set A, and the primary synchronization signal B corresponds to the symbol interval set B. Each symbol interval set includes two symbol intervals between one primary synchronization signal and the two secondary synchronization signals. That is, the symbol interval set A includes two symbol intervals (a symbol interval A1 between the primary synchronization signal A and the secondary synchronization signal A and a symbol interval A2 between the primary synchronization signal A and the secondary synchronization signal B). The symbol interval set B includes two symbol intervals (a symbol interval B1 between the primary synchronization signal B and the secondary synchronization signal A and a symbol interval B2 between the primary synchronization signal B and the secondary synchronization signal B). In addition, the symbol interval set A and the symbol interval set B include a same symbol interval. That is, the symbol interval A1 is equal to the symbol interval B1, or the symbol interval A1 is equal to the symbol interval B2, or the symbol interval A2 is equal to the symbol interval B1, or the symbol interval A2 is equal to the symbol interval B2.

For example, M=2, N=2, and the synchronization signal block includes two PBCHs. FIG. 23A to FIG. 26B each are a schematic structural diagram of the synchronization signal block.

As shown in S-SSBs in FIG. 23A to FIG. 23L, two primary synchronization signals S-PSSs are mapped to consecutive symbols. FIG. 23A is used as an example. In an S-SSB in FIG. 23A, S-PSSs are mapped to a first symbol location and a second symbol location, and S-SSSs are mapped to a fourth symbol location and a fifth symbol location. In this case, a symbol interval set corresponding to an S-PSS at the first symbol location is {3, 4}, and a symbol interval set corresponding to an S-PSS at the second symbol location is {2, 3}. That is, the symbol interval set corresponding to the S-PSS at the first symbol location and the symbol interval set corresponding to the S-PSS at the second symbol location include a same symbol interval (3). In other words, a symbol interval between the S-PSS at the first symbol location and an S-SSS at the fourth symbol location is equal to a symbol interval between the S-PSS at the second symbol location and an S-SSS at the fifth symbol location.

Figure 24D:
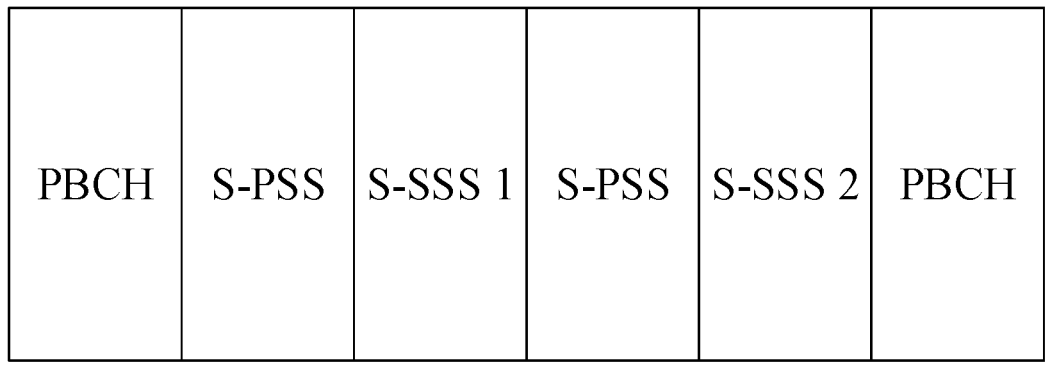
Figure 24E:
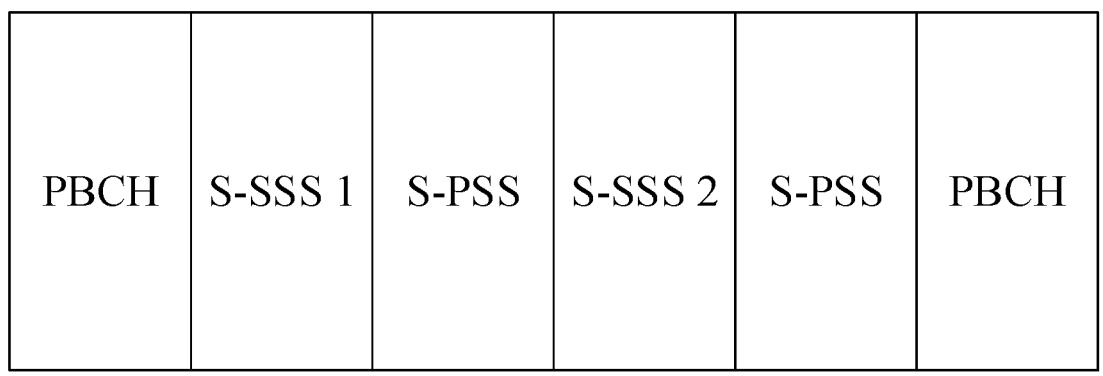
Figure 24F:
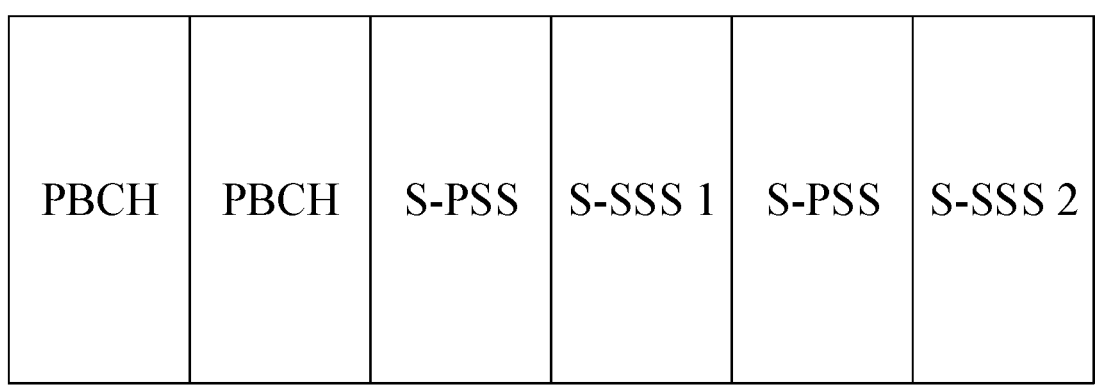
Figure 26B:
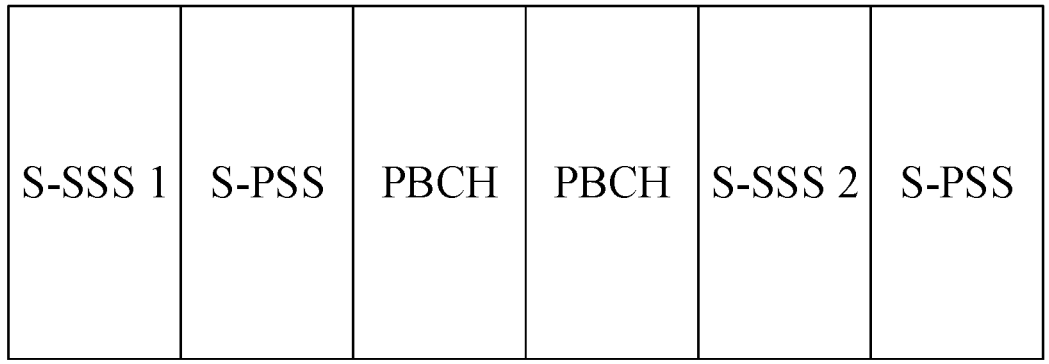

FIG. 24A is used as an example. In an S-SSB in FIG. 24A, S-PSSs are mapped to a first symbol location and a third symbol location, and S-SSSs are mapped to a second symbol location and a fourth symbol location. In this case, a symbol interval set corresponding to an S-PSS at the first symbol location is {0, 2}, and a symbol interval set corresponding to an S-PSS at the third symbol location is {0, 0}. In this case, the symbol interval set corresponding to the S-PSS at the first symbol location and a symbol interval set corresponding to an S-PSS at the second symbol location include a same symbol interval (0).

It should be noted that, in some embodiments, any two of the M symbol interval sets include a same symbol interval, and one symbol interval set may also include a same symbol interval.

As shown in S-SSBs in FIG. 25A to FIG. 25F, a symbol interval between two primary synchronization signals S-PSSs is 2. FIG. 25A is used as an example. In an S-SSB in FIG. 25A, S-PSSs are mapped to a first symbol location and a fourth symbol location, and S-SSSs are mapped to a second symbol location and a fifth symbol location. In this case, a symbol interval set corresponding to an S-PSS at the first symbol location is {0, 2}, and a symbol interval set corresponding to an S-PSS at the fourth symbol location is {0, 1}. That is, the symbol interval set corresponding to the S-PSS at the first symbol location and the symbol interval set corresponding to the S-PSS at the fourth symbol location include a same symbol interval (0).

In another embodiment, at least two symbol interval sets in the M symbol interval sets do not include a same symbol interval. In a representation manner, an intersection of the at least two symbol interval sets in the M symbol interval sets is an empty set. In another representation manner, the at least two symbol interval sets in the M symbol interval sets do not include repeated symbol intervals.

In some embodiments, sequences of any two of the N secondary synchronization signals are different.

Specifically, a secondary synchronization signal S-SSS sequence c (n) is a gold sequence, and is constructed by adding two M sequences that separately use $i_1$ and $i_2$ as cyclic shifts, where $i_1$ and $i_2$ may be generated by using the following generation formulas:

$$i_1 = \left(3 \times \frac{NID1}{112} + NID2\right) * 5; \text{ and}$$

$$i_2 = \mod(NID1, 112).$$

The NID 1 is a physical layer cell identification group, NID 1=(0, . . . , or 335), the NID 2 is identification in a group, NID 2=(0, . . . , or 2), and mod represents a modulo operation.

The S-SSS sequence c(n) may be generated by using the following generation formula:

$$c(n) = \mod((x_0(n+i_1) + x_1(n+i_2)), 2)$$

$x_0(n)$ and $x_1(n)$ are M sequences, SID=3*NID 1+NID 2, the SID is a sidelink synchronization identifier, and SID=(0, . . . , or 1007).

In some embodiments, two different S-SSS sequences may be generated by using the following formulas:

$$c_1(n) = \mod((x_0(n+i_1) + x_1(n+i_2)), 2); \text{ and}$$

$$c_2(n) = \mod((x_0(n+i_2) + x_1(n+i_1)), 2)$$

Generator polynomials of a linear feedback shift register used for generating the two M sequences $x_0(n)$ and $x_1(n)$ are the same as formulas for generating an SSS in NR:

$$x_0(i+7) = \mod((x_0(i+4) + x_0(i)), 2); \text{ and}$$

$$x_1(i+7) = \mod((x_1(i+1) + x_1(i)), 2)$$

Initial values of the generator polynomials may be the following initial values:

$$[x_0(6)x_0(5)x_0(4)x_0(3)x_0(2)x_0(1)x_0(0)] = [0\ 0\ 0\ 0\ 0\ 0\ 1];$$

and $$[x_1(6)x_1(5)x_1(4)x_1(3)x_1(2)x_1(1)x_1(0)] = [0\ 0\ 0\ 0\ 0\ 0\ 1].$$

It should be noted that the synchronization signal block may further include a PBCH.

In some embodiments, symbols occupied by the M primary synchronization signals are before symbols occupied by the N secondary synchronization signals.

In some embodiments, the synchronization signal block occupies consecutive symbols in time domain.

In some embodiments, structures of the synchronization signal blocks shown in FIG. 23A to FIG. 26B are used as an example. The synchronization signal blocks shown in FIG. 23A to FIG. 26B each occupy six consecutive symbols in time domain.

2202: The first terminal device sends the synchronization signal block.

In some embodiments, after generating the synchronization signal block, the first terminal device needs to send the synchronization signal block to a second terminal device.

2203: The second terminal device detects at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2.

2204: The second terminal device determines a symbol location of a secondary synchronization signal in the at least one secondary synchronization signal based on a sequence of the secondary synchronization signal in the at least one secondary synchronization signal and a correspondence between the N sequences of the N secondary synchronization signals and the N preset symbol locations.

2205: The second terminal device determines a symbol location of each of the at least one primary synchronization signal based on the symbol location of the secondary synchronization signal in the at least one secondary synchronization signal and a symbol interval between the secondary synchronization signal in the at least one secondary synchronization signal and each of the at least one primary synchronization signal.

In some embodiments, after the first terminal device sends the synchronization signal block, the second terminal device blindly detects the primary synchronization signal and the secondary synchronization signal in the synchronization signal block. It should be noted that a quantity of primary synchronization signals detected by the second terminal device may be equal to M, or may be less than M, and a quantity of secondary synchronization signals detected by the second terminal device may be equal to N, or may be less than N.

In some embodiments, the second terminal device determines a symbol location of the sequence of the secondary synchronization signal in the at least one secondary synchronization signal based on the sequence of the secondary synchronization signal in the at least one secondary synchronization signal and the correspondence between the N sequences of the N secondary synchronization signals and the N preset symbol locations. The second terminal device determines the symbol location of each of the at least one primary synchronization signal based on the symbol location of the secondary synchronization signal in the at least one secondary synchronization signal and the symbol interval between the secondary synchronization signal in the at least one secondary synchronization signal and each of the at least one primary synchronization signal.

In a scenario in which the at least two symbol interval sets in the M symbol interval sets include the same symbol interval, because the sequences of any two of the N secondary synchronization signals are different, and the N sequences of the N secondary synchronization signals correspond to the N symbol locations, the second terminal device may determine the symbol location of the secondary synchronization signal in the at least one secondary synchronization signal based on the sequence of the secondary synchronization signal in the at least one secondary synchronization signal and the correspondence between the N sequences of the N secondary synchronization signals and the N preset symbol locations. Because M symbol intervals between each secondary synchronization signal and the M primary synchronization signals are different, the second terminal device determines a symbol location of one primary synchronization signal in at least one primary synchronization signal based on the symbol location of the secondary synchronization signal in the at least one secondary synchronization signal and a symbol interval between the secondary synchronization signal and the primary synchronization signal.

The following describes this embodiment by using an example in which M is equal to 2 and N is equal to 2.

In some embodiments, after the first terminal device sends the synchronization signal block, the second terminal device blindly detects the primary synchronization signal and the secondary synchronization signal in the synchronization signal block.

In some embodiments, if the second terminal device does not detect the two primary synchronization signals in the synchronization signal block, the second terminal device fails to perform detection.

If the second terminal device detects only one primary synchronization signal and one secondary synchronization signal in the synchronization signal block, the second terminal device detects a sequence of the detected secondary synchronization signal, and determines a symbol location of the detected secondary synchronization signal based on the sequence of the secondary synchronization signal. The second terminal device detects a symbol interval between the detected secondary synchronization signal and the detected primary synchronization signal, and determines a symbol location of the detected primary synchronization signal based on the symbol interval between the detected secondary synchronization signal and the detected primary synchronization signal.

The synchronization signal block shown in FIG. 23A is used as an example for description. The second terminal device detects one S-PSS and one S-SSS, and the second terminal device detects that a sequence of the S-SSS is a sequence of an S-SSS 1. Therefore, the second terminal device may determine that the detected S-SSS is the S-SSS 1 at the fifth symbol location. If the second terminal device detects that a symbol interval between the S-PSS and the S-SSS 1 is 3, because in the synchronization signal block in FIG. 23A, only a symbol interval between the S-PSS at the first symbol location and the S-SSS 1 at the fifth symbol location is 3, the second terminal device may determine that the detected S-PSS is the S-PSS at the first symbol location.

In another embodiment, the synchronization signal block shown in FIG. 23A is used as an example for description. If the second terminal device detects only one S-PSS in the synchronization signal block, the second network device may separately detect an S-SSS at symbol locations having a symbol interval of 2, a symbol interval of 3, and a symbol interval of 4 after the S-PSS. If the S-SSS is detected at a symbol location having the symbol interval of 2 after the S-PSS, the second terminal device may determine that the detected S-PSS is the S-PSS at the first symbol location. If a sequence of an S-SSS 1 is detected at a symbol location having the symbol interval of 3 after the S-PSS, the second terminal device may determine that the detected S-PSS is the S-PSS at the first symbol location. If a sequence of an S-SSS 2 is detected at a symbol location having the symbol interval of 3 after the S-PSS, the second terminal device may determine that the detected S-PSS is the S-PSS at the second symbol location. If the S-SSS is detected at a symbol location having the symbol interval of 4 after the S-PSS, the second terminal device may determine that the detected S-PSS is the S-PSS at the first symbol location.

In another embodiment, the synchronization signal block shown in FIG. 23A is used as an example for description. The second terminal device detects one S-PSS and one S-SSS. If the second terminal device detects that a symbol interval between the S-PSS and the S-SSS is 3, in the synchronization signal block in FIG. 23A, a symbol interval between the S-PSS at the first symbol location and the S-SSS at the fifth symbol location is 3, and a symbol interval between the S-PSS at the second symbol location and an S-SSS at a sixth symbol location is 3, the second terminal device may detect a sequence of the S-SSS. If the second terminal device detects a sequence of an S-SSS 1, it the second terminal device may determine that the detected S-PSS is the S-PSS at the first symbol location. If the second terminal device detects a sequence of an S-SSS 2, the second terminal device may determine that the detected S-PSS is the S-PSS at the second symbol location.

In a scenario in which the at least two symbol interval sets in the M symbol interval sets do not include the same symbol interval, because each of the M primary synchronization signals in the synchronization signal block corresponds to the symbol interval set, the symbol interval set in the M symbol interval sets includes the N symbol intervals between the primary synchronization signal in the M primary synchronization signals and the N secondary synchronization signals, and any two of the M symbol interval sets do not include a same symbol interval, each symbol interval corresponds to a unique symbol interval set. In addition, a symbol interval set further corresponds to a unique primary synchronization signal. Therefore, the second terminal device may determine, based on a symbol interval between the primary synchronization signal in the at least one detected primary synchronization signal and one secondary synchronization signal in the at least one detected secondary synchronization signal, the primary synchronization signal in the at least one primary synchronization signal is which primary synchronization signal in the synchronization signal block. Because the second terminal device may pre-store the correspondence between the M primary synchronization signals in the synchronization signal block and M symbol locations, the second terminal device may determine the symbol location of the primary synchronization signal in the at least one primary synchronization signal based on the M primary synchronization signals and the M symbol locations.

Second, in some embodiments, the first terminal device generates the synchronization signal block, where the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, the sequences of any two of the N secondary synchronization signals are different, the N sequences of the N secondary synchronization signals correspond to the N symbol locations, and M and N are positive integers greater than or equal to 2. The first terminal device sends the synchronization signal block. The second terminal device detects the at least one primary synchronization signal and the at least one secondary synchronization signal, where the at least one primary synchronization signal and the at least one secondary synchronization signal belong to the same synchronization signal block, the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, the sequences of any two of the N secondary synchronization signals are different, the N sequences of the N secondary synchronization signals correspond to the N symbol locations, and M and N are positive integers greater than or equal to 2. The second terminal device determines the symbol location of the secondary synchronization signal in the at least one secondary synchronization signal based on the sequence of the secondary synchronization signal in the at least one secondary synchronization signal and the correspondence between the N sequences of the N secondary synchronization signals and the N preset symbol locations. The second terminal device determines the symbol location of each of the at least one primary synchronization signal based on the symbol location of the secondary synchronization signal in the at least one secondary synchronization signal and the symbol interval between the secondary synchronization signal in the at least one secondary synchronization signal and each of the at least one primary synchronization signal. In the foregoing manner, because the sequences of any two of the N secondary synchronization signals are different, when a terminal device detects only one S-PSS and one S-SSS, even if symbol interval sets corresponding to all primary synchronization signals include a same symbol interval, the terminal device may accurately determine a symbol location of the S-PSS based on a sequence of the secondary synchronization signal and a symbol interval.

Figure 27:
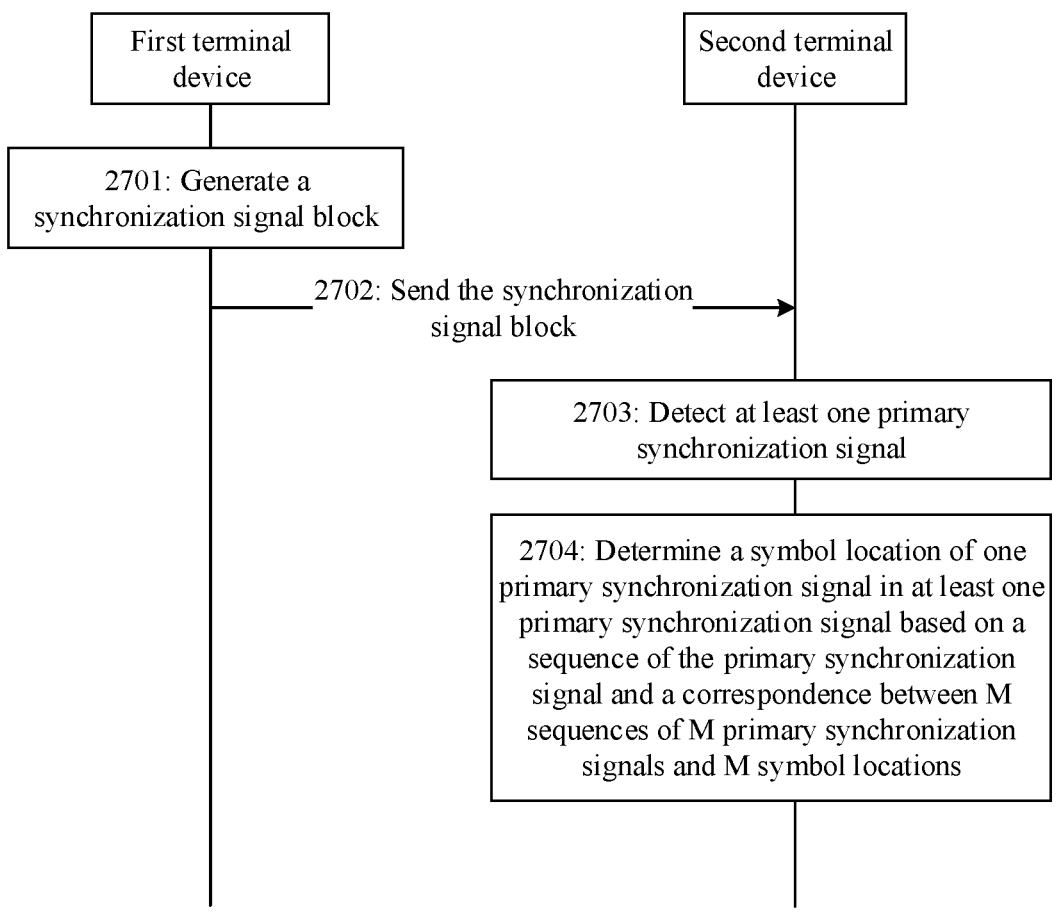
FIG. 27 is a schematic diagram of a synchronization signal transmission method according to an embodiment of this application.
Figure 31B:
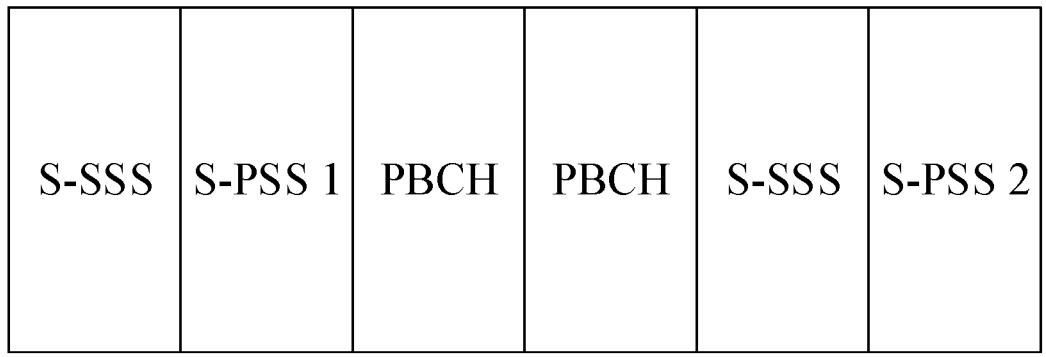

FIG. 27 is a schematic diagram of a synchronization signal transmission method according to an embodiment of this application. As shown in FIG. 27, the synchronization signal transmission method provided in this embodiment of this application includes the following steps.

2701: A first terminal device generates a synchronization signal block, where the synchronization signal block includes M primary synchronization signals, sequences of any two of the M primary synchronization signals are different, M sequences of the M primary synchronization signals correspond to M symbol locations, and M is a positive integer greater than or equal to 2.

In some embodiments, the first terminal device generates the synchronization signal block, where the synchronization signal block includes the M primary synchronization signals and N secondary synchronization signals. In time domain, the M primary synchronization signals are mapped to M symbols of the synchronization signal block, and the sequences of any two of the M primary synchronization signals are different. That is, the M sequences of the M primary synchronization signals correspond to the M symbol locations. The N secondary synchronization signals are mapped to N symbols of the synchronization signal block.

In some embodiments, the sequences of any two of the M primary synchronization signals are different.

Specifically, an S-PSS sequence c (n) is an M sequence. For example, the following generation formulas may be used to generate S-PSSs of different sequences:

$$c_1(n)=x(n+a*NID2); \text{ and}$$

$$c_2(n)=x(n+b*NID2).$$

x(n) is an M sequence, the NID 2 is identification in a group, NID 2=(0, . . . , or 2), SID=3*NID 1+NID 2, SID is a sidelink synchronization identifier, SID=(0, . . . , or 1007), and a and b are different positive integers ranging from 0 to 127.

A generator polynomial of a linear feedback shift register used for generating two M sequences x(n) may be the following generator polynomial:

$$x(i+7)=\text{mod}((x(i+4)+x(i)),2).$$

Initial values of the generator polynomial may be the following initial values:

$$[x(6)x(5)x(4)x(3)x(2)x(1)x(0)]=[1\ 1\ 1\ 0\ 1\ 1\ 0].$$

It should be noted that the synchronization signal block may further include a PBCH.

For example, M=2, N=2, and the synchronization signal block includes two PBCHs. FIG. 28a to FIG. 31b each are a schematic structural diagram of the synchronization signal block.

As shown in S-SSBs in FIG. 28A to FIG. 28L, two primary synchronization signals S-PSSs are mapped to consecutive symbols. FIG. 28A is used as an example. In an S-SSB in FIG. 28A, an S-PSS 1 is mapped to a first symbol location, an S-PSS 2 is mapped to a second symbol location, and S-SSSs are mapped to a fifth symbol location and a sixth symbol location.

In some embodiments, the synchronization signal block further includes N primary synchronization signals, symbols occupied by the M primary synchronization signals are before symbols occupied by the N secondary synchronization signals, and N is a positive integer greater than 1.

In some embodiments, the synchronization signal block occupies consecutive symbols in time domain.

In some embodiments, structures of the synchronization signal blocks shown in FIG. 28A to FIG. 31B are used as an example. The synchronization signal blocks shown in FIG. 28A to FIG. 31B each occupy six consecutive symbols in time domain.

2702: The first terminal device sends the synchronization signal block.

In some embodiments, after generating the synchronization signal block, the first terminal device needs to send the synchronization signal block to a second terminal device.

2703: The second terminal device detects at least one primary synchronization signal, where the at least one primary synchronization signal belongs to a synchronization signal block, the synchronization signal block includes M primary synchronization signals, sequences of any two of the M primary synchronization signals are different, M sequences of the M primary synchronization signals correspond to M preset symbol locations, and M is a positive integer greater than or equal to 2.

2704: The second terminal device determines a symbol location of each of the at least one primary synchronization signal based on a sequence of each of the at least one primary synchronization signal and a correspondence between the M sequences of the M primary synchronization signals and the M symbol locations.

For example, M is equal to 2, and N is equal to 2. In some embodiments, after the first terminal device sends the synchronization signal block, the second terminal device blindly detects the primary synchronization signal in the synchronization signal block.

In some embodiments, if the second terminal device does not detect the M primary synchronization signals in the synchronization signal block, the second terminal device fails to perform detection.

If the second terminal device detects only one primary synchronization signal in the synchronization signal block, the second terminal device detects a sequence of the detected primary synchronization signal, and determines a symbol location of the detected primary synchronization signal based on the sequence of the detected primary synchronization signal and a correspondence between two sequences of the two primary synchronization signals and the two symbol locations.

The synchronization signal block shown in FIG. 28A is used as an example for description. If the second terminal device detects one S-PSS, and the second terminal device detects a sequence of an S-PSS 1, the second terminal device may determine that the detected S-PSS is the S-PSS at the first symbol location. If the second terminal device detects a sequence of an S-PSS 2, the second terminal device may determine that the detected S-PSS is the S-PSS at the second symbol location.

If the second terminal device detects the two primary synchronization signals in the synchronization signal block, the second terminal device detects sequences of the two primary synchronization signals, and determines symbol locations of the two primary synchronization signals based on a sequence of either of the two primary synchronization signals.

Second, in some embodiments, the first terminal device generates the synchronization signal block, where the synchronization signal block includes the M primary synchronization signals, the sequences of any two of the M primary synchronization signals are different, the M sequences of the M primary synchronization signals correspond to the M preset symbol locations, and M is a positive integer greater than or equal to 2. The first terminal device sends the synchronization signal block. The second terminal device detects the at least one primary synchronization signal, where the at least one primary synchronization signal belongs to the synchronization signal block, the synchronization signal block includes the M primary synchronization signals, the sequences of any two of the M primary synchronization signals are different, the M sequences of the M primary synchronization signals correspond to the M preset symbol locations, and M is a positive integer greater than or equal to 2. The second terminal device determines the symbol location of each of the at least one primary synchronization signal based on the sequence of each of the at least one primary synchronization signal and the correspondence between the M sequences of the M primary synchronization signals and the M symbol locations. In the foregoing manner, because the sequences of any two of the M primary synchronization signals are different, a terminal device may also accurately determine a symbol location of a primary synchronization signal based on a correspondence between a sequence of the primary synchronization signal and the symbol location.

Figure 32:
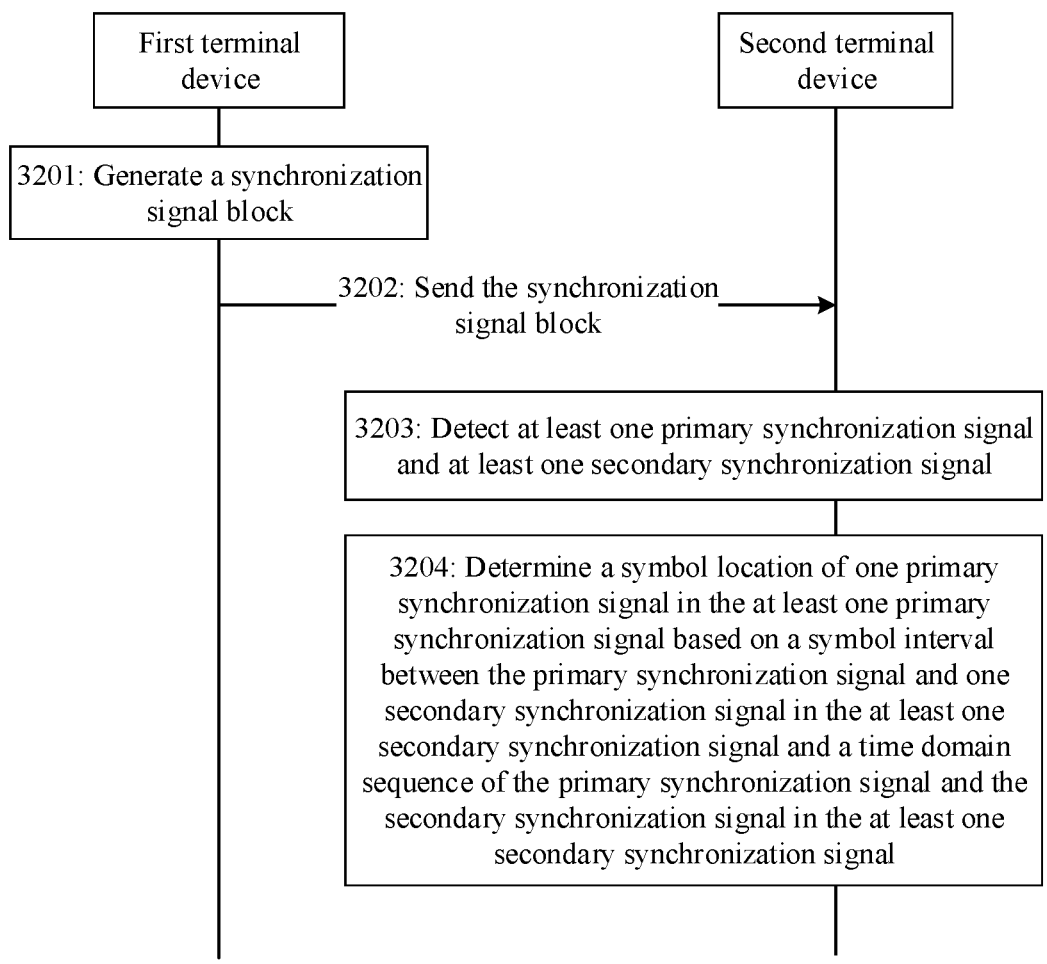
FIG. 32 is a schematic diagram of a synchronization signal transmission method according to an embodiment of this application.
Figure 33L:
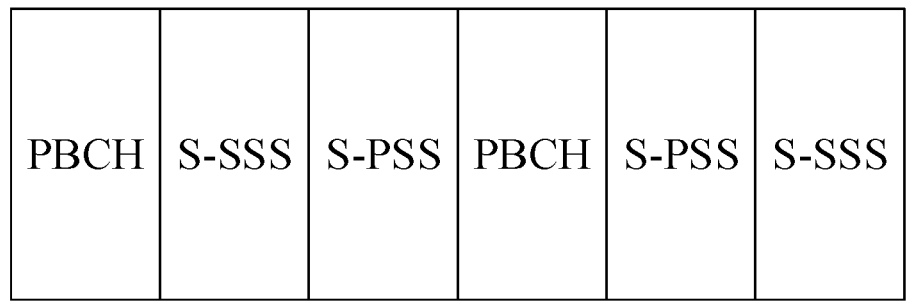

FIG. 32 is a schematic diagram of a synchronization signal transmission method according to an embodiment of this application. The schematic diagram describes a synchronization signal transmission process from a perspective of interaction between a first terminal device and a second terminal device. As shown in FIG. 32, the synchronization signal transmission method provided in this embodiment of this application includes the following steps.

3201: The first terminal device generates a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals.

In some embodiments, the first terminal device generates the synchronization signal block, where the synchronization signal block includes the M primary synchronization signals and the N secondary synchronization signals. In time domain, the M primary synchronization signals are mapped to M symbols of the synchronization signal block, and the N secondary synchronization signals are mapped to N symbols of the synchronization signal block. The M primary synchronization signals correspond to the M symbol interval sets. Each of the M primary synchronization signals corresponds to the symbol interval set in the M symbol interval sets, and the symbol interval set in the M symbol interval sets includes the N symbol intervals between the primary synchronization signal in the M primary synchronization signals and the N secondary synchronization signals.

In some embodiments, any two of the M symbol interval sets are the same.

For example, if the synchronization signal block includes two primary synchronization signals (a primary synchronization signal A and a primary synchronization signal B), and the synchronization signal block includes two secondary synchronization signals (a secondary synchronization signal A and a secondary synchronization signal B), the two primary synchronization signals correspond to two symbol interval sets (a symbol interval set A and a symbol interval set B), either of the two primary synchronization signals corresponds to one symbol interval set in the two symbol interval sets, the primary synchronization signal A corresponds to the symbol interval set A, and the primary synchronization signal B corresponds to the symbol interval set B. Each symbol interval set includes two symbol intervals between one primary synchronization signal and the two secondary synchronization signals. That is, the symbol interval set A includes two symbol intervals (a symbol interval A1 between the primary synchronization signal A and the secondary synchronization signal A and a symbol interval A2 between the primary synchronization signal A and the secondary synchronization signal B). The symbol interval set B includes two symbol intervals (a symbol interval B1 between the primary synchronization signal B and the secondary synchronization signal A and a symbol interval B2 between the primary synchronization signal B and the secondary synchronization signal B). In addition, the symbol interval set A is the same as the symbol interval set B. That is, the symbol interval A1 is equal to the symbol interval B1 and the symbol interval A2 is equal to the symbol interval B2, or the symbol interval A1 is equal to the symbol interval B2 and the symbol interval A1 is equal to the symbol interval B2. A symbol interval between the two primary synchronization signals is different from a symbol interval between the two secondary synchronization signals. That is, a symbol interval C1 between the primary synchronization signal A and the primary synchronization signal B is the same as a symbol interval C2 between the secondary synchronization signal A and the secondary synchronization signal B.

In some embodiments, M and N are even numbers, and the M/2 primary synchronization signals in the M primary synchronization signals are before the N secondary synchronization signals, and the M/2 primary synchronization signals other than the M/2 primary synchronization signals in the M primary synchronization signals are after the N secondary synchronization signals, or the N/2 secondary synchronization signals in the N secondary synchronization signals are before the M primary synchronization signals, and the N/2 secondary synchronization signals other than the N/2 secondary synchronization signals in the N secondary synchronization signals are after the M primary synchronization signals.

In some embodiments, in time domain, half of the M primary synchronization signals are before the N secondary synchronization signals, and the other half of the M primary synchronization signals are after the N secondary synchronization signals.

In some embodiments, in time domain, half of the N secondary synchronization signals are before the M primary synchronization signals, and the other half of the N secondary synchronization signals are after the M primary synchronization signals.

It should be noted that the synchronization signal block may further include a PBCH.

For example, M=2, N=2, and the synchronization signal block includes two PBCHs. FIG. 33A to FIG. 33L each are a schematic structural diagram of the synchronization signal block.

FIG. 33A is used as an example. In an S-SSB in FIG. 33A, S-PSSs are mapped to a second symbol location and a third symbol location, and S-SSSs are mapped to a first symbol location and a fourth symbol location. In this case, a symbol interval set corresponding to an S-PSS at the second symbol location is {0, 1}, and a symbol interval set corresponding to an S-PSS at the third symbol location is {0, 1}. That is, the symbol interval set corresponding to the S-PSS at the second symbol location is the same as the symbol interval set corresponding to the S-PSS at the third symbol location. An S-SSS at the first symbol location is before the S-PSSs at the second symbol location and the third symbol location, and an S-SSS at the fourth symbol location is after the S-PSSs at the second symbol location and the third symbol location.

FIG. 33G is used as an example. In an S-SSB in FIG. 33G, S-PSSs are mapped to a first symbol location and a fifth symbol location, and S-SSSs are mapped to a second symbol location and a fourth symbol location. In this case, a symbol interval set corresponding to an S-PSS at the first symbol location is {0, 2}, and a symbol interval set corresponding to an S-PSS at the fifth symbol location is {2, 0}. That is, the symbol interval set corresponding to the S-PSS at the first symbol location is the same as the symbol interval set corresponding to the S-PSS at the fifth symbol location. The P-SSS at the first symbol location is before the S-SSSs at the second symbol location and the fourth symbol location, and the S-PSS at the fifth symbol location is after the S-SSSs at the second symbol location and the fourth symbol location.

In some embodiments, the synchronization signal block occupies consecutive symbols in time domain.

In some embodiments, structures of the synchronization signal blocks shown in FIG. 33A to FIG. 33L are used as an example. The synchronization signal blocks shown in FIG. 33A to FIG. 33L each occupy six consecutive symbols in time domain.

3202: The first terminal device sends the synchronization signal block.

In some embodiments, after generating the synchronization signal block, the first terminal device needs to send the synchronization signal block to the second terminal device.

3203: The second terminal device detects at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals.

3204: The second terminal device determines a symbol location of each of the at least one primary synchronization signal based on a symbol interval between each of the at least one primary synchronization signal and one secondary synchronization signal in the at least one secondary synchronization signal and a time domain sequence of each of the at least one primary synchronization signal and the secondary synchronization signal in the at least one secondary synchronization signal, where the time domain sequence includes that the primary synchronization signal is before the secondary synchronization signal or that the primary synchronization signal is after the secondary synchronization signal.

For example, M is equal to 2, and N is equal to 2. In some embodiments, after the first terminal device sends the synchronization signal block, the second terminal device blindly detects the primary synchronization signal and the secondary synchronization signal in the synchronization signal block.

In some embodiments, if the second terminal device does not detect the two primary synchronization signals in the synchronization signal block, the second terminal device fails to perform detection.

If the second terminal device detects only one primary synchronization signal and one secondary synchronization signal in the synchronization signal block, the second terminal device detects a symbol interval between the primary synchronization signal and the secondary synchronization signal and a time domain sequence of the primary synchronization signal and the secondary synchronization signal, where the time domain sequence includes that the primary synchronization signal is before the secondary synchronization signal or that the primary synchronization signal is after the secondary synchronization signal.

The synchronization signal block shown in FIG. 33A is used as an example for description. The second terminal device detects one S-PSS and one S-SSS. If the second terminal device detects that a symbol interval between the S-PSS and the S-SSS is 1, because in the synchronization signal block in FIG. 33A, a symbol interval between the S-PSS at the second symbol location and the S-SSS at the fourth symbol location is 1, and a symbol interval between the S-PSS at the third symbol location and the S-SSS at the first symbol location is 1, the second terminal device detects a time domain sequence of the primary synchronization signal and the secondary synchronization signal. If the S-PSS is before the S-SSS in time domain, the second terminal device may determine that the S-PSS is the S-PSS at the second symbol location. If the S-PSS is after the S-SSS, the second terminal device may determine that the S-PSS is the S-PSS at the third symbol location.

If the second terminal device detects that a symbol interval between the S-PSS and the S-SSS is 0, because in the synchronization signal block in FIG. 33A, a symbol interval between the S-PSS at the second symbol location and the S-SSS at the first symbol location is 0, and a symbol interval between the S-PSS at the third symbol location and the S-SSS at the fourth symbol location is 0, the second terminal device detects a time domain sequence of the primary synchronization signal and the secondary synchronization signal. If the S-PSS is before the S-SSS in time domain, the second terminal device may determine that the S-PSS is the S-PSS at the third symbol location. If the S-PSS is after the S-SSS, the second terminal device may determine that the S-PSS is the S-PSS at the second symbol location.

In another embodiment, the synchronization signal block shown in FIG. 33A is used as an example for description. If the second terminal device detects one S-PSS in the synchronization signal block, the second network device may separately detect an S-SSS at symbol locations having a symbol interval of 0 before the S-PSS, a symbol interval of 1 before the S-PSS, a symbol interval of 0 after the S-PSS, and a symbol interval of 1 after the S-PSS. If the S-SSS is detected at a symbol location having the symbol interval of 0 before the S-PSS, the second terminal device may determine that the detected S-PSS is the S-PSS at the second symbol location. If the S-SSS is detected at a symbol location having the symbol interval of 1 before the S-PSS, the second terminal device may determine that the detected S-PSS is the S-PSS at the third symbol location. If the S-SSS is detected at a symbol location having the symbol interval of 0 after the S-PSS, the second terminal device may determine that the detected S-PSS is the S-PSS at the third symbol location. If the S-SSS is detected at a symbol location having the symbol interval of 1 after the S-PSS, the second terminal device may determine that the detected S-PSS is the S-PSS at the second symbol location.

If the second terminal device detects only one primary synchronization signal and the two secondary synchronization signals in the synchronization signal block, the second terminal device may determine a symbol location of the primary synchronization signal based on a symbol interval between the primary synchronization signal and one secondary synchronization signal in the two detected secondary synchronization signals and a time domain sequence of the primary synchronization signal and the secondary synchronization signal in the two detected secondary synchronization signals.

If the second terminal device detects the two primary synchronization signals and the two secondary synchronization signals in the synchronization signal block, the second terminal device may determine a symbol location of one primary synchronization signal in the two primary synchronization signals based on a symbol interval between the primary synchronization signal and one secondary synchronization signal in the two detected secondary synchronization signals and a time domain sequence of the primary synchronization signal and the secondary synchronization signal in the two detected secondary synchronization signals.

Second, in some embodiments, the first terminal device generates the synchronization signal block, where the synchronization signal block includes the M primary synchronization signals and the N secondary synchronization signals, each of the M primary synchronization signals corresponds to the symbol interval set, the symbol interval set in the M symbol interval sets includes the N symbol intervals between the primary synchronization signal in the M primary synchronization signals and the N secondary synchronization signals, any two of the M symbol interval sets are the same, M and N are positive integers greater than or equal to 2, M and N are even numbers, and the M/2 primary synchronization signals in the M primary synchronization signals are before the N secondary synchronization signals, and the M/2 primary synchronization signals other than the M/2 primary synchronization signals in the M primary synchronization signals are after the N secondary synchronization signals, or the N/2 secondary synchronization signals in the N secondary synchronization signals are before the M primary synchronization signals, and the N/2 secondary synchronization signals other than the N/2 secondary synchronization signals in the N secondary synchronization signals are after the M primary synchronization signals. The first terminal device sends the synchronization signal block. The second terminal device detects the at least one primary synchronization signal and the at least one secondary synchronization signal, where the at least one primary synchronization signal and the at least one secondary synchronization signal belong to the same synchronization signal block, the synchronization signal block includes the M primary synchronization signals and the N secondary synchronization signals, each of the M primary synchronization signals corresponds to the symbol interval set, the symbol interval set in M symbol interval sets includes the N symbol intervals between the primary synchronization signal in the M primary synchronization signals and the N secondary synchronization signals, any two of the M symbol interval sets are the same, M and N are positive integers greater than or equal to 2, M and N are even numbers, and the M/2 primary synchronization signals in the M primary synchronization signals are before the N secondary synchronization signals, and the M/2 primary synchronization signals other than the M/2 primary synchronization signals in the M primary synchronization signals are after the N secondary synchronization signals, or the N/2 secondary synchronization signals in the N secondary synchronization signals are before the M primary synchronization signals, and the N/2 secondary synchronization signals other than the N/2 secondary synchronization signals in the N secondary synchronization signals are after the M primary synchronization signals. The second terminal device determines the symbol location of each of the at least one primary synchronization signal based on the symbol interval between each of the at least one primary synchronization signal and the secondary synchronization signal in the at least one secondary synchronization signal and the time domain sequence of each of the at least one primary synchronization signal and the secondary synchronization signal in the at least one secondary synchronization signal, where the time domain sequence includes that the primary synchronization signal is before the secondary synchronization signal or that the primary synchronization signal is after the secondary synchronization signal. In the foregoing manner, when a terminal device detects only one S-PSS and one S-SSS, even if symbol interval sets corresponding to all primary synchronization signals are the same, the terminal device may accurately determine a symbol location of the S-PSS based on a detected symbol interval between the S-PSS and the S-SSS and a detected time domain sequence of the S-PSS and the S-SSS.

Figure 34:
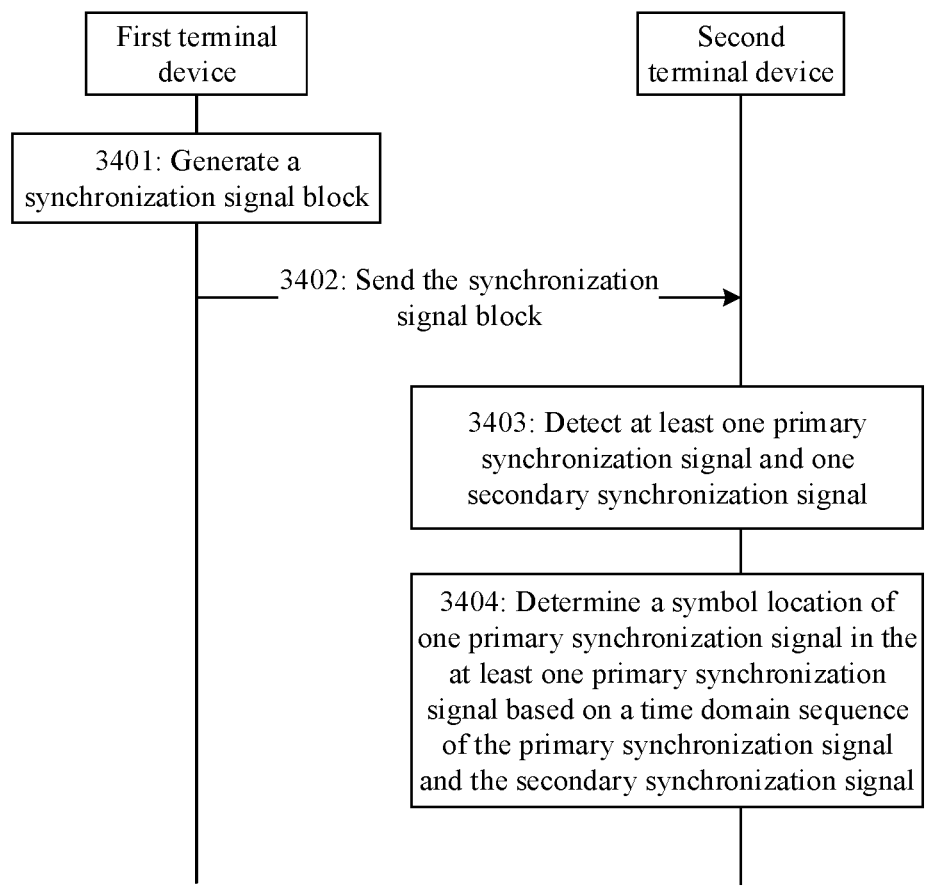
FIG. 34 is a schematic diagram of a synchronization signal transmission method according to an embodiment of this application.

FIG. 34 is a schematic diagram of a synchronization signal transmission method according to an embodiment of this application. The schematic diagram describes a synchronization signal transmission process from a perspective of interaction between a first terminal device and a second terminal device. As shown in FIG. 34, the synchronization signal transmission method provided in this embodiment of this application includes the following steps.

3401: The first terminal device generates a synchronization signal block, where the synchronization signal block includes only M primary synchronization signals and one secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same.

In some embodiments, the first terminal device generates the synchronization signal block, where the synchronization signal block includes the M primary synchronization signals and the secondary synchronization signal. In time domain, the M primary synchronization signals are mapped to M symbols of the synchronization signal block, and the secondary synchronization signal is mapped to one symbol of the synchronization signal block. The M primary synchronization signals correspond to the M symbol interval sets. Each of the M primary synchronization signals corresponds to the symbol interval set in the M symbol interval sets, and the symbol interval set in the M symbol interval sets includes the symbol interval between the primary synchronization signal in the M primary synchronization signals and the secondary synchronization signal.

In some embodiments, any two of the M symbol interval sets are the same.

For example, if the synchronization signal block includes two primary synchronization signals (a primary synchronization signal A and a primary synchronization signal B), and the synchronization signal block includes the secondary synchronization signal (a secondary synchronization signal A), the two primary synchronization signals correspond to two symbol interval sets (a symbol interval set A and a symbol interval set B), either of the two primary synchronization signals corresponds to one symbol interval set in the two symbol interval sets, the primary synchronization signal A corresponds to the symbol interval set A, and the primary synchronization signal B corresponds to the symbol interval set B. Each symbol interval set includes one symbol interval between one primary synchronization signal and the secondary synchronization signal. That is, the symbol interval set A includes one symbol interval (a symbol interval A1 between the primary synchronization signal A and the secondary synchronization signal A). The symbol interval set B includes one symbol interval (a symbol interval B1 between the primary synchronization signal B and the secondary synchronization signal A). In addition, the symbol interval set A is the same as the symbol interval set B. That is, the symbol interval A1 is equal to the symbol interval B1.

It should be noted that the synchronization signal block may further include a PBCH.

For example, M=2, and the synchronization signal block includes two PBCHs. FIG. 35A to FIG. 35D each are a schematic structural diagram of the synchronization signal block.

Figure 35A:
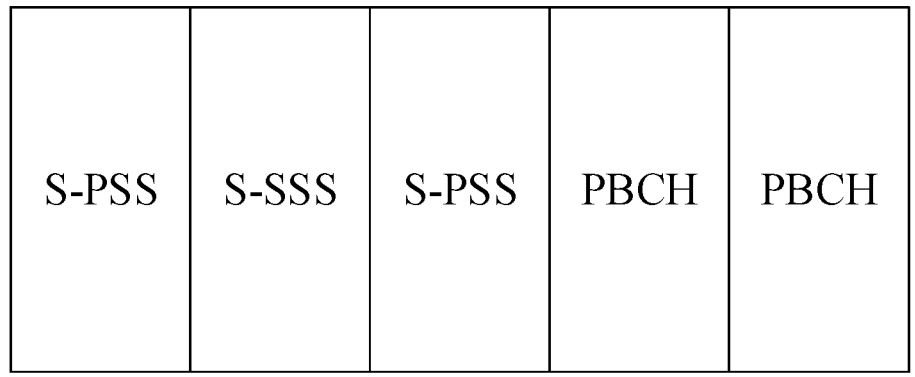
FIG. 35A to FIG. 35D each are a schematic structural diagram of a synchronization signal block according to an embodiment of this application.
Figure 35B:
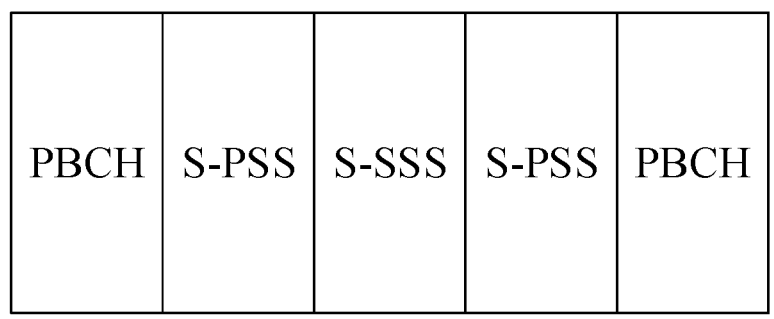
Figure 35C:
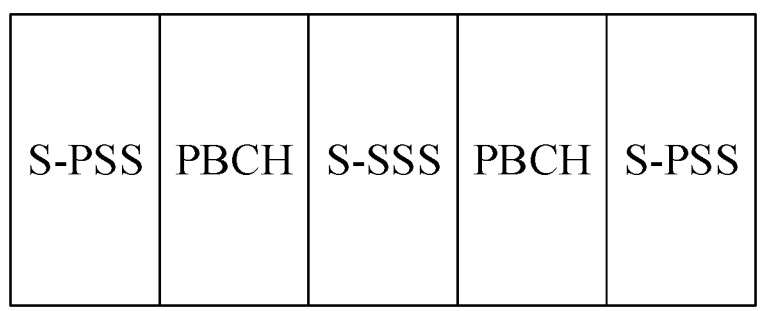
Figure 35D:
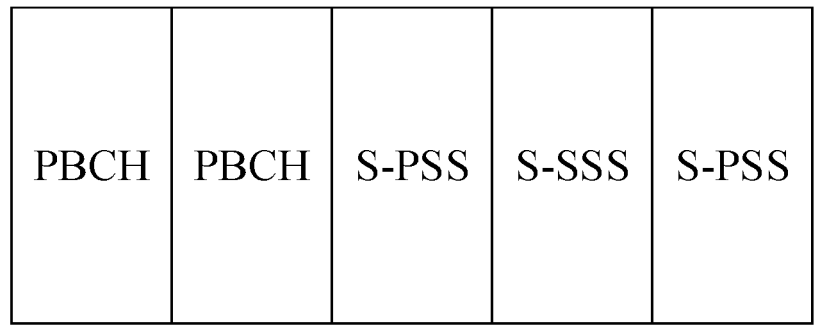

FIG. 35A is used as an example. In an S-SSB in FIG. 35A, S-PSSs are mapped to a first symbol location and a third symbol location, and an S-SSS is mapped to a second symbol location. In this case, a symbol interval set corresponding to an S-PSS at the first symbol location is {0}, and a symbol interval set corresponding to an S-PSS at the third symbol location is {0}. That is, the symbol interval set corresponding to the S-PSS at the first symbol location is the same as the symbol interval set corresponding to the S-PSS at the third symbol location. Although two symbol intervals between the S-SSS at the second symbol location and the two S-PSSs are the same, in time domain, the S-PSS at the first symbol location is before the S-SSS at the second symbol location, and the S-PSS at the third symbol location is after the S-SSS at the second symbol location.

In some embodiments, the synchronization signal block occupies consecutive symbols in time domain.

In some embodiments, structures of the synchronization signal blocks shown in FIG. 35A to FIG. 35D are used as an example. The synchronization signal blocks shown in FIG. 35A to FIG. 35D each occupy five consecutive symbols in time domain.

3402: The first terminal device sends the synchronization signal block.

In some embodiments, after generating the synchronization signal block, the first terminal device needs to send the synchronization signal block to the second terminal device.

3403: The second terminal device detects at least one primary synchronization signal and one secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same.

3404: The second terminal device determines a symbol location of each of the at least one primary synchronization signal based on a time domain sequence of each of the at least one primary synchronization signal and the secondary synchronization signal, where the time domain sequence includes that the primary synchronization signal is before the secondary synchronization signal or that the primary synchronization signal is after the secondary synchronization signal.

In some embodiments, a quantity of primary synchronization signals detected by the second terminal device may be less than M, or may be equal to M.

In some embodiments, if the second terminal device detects only one primary synchronization signal and one secondary synchronization signal in the synchronization signal block, the second terminal device may determine a symbol location of the primary synchronization signal based on a time domain sequence of the primary synchronization signal and the secondary synchronization signal.

The S-SSB shown in FIG. 35A is used as an example. In the S-SSB shown in FIG. 35A, the S-SSS is mapped to the second symbol location, and the S-PSSs are mapped to the first symbol location and the third symbol location. In this case, there are two symbol intervals between the S-SSS at the second symbol location and the two S-PSSs, and the two symbol intervals are the same (which are respectively 0 and 0). Although in FIG. 35A, the two symbol intervals between the S-SSS at the second symbol location and the two S-PSSs are the same, in time domain, the S-PSS at the first symbol location is before the S-SSS at the second symbol location, and the S-PSS at the third symbol location is after the S-SSS at the second symbol location. If the second terminal device detects one S-PSS and one S-SSS, the second terminal device detects that a symbol interval between the S-PSS and the S-SSS is 0, and the second terminal device detects that the S-SSS is before the S-PSS, the second terminal device may determine that the detected S-PSS is the S-PSS at the third symbol location. If the second terminal device detects that the S-SSS is after the S-PSS, the second terminal device may determine that the detected S-PSS is the S-PSS at the first symbol location.

In another embodiment, in the S-SSB shown in FIG. 35A, if the second terminal device detects only one S-PSS in the synchronization signal block, the second network device may separately detect an S-SSS at symbol locations having a symbol interval is 0 before the S-PSS and a symbol interval of 0 after the S-PSS. If the S-SSS is detected at a symbol location having the symbol interval of 0 before the S-PSS, the second terminal device may determine that the detected S-PSS is the S-PSS at the third symbol location. If the S-SSS is detected at a symbol location having the symbol interval of 0 after the S-PSS, the second terminal device may determine that the detected S-PSS is the S-PSS at the first symbol location.

Second, in some embodiments, the first terminal device generates the synchronization signal block, where the synchronization signal block includes only the M primary synchronization signals and the secondary synchronization signal, M is a positive integer greater than 1, each of the M primary synchronization signals corresponds to the symbol interval set, the symbol interval set in the M symbol interval sets includes the symbol interval between the primary synchronization signal in the M primary synchronization signals and the secondary synchronization signal, and any two of the M symbol interval sets are the same. The first terminal device sends the synchronization signal block. The second terminal device detects the at least one primary synchronization signal and the secondary synchronization signal, where the at least one primary synchronization signal and the secondary synchronization signal belong to the same synchronization signal block, the synchronization signal block includes only the M primary synchronization signals and the secondary synchronization signal, M is a positive integer greater than 1, each of the M primary synchronization signals corresponds to the symbol interval set, the symbol interval set in the M symbol interval sets includes the symbol interval between the primary synchronization signal in the M primary synchronization signals and the secondary synchronization signal, and any two of the M symbol interval sets are the same. The second terminal device determines the symbol location of each of the at least one primary synchronization signal based on the time domain sequence of each of the at least one primary synchronization signal and the secondary synchronization signal, where the time domain sequence includes that the primary synchronization signal is before the secondary synchronization signal or that the primary synchronization signal is after the secondary synchronization signal. In the foregoing manner, when a terminal device detects only one S-PSS and one S-SSS, even if symbol interval sets corresponding to all primary synchronization signals are the same, the terminal device may accurately determine a symbol location of the S-PSS based on a detected time domain sequence of the S-PSS and the S-SSS.

It should be noted that, for brief description, the foregoing method embodiments are expressed as combinations of a series of actions. However, persons skilled in the art should know that the present disclosure is not limited to the described action sequence, because according to the present disclosure, some steps may be performed in another sequence or performed simultaneously. In addition, persons skilled in the art should also know that all the embodiments described in the specification are used as examples, and the related actions and modules are not necessarily mandatory.

To better implement the foregoing solutions in the embodiments of the present disclosure, the following further provides related apparatuses configured to implement the foregoing solutions.

Figure 36:
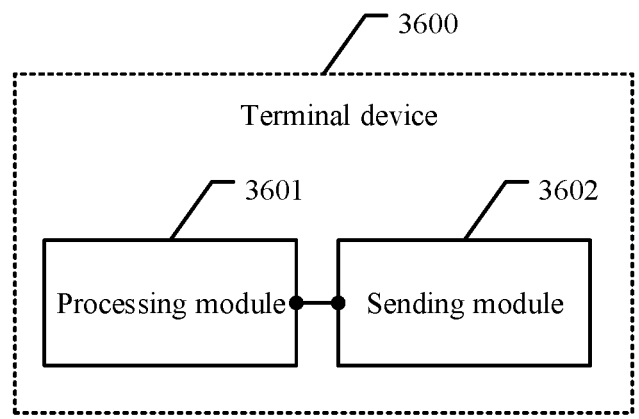
FIG. 36 is a schematic structural diagram of a terminal device according to an embodiment of this application.

An embodiment of this application provides a terminal device. As shown in FIG. 36, the terminal device 3600 includes: a processing module 3601 and a sending module 3602, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2, where the sending module 3602 is configured to send the synchronization signal block.

In some embodiments of this application, symbols occupied by the M primary synchronization signals are before symbols occupied by the N secondary synchronization signals.

In some embodiments of this application, the synchronization signal block occupies consecutive symbols in time domain.

Figure 37:
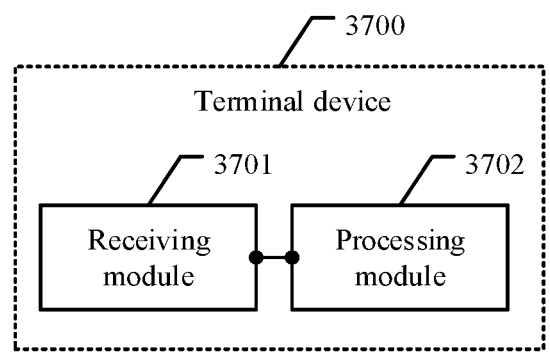
FIG. 37 is a schematic structural diagram of a terminal device according to an embodiment of this application.

An embodiment of this application further provides a terminal device. Referring to FIG. 37, the terminal device 3700 includes: a receiving module 3701, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets do not include a same symbol interval, and M and N are positive integers greater than or equal to 2; and a processing module 3702, configured to determine a symbol location of each of the at least one primary synchronization signal based on a symbol interval between each of the at least one primary synchronization signal and one secondary synchronization signal in the at least one secondary synchronization signal.

In some embodiments of this application, the processing module 3702 is configured to: determine the symbol interval between each of the at least one primary synchronization signal and the secondary synchronization signal in the at least one secondary synchronization signal; and determine that a symbol location of a primary synchronization signal corresponding to a symbol interval set to which a symbol interval between one primary synchronization signal in the at least one primary synchronization signal and the secondary synchronization signal in the at least one secondary synchronization signal belongs is a symbol location of the primary synchronization signal, where the symbol interval set belongs to the M symbol interval sets.

In some embodiments of this application, symbols occupied by the M primary synchronization signals are before symbols occupied by the N secondary synchronization signals.

In some embodiments of this application, the synchronization signal block occupies consecutive symbols in time domain.

An embodiment of this application provides a terminal device. As shown in FIG. 36, the terminal device 3600 includes: a processing module 3601, configured to generate a synchronization signal block, where the synchronization signal block includes only M primary synchronization signals and N secondary synchronization signals, a value of M is 1 and N is a positive integer greater than 1, or M is a positive integer greater than 1 and a value of N is 1, when M is a positive integer greater than 1 and the value of N is 1, symbol intervals between any two of the M primary synchronization signals and one secondary synchronization signal are different, and the M primary synchronization signals correspond to M symbol locations; and a sending module 3602, configured to send the synchronization signal block.

An embodiment of this application provides a terminal device. As shown in FIG. 37, the terminal device 3700 includes: a receiving module 3701, configured to detect at least one primary synchronization signal and one secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, and symbol intervals between any two of the M primary synchronization signals and the secondary synchronization signal are different; and a processing module 3702, configured to determine a symbol location of each of the at least one primary synchronization signal based on a symbol interval between each of the at least one primary synchronization signal and the secondary synchronization signal.

An embodiment of this application provides a terminal device. As shown in FIG. 37, the terminal device 3700 includes: a receiving module 3701, configured to detect a primary synchronization signal, where the primary synchronization signal belongs to a synchronization signal block, the synchronization signal block includes only M primary synchronization signals and N secondary synchronization signals, a value of M is 1 and N is a positive integer greater than 1, and the M primary synchronization signals correspond to M symbol locations; and a processing module 3702, configured to determine a symbol location of the primary synchronization signal based on a correspondence between the M primary synchronization signals and the M symbol locations.

An embodiment of this application provides a terminal device. As shown in FIG. 36, the terminal device 3600 includes: a processing module 3601, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; and a sending module 3602, configured to send the synchronization signal block.

An embodiment of this application provides a terminal device. As shown in FIG. 37, the terminal device 3700 includes: a receiving module 3701, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, sequences of any two of the N secondary synchronization signals are different, N sequences of the N secondary synchronization signals correspond to N symbol locations, and M and N are positive integers greater than or equal to 2; and a processing module 3702, configured to: determine a symbol location of a secondary synchronization signal in the at least one secondary synchronization signal based on a sequence of the secondary synchronization signal in the at least one secondary synchronization signal and a correspondence between the N sequences of the N secondary synchronization signals and the N preset symbol locations; and determine a symbol location of each of the at least one primary synchronization signal based on the symbol location of the secondary synchronization signal in the at least one secondary synchronization signal and a symbol interval between the secondary synchronization signal in the at least one secondary synchronization signal and each of the at least one primary synchronization signal.

An embodiment of this application provides a terminal device. As shown in FIG. 36, the terminal device 3600 includes: a processing module 3601, configured to generate a synchronization signal block, where the synchronization signal block includes M primary synchronization signals, sequences of any two of the M primary synchronization signals are different, M sequences of the M primary synchronization signals correspond to M symbol locations, and M is a positive integer greater than or equal to 2; and a sending module 3602, configured to send the synchronization signal block.

An embodiment of this application provides a terminal device. As shown in FIG. 37, the terminal device 3700 includes: a receiving module 3701, configured to detect at least one primary synchronization signal, where the at least one primary synchronization signal belongs to a synchronization signal block, the synchronization signal block includes M primary synchronization signals, sequences of any two of the M primary synchronization signals are different, M sequences of the M primary synchronization signals correspond to M preset symbol locations, and M is a positive integer greater than or equal to 2; and a processing module 3702, configured to determine a symbol location of each of the at least one primary synchronization signal based on a sequence of each of the at least one primary synchronization signal and a correspondence between the M sequences of the M primary synchronization signals and the M symbol locations.

An embodiment of this application provides a terminal device. As shown in FIG. 36, the terminal device 3600 includes: a processing module 3601, configured to generate a synchronization signal block, where the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and a sending module 3602, configured to send the synchronization signal block.

An embodiment of this application provides a terminal device. As shown in FIG. 37, the terminal device 3700 includes: a receiving module 3701, configured to detect at least one primary synchronization signal and at least one secondary synchronization signal, where the at least one primary synchronization signal and the at least one secondary synchronization signal belong to a same synchronization signal block, the synchronization signal block includes M primary synchronization signals and N secondary synchronization signals, each of the M primary synchronization signals corresponds to one symbol interval set, one symbol interval set in M symbol interval sets includes N symbol intervals between one primary synchronization signal in the M primary synchronization signals and the N secondary synchronization signals, any two of the M symbol interval sets are the same, M and N are positive integers greater than or equal to 2, M and N are even numbers, and M/2 primary synchronization signals in the M primary synchronization signals are before the N secondary synchronization signals, and M/2 primary synchronization signals other than the M/2 primary synchronization signals in the M primary synchronization signals are after the N secondary synchronization signals, or N/2 secondary synchronization signals in the N secondary synchronization signals are before the M primary synchronization signals, and N/2 secondary synchronization signals other than the N/2 secondary synchronization signals in the N secondary synchronization signals are after the M primary synchronization signals; and a processing module 3702, configured to determine a symbol location of each of the at least one primary synchronization signal based on a symbol interval between each of the at least one primary synchronization signal and one secondary synchronization signal in the at least one secondary synchronization signal and a time domain sequence of each of the at least one primary synchronization signal and the secondary synchronization signal in the at least one secondary synchronization signal, where the time domain sequence includes that the primary synchronization signal is before the secondary synchronization signal or that the primary synchronization signal is after the secondary synchronization signal.

An embodiment of this application provides a terminal device. As shown in FIG. 36, the terminal device 3600 includes: a processing module 3601, configured to generate a synchronization signal block, where the synchronization signal block includes only M primary synchronization signals and one secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and a sending module 3602, configured to send the synchronization signal block.

An embodiment of this application provides a terminal device. As shown in FIG. 37, the terminal device 3700 includes: a receiving module 3701, configured to detect at least one primary synchronization signal and a secondary synchronization signal, where the at least one primary synchronization signal and the secondary synchronization signal belong to a same synchronization signal block, the synchronization signal block includes only M primary synchronization signals and the secondary synchronization signal, M is a positive integer greater than 1, each of the M primary synchronization signals corresponds to one symbol interval set, one symbol interval set in M symbol interval sets includes one symbol interval between one primary synchronization signal in the M primary synchronization signals and the secondary synchronization signal, and any two of the M symbol interval sets are the same; and a processing module 3702, configured to determine a symbol location of each of the at least one primary synchronization signal based on a time domain sequence of each of the at least one primary synchronization signal and the secondary synchronization signal, where the time domain sequence includes that the primary synchronization signal is before the secondary synchronization signal or that the primary synchronization signal is after the secondary synchronization signal.

In some embodiments, symbols occupied by the M primary synchronization signals are before symbols occupied by the N secondary synchronization signals.

In some embodiments, the synchronization signal block occupies consecutive symbols in time domain.

It should be noted that content such as information exchange between the modules/units of the apparatus and the execution processes thereof is based on the same idea as the method embodiments of the present disclosure, and produces the same technical effects as the method embodiments of the present disclosure. For specific content, refer to the foregoing description in the method embodiments of the present disclosure. Details are not described herein again.

An embodiment of the present disclosure further provides a computer storage medium. The computer storage medium stores a program, and the program is executed to perform some or all of the steps described in the foregoing method embodiments.

Figure 38:
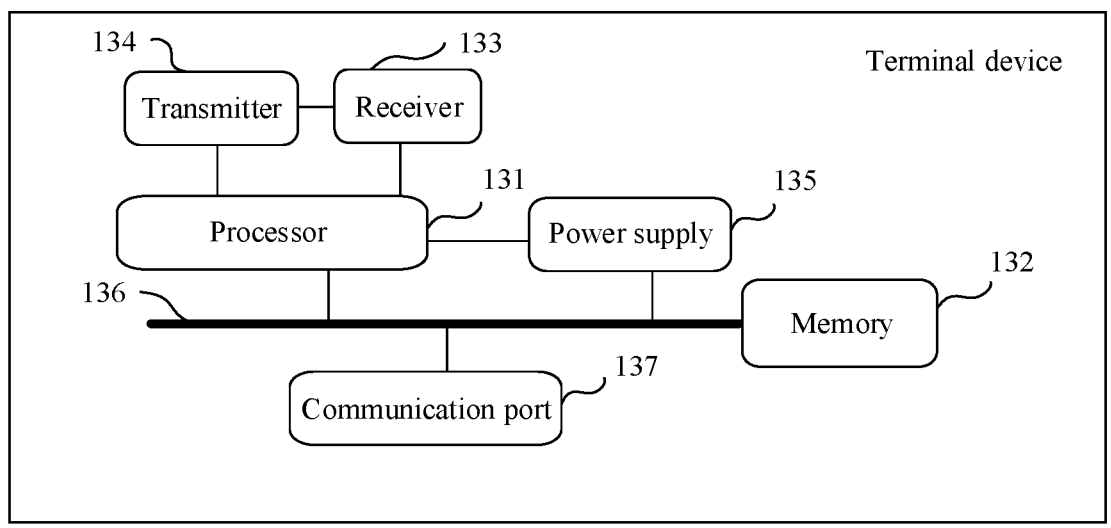
FIG. 38 is a schematic structural diagram of a terminal device according to an embodiment of this application.

FIG. 38 is a schematic structural diagram of another device according to an embodiment of this application. The device is a terminal device. The terminal device may include a processor 131 (for example, a CPU), a memory 132, a transmitter 134, and a receiver 133. The transmitter 134 and the receiver 133 are coupled to the processor 131. The processor 131 controls a sending action of the transmitter 134 and a receiving action of the receiver 133. The memory 132 may include a high-speed RAM memory, and may further include a nonvolatile memory NVM, for example, at least one magnetic disk memory. The memory 132 may store various instructions, to complete various processing functions and implement the method steps in the embodiments of this application. Optionally, the terminal device in this embodiment of this application may further include one or more of a power supply 135, a communication bus 136, and a communication port 137. The receiver 133 and the transmitter 134 may be integrated into a transceiver of the terminal device, or may be a receive antenna and a transmit antenna that are independent of each other on the terminal device. The communication bus 136 is configured to implement communication connections between the components. The communication port 137 is configured to implement connection and communication between the terminal device and another peripheral.

In some embodiments, the transmitter 134 in the terminal device may perform an action performed by the sending module in FIG. 36, the processor 131 in the terminal device may perform an action performed by the processing module in FIG. 36 or FIG. 37, and the receiver 133 in the terminal device may perform an action performed by the receiving module in FIG. 37. An implementation principle and a technical effect of the components are similar to those of the modules. Details are not described herein again.

In some embodiments, the memory 132 is configured to store computer-executable program code. The program code includes instructions. When the processor 131 executes the instructions, the instructions enable the processor 131 to perform an action performed by the processing module in the terminal device in the foregoing embodiments, and enable the transmitter 134 to perform an action performed by the sending module in the terminal device in the foregoing embodiments. An implementation principle and a technical effect of the components are similar to those of the modules. Details are not described herein again.

This application further provides a chip system. The chip system includes a processor, configured to support the foregoing terminal devices in implementing a function related to the terminal devices, for example, receiving or processing data and/or information in the foregoing method embodiments. In a possible design, the chip system further includes a memory. The memory is configured to store program instructions and data that are necessary for the terminal devices. The chip system may include a chip, or may include a chip and another discrete component.

All or some of the foregoing embodiments may be implemented by using software, hardware, firmware, or any combination thereof. When being implemented by using the software, all or some of the embodiments may be implemented in a form of a computer program product.

The computer program product includes one or more computer instructions. When the computer program instructions are loaded and executed on a computer, the procedure or functions according to the embodiments of the present disclosure are completely or partially generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing embodiments are merely intended to describe the technical solutions in this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of this application.

What is claimed is:

1. A synchronization signal transmission method, comprising:
    generating, by a first terminal device, a synchronization signal block, wherein the synchronization signal block comprises M primary synchronization signals and N secondary synchronization signals, each of the M primary synchronization signals corresponds to a particular symbol interval set in M symbol interval sets, each symbol interval set in the M symbol interval sets comprises N symbol intervals between a particular primary synchronization signal in the M primary synchronization signals and the N secondary synchronization signals, any two of the M symbol interval sets do not comprise a same symbol interval, and M and N are positive integers greater than or equal to 2, wherein each symbol interval corresponds to a unique symbol interval set in the M symbol interval sets, and wherein each symbol interval set in the M symbol interval sets corresponds to a unique primary synchronization signal in the M primary synchronization signals; and
    sending, by the first terminal device, the synchronization signal block to a second terminal device, wherein the M primary synchronization signals include only one sidelink primary synchronization signal (S-PSS) and the N secondary synchronization signals include only one sidelink secondary synchronization signal (S-SSS).

2. The method according to claim 1, wherein symbols occupied by the M primary synchronization signals are located before symbols occupied by the N secondary synchronization signals in a time domain.

3. The method according to claim 1, wherein the synchronization signal block occupies consecutive symbols in a time domain.

4. A synchronization signal transmission method, comprising:
    detecting, by a second terminal device, at least one primary synchronization signal and at least one secondary synchronization signal, wherein the at least one primary synchronization signal and the at least one secondary synchronization signal belong to a synchronization signal block, the synchronization signal block comprises M primary synchronization signals and N secondary synchronization signals, each of the M primary synchronization signals corresponds to a particular symbol interval set in M symbol interval sets, each symbol interval set in the M symbol interval sets comprises N symbol intervals between a particular primary synchronization signal in the M primary synchronization signals and the N secondary synchronization signals, any two of the M symbol interval sets do not comprise a same symbol interval, and M and N are positive integers greater than or equal to 2, wherein each symbol interval corresponds to a unique symbol interval set in the M symbol interval sets, and wherein each symbol interval set in the M symbol interval sets corresponds to a unique primary synchronization signal in the M primary synchronization signals; and
    determining, by the second terminal device, a symbol location of each of the at least one primary synchronization signal based on a symbol interval between each of the at least one primary synchronization signal and a corresponding secondary synchronization signal in the at least one secondary synchronization signal, wherein the M primary synchronization signals include only one sidelink primary synchronization signal (S-PSS) and the N secondary synchronization signals include only one sidelink secondary synchronization signal (S-SSS).

5. The method according to claim 4, wherein the determining, by the second terminal device, the symbol location of each of the at least one primary synchronization signal based on the symbol interval between each of the at least one primary synchronization signal and the corresponding secondary synchronization signal in the at least one secondary synchronization signal comprises:

determining, by the second terminal device, the symbol interval between each of the at least one primary synchronization signal and the corresponding secondary synchronization signal in the at least one secondary synchronization signal; and determining, by the second terminal device, that a symbol location of a primary synchronization signal corresponding to a symbol interval set to which a symbol interval between the primary synchronization signal in the at least one primary synchronization signal and the corresponding secondary synchronization signal in the at least one secondary synchronization signal belongs is the symbol location of the primary synchronization signal, wherein the symbol interval set belongs to the M symbol interval sets.

6. The method according to claim 5, wherein symbols occupied by the M primary synchronization signals are located before symbols occupied by the N secondary synchronization signals in a time domain.

7. The method according to any one of claim 4, wherein the synchronization signal block occupies consecutive symbols in a time domain.

8. A terminal device, comprising:

a memory having instruction stored thereon; and a processor configured to execute the instructions in the memory to facilitate the following being performed by the terminal device:

generating a synchronization signal block, wherein the synchronization signal block comprises M primary synchronization signals and N secondary synchronization signals, each of the M primary synchronization signals corresponds to a particular symbol interval set in M symbol interval sets, each symbol interval set in the M symbol interval sets comprises N symbol intervals between a particular primary synchronization signal in the M primary synchronization signals and the N secondary synchronization signals, any two of the M symbol interval sets do not comprise a same symbol interval, and M and N are positive integers greater than or equal to 2, wherein each symbol interval corresponds to a unique symbol interval set in the M symbol interval sets, and wherein each symbol interval set in the M symbol interval sets corresponds to a unique primary synchronization signal in the M primary synchronization signals; and sending the synchronization signal block to a second terminal device, wherein the M primary synchronization signals include only one sidelink primary synchronization signal (S-PSS) and the N secondary synchronization signals include only one sidelink secondary synchronization signal (S-SSS).

9. The terminal device according to claim 8, wherein symbols occupied by the M primary synchronization signals are located before symbols occupied by the N secondary synchronization signals in a time domain.

10. The terminal device according to claim 8, wherein the synchronization signal block occupies consecutive symbols in a time domain.

* * * * *